(12) United States Patent
Rigby

(10) Patent No.: US 12,491,282 B2
(45) Date of Patent: Dec. 9, 2025

(54) SYSTEM AND METHOD FOR ADMINISTERING AND MEASURING GERMICIDAL TREATMENTS WITH CLOUD-BASED MANAGEMENT AND CONTROL

(71) Applicant: Charles E. Rigby, Dawsonville, GA (US)

(72) Inventor: Charles E. Rigby, Dawsonville, GA (US)

( * ) Notice: Subject to any disclaimer, the term of this patent is extended or adjusted under 35 U.S.C. 154(b) by 502 days.

(21) Appl. No.: 18/052,753

(22) Filed: Nov. 4, 2022

(65) Prior Publication Data
US 2023/0072279 A1    Mar. 9, 2023

Related U.S. Application Data

(63) Continuation-in-part of application No. 17/530,532, filed on Nov. 19, 2021, now abandoned, which is a
(Continued)

(51) Int. Cl.
*A61L 2/24*    (2006.01)
*A61L 2/10*    (2006.01)
(Continued)

(52) U.S. Cl.
CPC ............... *A61L 2/28* (2013.01); *A61L 2/10* (2013.01); *A61L 2/24* (2013.01); *A61L 9/20* (2013.01);
(Continued)

(58) Field of Classification Search
CPC .......................................... A61L 2/24
See application file for complete search history.

(56) References Cited

U.S. PATENT DOCUMENTS 3,403,252 A    9/1968    Nagy
8,275,413 B1    9/2012    Fraden et al.
(Continued)

FOREIGN PATENT DOCUMENTS

DE    202021101774 U1    6/2021
EP    2718961 B1    4/2014
(Continued)

OTHER PUBLICATIONS

International Search Report and Written Opinion dated Feb. 16, 2023, International Application No. PCT/US2022/079967, filed Nov. 16, 2022, 9 pages.
(Continued)

*Primary Examiner* — Kevin Joyner
(74) *Attorney, Agent, or Firm* — Hanrahan Law Firm, P.A.; Benjamin M. Hanrahan, Esq.

(57) ABSTRACT

A system and method for performing UVC treatment of a room is presented herein. The system and method includes the use of at least one sensor, at least one UVC light source, a mobile device and a remote management system or cloud server. The sensor(s) and UVC light source(s) are disposed in a selected location within the room. The mobile device, in communication with the cloud server, is used to scan one or more of: a QR code associated with the room or location, a QR code associated with the UVC sources, and/or a QR code associated with the sensor(s). The mobile device then communicates with the cloud server to indicate where the sensor is disposed, and based thereupon, a treatment parameter, such as dosage values, treatment times, etc. is defined. If it is determined that the treatment parameter is not satisfied, then an action is initiated immediately or subsequently.

12 Claims, 42 Drawing Sheets

Related U.S. Application Data continuation-in-part of application No. 17/096,193, filed on Nov. 12, 2020, now abandoned.

(51) Int. Cl.
    *A61L 2/28* (2006.01)
    *A61L 9/20* (2006.01)
(52) U.S. Cl.
    CPC ....... *A61L 2202/14* (2013.01); *A61L 2202/16* (2013.01); *A61L 2202/25* (2013.01); *A61L 2209/111* (2013.01)

(56) References Cited

U.S. PATENT DOCUMENTS

| | | |
|---|---|---|
| 8,639,527 B2 | 1/2014 | Rensvold et al. |
| 8,658,101 B1 | 2/2014 | Burnett |
| 9,068,887 B1 | 6/2015 | Bennouri et al. |
| 9,345,798 B2 | 5/2016 | Trapani |
| 9,383,256 B2 | 7/2016 | Lian et al. |
| 9,606,001 B2 | 3/2017 | Vance et al. |
| 10,010,633 B2 | 7/2018 | Trapani |
| 10,585,218 B2 | 3/2020 | Ufkes et al. |
| 10,638,402 B2 | 4/2020 | Chong et al. |
| 11,160,893 B2 | 11/2021 | Grossman et al. |
| 2003/0026585 A1 | 2/2003 | Limura |
| 2004/0166018 A1 | 8/2004 | Clark et al. |
| 2010/0260644 A1 | 10/2010 | Day et al. |
| 2012/0168641 A1 | 7/2012 | Lizotte |
| 2012/0285459 A1 | 11/2012 | Sata et al. |
| 2013/0183749 A1 | 7/2013 | Aamodt et al. |
| 2014/0374612 A1 | 12/2014 | Statham et al. |
| 2016/0130159 A1 | 5/2016 | Knight et al. |
| 2017/0072082 A1 | 3/2017 | Jurak et al. |
| 2019/0062180 A1 | 2/2019 | Taghipour |
| 2020/0101183 A1 | 4/2020 | Dijkstra et al. |
| 2020/0179718 A1 | 6/2020 | Gil et al. |
| 2020/0345875 A1 | 11/2020 | Trapani |
| 2023/0054225 A1 | 2/2023 | Rigby |
| 2023/0054238 A1 | 2/2023 | Rigby |

FOREIGN PATENT DOCUMENTS

| | | |
|---|---|---|
| GB | 2595317 A | 11/2021 |
| JP | 6131727 B2 | 5/2017 |
| KR | 20160054731 A | 5/2016 |
| WO | 2015026407 A1 | 2/2015 |
| WO | 2020160614 A1 | 8/2020 |
| WO | 2021195003 A1 | 9/2021 |
| WO | 2023091952 A1 | 5/2023 |

OTHER PUBLICATIONS

Altoros, UVC Disinfection Station, Surface Sterilizer, printed on Sep. 18, 2020, <https://www.altoros.com/solutions/uvc-disinfection-station>, publication date unknown.

Atlantic Ultraviolet Corporation, Manufacturers, Engineers, Sales, Service—Germicidal Ultraviolet—Equipment & Lamps, pp. 1-4, <https://www.buyultraviolet.com/ultraviolet-air-room-air-duct-surface-disinfection>, printed on Sep. 18, 2020, publication date unknown.

Bob, HVAC Training 101, Best UV Lights for HVAC—2020 Buyer's Guide, printed on Sep. 18, 2020, <https://hvactraining101.com/best-hvac-uv-lights/>, publication date unknown.

Honle group, honle UV technology, Gräfelfing/München, Germany, Brochure updated Sep. 2020, <https://www.hoenle.com/hoenle.de/pdfs/produktbroschueren/en/steriair-white-en.pdf>.

Ikio, axenic-UV, Hover LED UV Disinfection Panel Light, pp. 1-2, <https://axenic-uv.com/uploads/document/99820200902062020.pdf>, printed on Sep. 18, 2020, publication date unknown.

Ikio; axenic-UV; Air Sterilization Systems, Aeromaxe Pro (Concept), Upper Air Germicidal UV Light, pp. 1-2, <https://axenic-uv.com/uploads/document/25120200826120627.pdf>, printed on Sep. 18, 2020, publication date unknown.

Tru-D, A PDI Solution, UV Light Disinfection, printed on Mar. 19, 2023, <https://tru-d.com/why-tru-d/smart-uvc-sensor-360/>, publication date unknown.

Larson Electronics, UV Disinfection Lights, printed on Sep. 18, 2020, <https://www.larsonelectronics.com/category/11553/uv-disinfection-lights?pagenum=8>, publication date unknown.

Oxidation Technologies, LLC, Ozone equipment manufacturer and ozone system integrators Ambient Destruct Media (small) Ozone Integration Experts, printed on Sep. 18, 2020, <https://www.oxidationtech.com/destructmedia-small.html>, publication date unknown.

RD UVC, RD UVC Mobile System, UV Light Disinfection, printed on Mar. 19, 2023, <https://rduvc.com/uvc-disinfection-systems/rd-uvc-system/>, publication date unknown.

Sanuvox, Purifying Air at the Speed of Light, Technical Specs—HRV6 GX, UV Air Purifier for 6" Round Ducts, p. 1 <https://sanuvox.com/wp-content/uploads/2019/07/HRV6-Specs-EN-2.pdf>, accessed Oct. 10, 2020, publication date unknown.

UltraViolet Devices, Inc (UVDI), V-Max Grid—Top Manufacturer of Advanced UV Disinfection Products—UltraViolet Devices, Inc. U.S., printed on Sep. 18, 2020, <https://www.uvdi.com/hvac/airstream-disinfection/v-max-grid/>, publication date unknown.

UV-Oberflächenentkeimung—Dr. Honle AG—printed on Sep. 18, 2020, <https://www.hoenle.com/products/disinfection-systems/steriair-max>, publication date unknown.

UltraViolet Devices, Inc., V-PAC System—Air Purification, The Next Generation of Air Purification, pp. 1-2, <https://www.uvdi.com/wp-content/uploads/2020/07/V-PAC-for-Air-Purification-MKTFM-254_Rev-B.pdf> printed Sep. 18, 2020, publication date unknown.

Uvangel, UV Angel Air, ASHRAE Conference (2017), pp. 1-2, <https://uvangel.com/wp-content/uploads/2020/03/UV-Angel-Cut-Sheet-v14-nocrop.pdf>, printed Sep. 18, 2020, publication unknown.

Supplementary European Search Report dated Sep. 9, 2025 for European Application No. EP22896689.1 consisting of 12 pages.

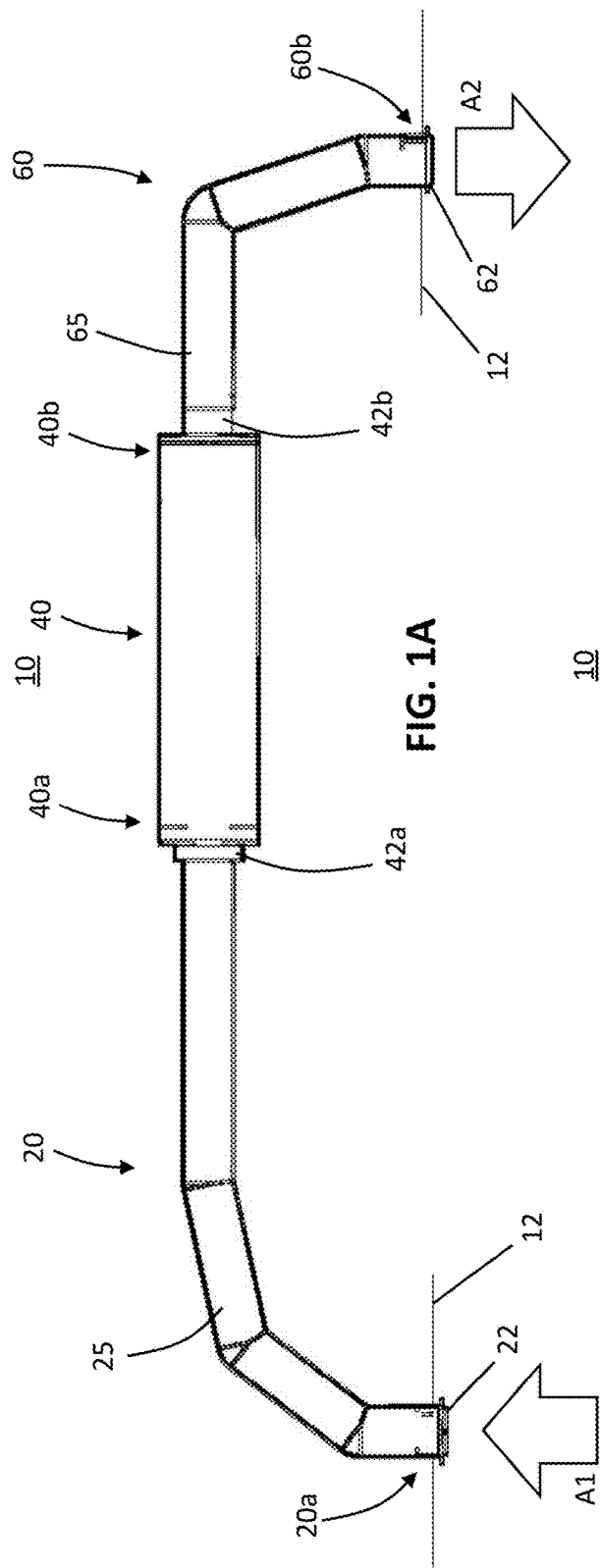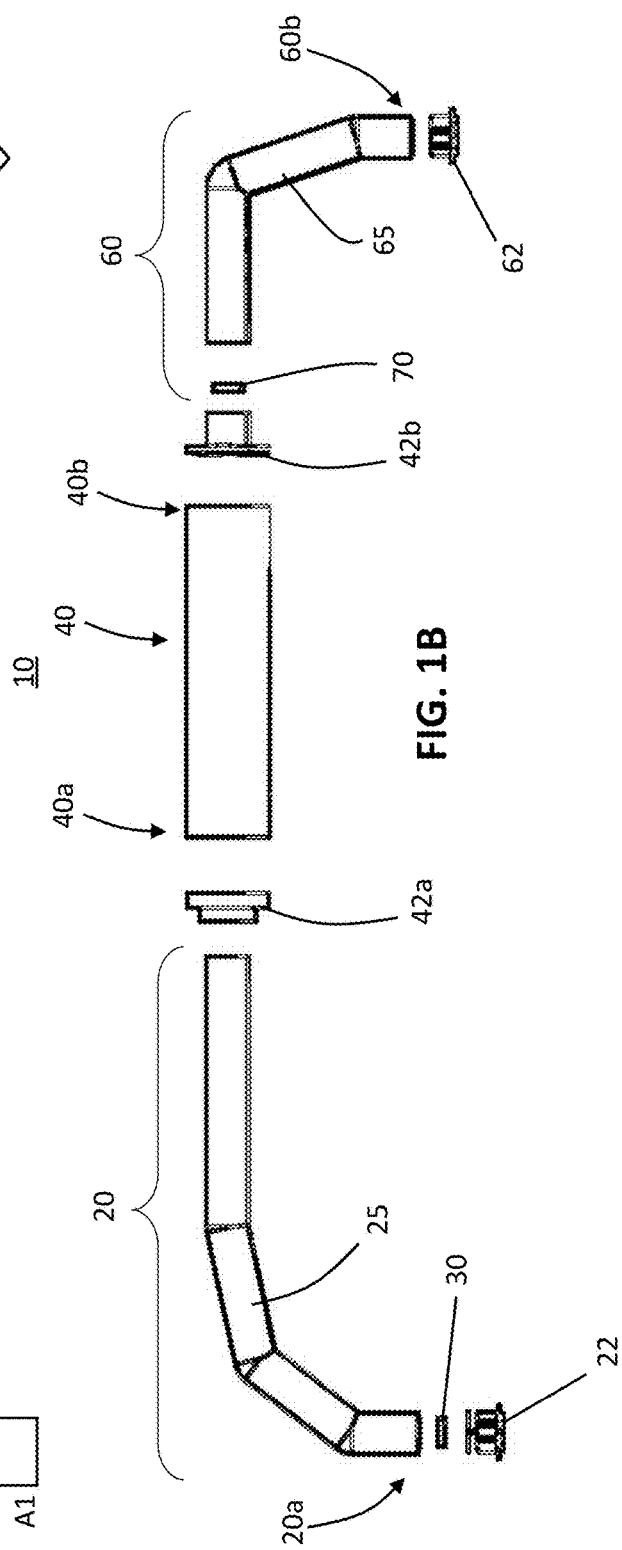

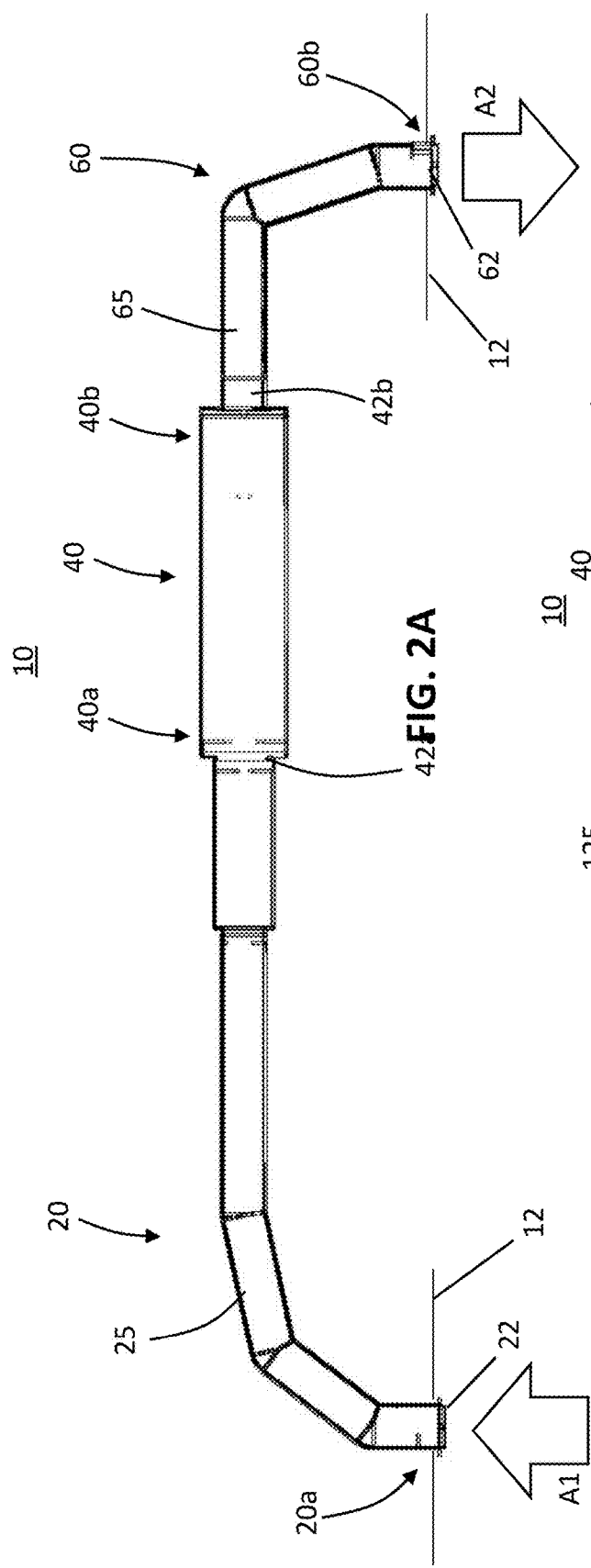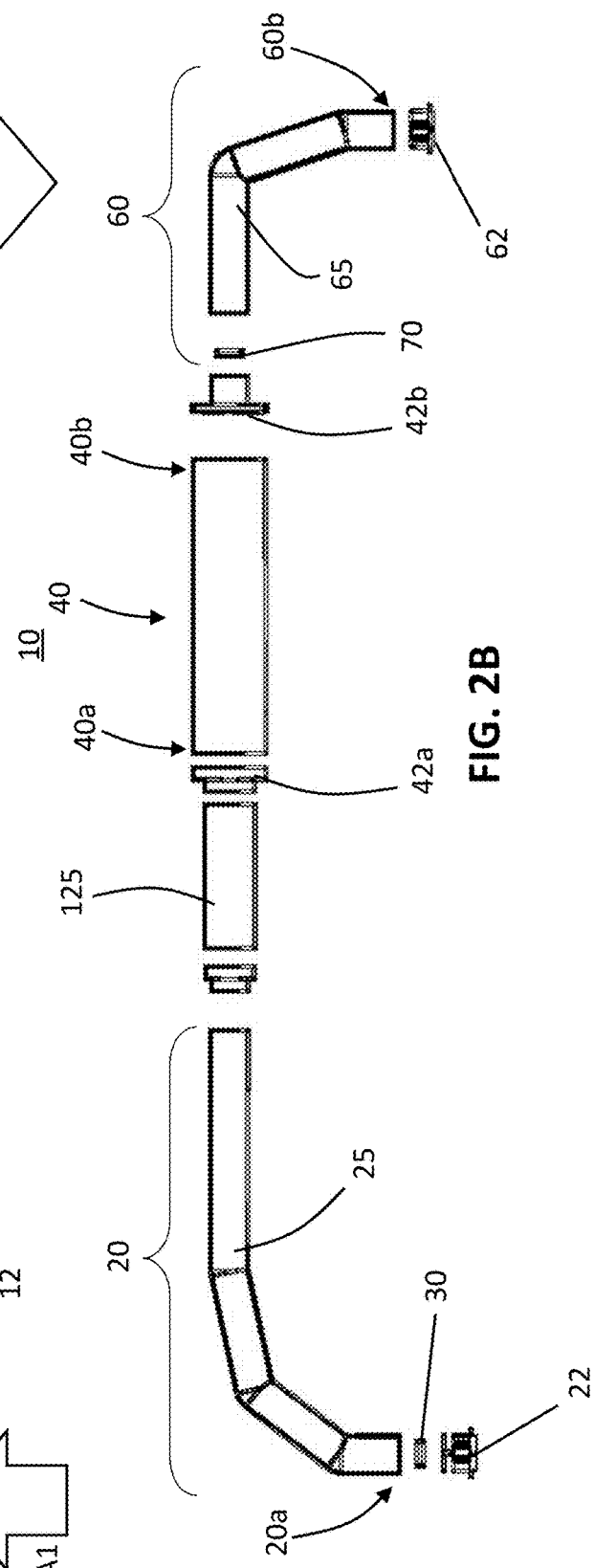

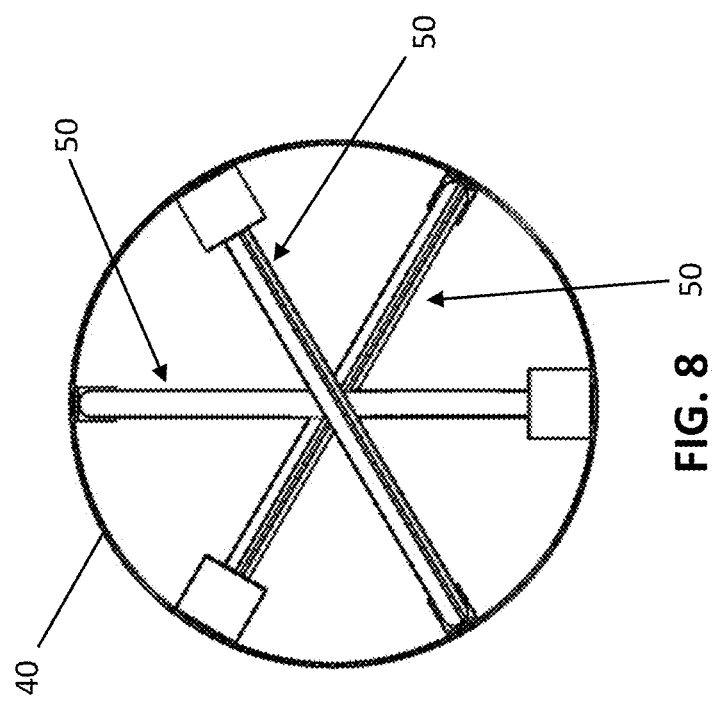

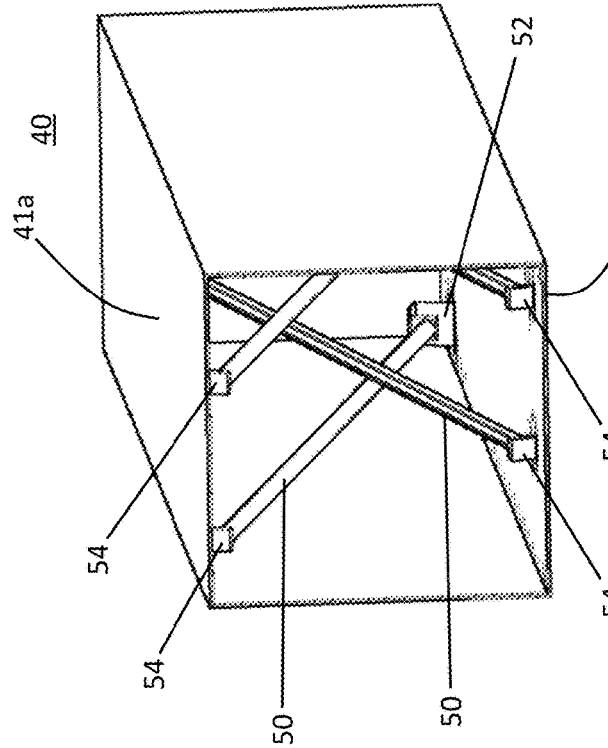
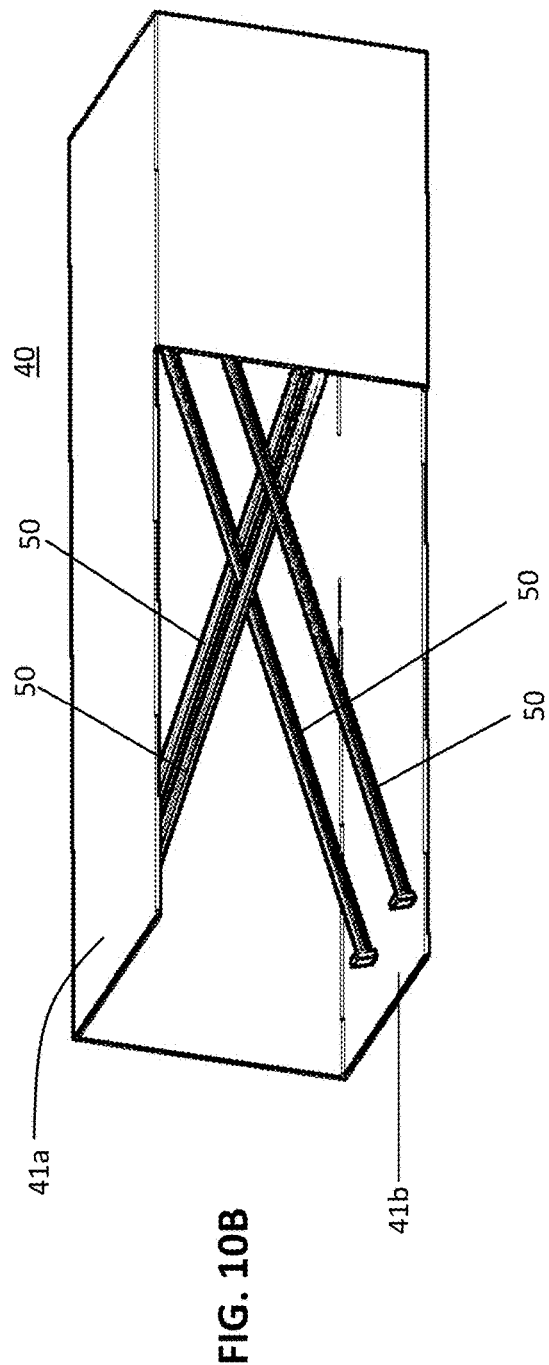
FIG. 10A
FIG. 10B

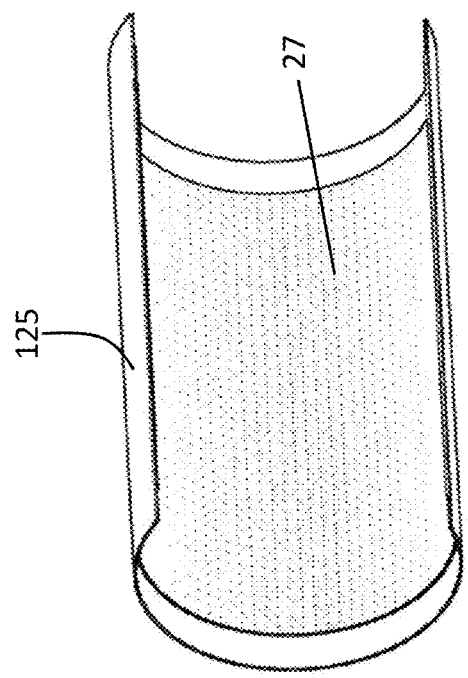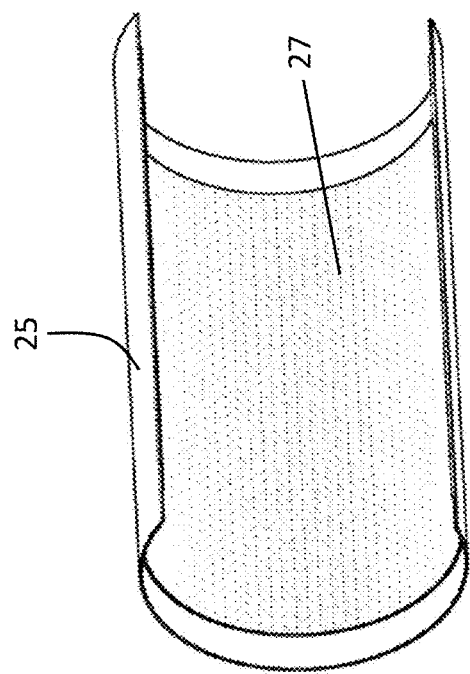
FIG. 11A
FIG. 11B

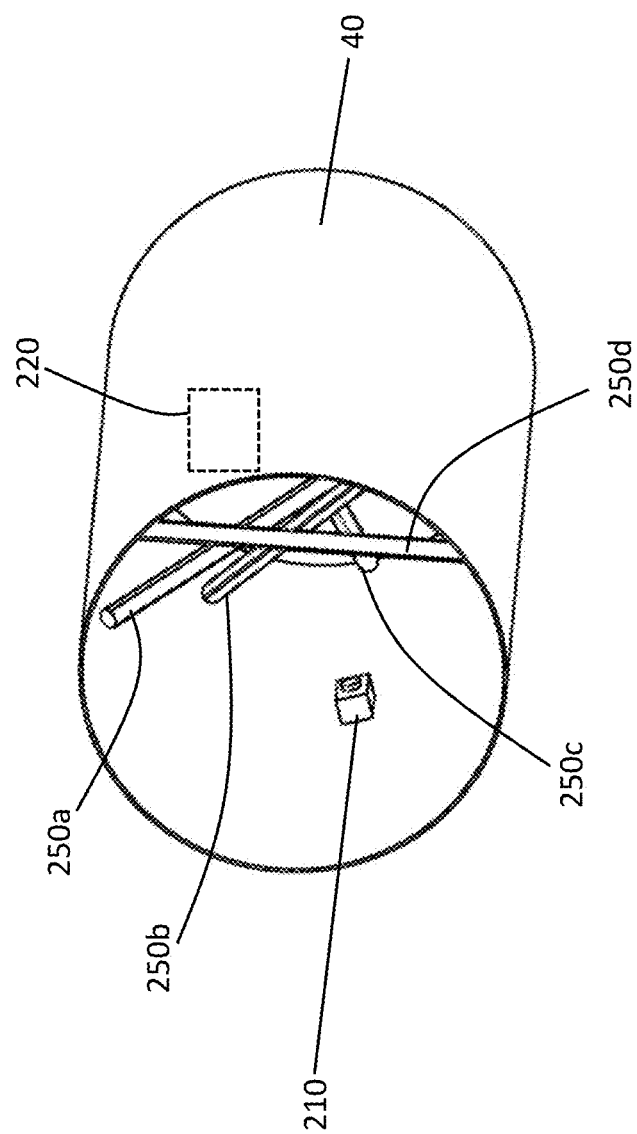

700

| Dashboard | Medical Group, Ltd. |
| Facilities | |
| Groups | Facility / Entity 1 |
| Treatments | North Wing: |
| Rooms | |
| Pathogens | |
| Sensors | |
| ADMIN: | |
| Reports | |
| Settings | |
| Log Out | |

North Wing:

| Name | Description | Pathogen | Min Dose | Max Dose | Last Treatment |
|---|---|---|---|---|---|
| Room 1N | 1 North Wing | Aspergillus niger (ATCC 16404) | - | - | 2022-10-01 |
| Room 2N | 2 North Wing | Aspergillus niger (Bacillus anthracis Sterne) | - | - | 2022-10-02 |

700

| | | | | | virus | microorganism | | |
| | | spore | bacterium | protozoan | | | | |
| | | 704a | 704b | 704c | 704d | 704e | | |
| | | species | strain | aka | lamp type | Lethal % dosage in MJ/cm3 | min dose | max dose |
| Dashboard | | | | | | | | |
| Facilities | | | | | | | | |
| Groups | | | | | | | | |
| Treatments | | bacillus subtilis | ATCC 6633a | hay or grass bacillus | LP | 90% [22 +/- 6]<br>99% [36 +/- 7]<br>99.9% [49 +/- 9]<br>99.99% [62 +/- 11] | - | - |
| Rooms | ← 704 | | | | | | | |
| Pathogens | | bacillus subtilis | ATCC 6633 | hay or grass bacillus | LP | 90% [12]<br>99% [18]<br>99.9% [24]<br>99.99% [30] | - | - |
| Sensors | ← 704 | | | | | | | |
| ADMIN: | | | | | | | | |
| Reports | | bacillus subtilis | ATCC 6633 | hay or grass bacillus | LP | 90% [25]<br>99% [39]<br>99.9% [50]<br>99.99% [60] | - | - |
| Settings | ← 704 | | | | | | | |
| Log Out | | | | | | | | |

FIG. 22B

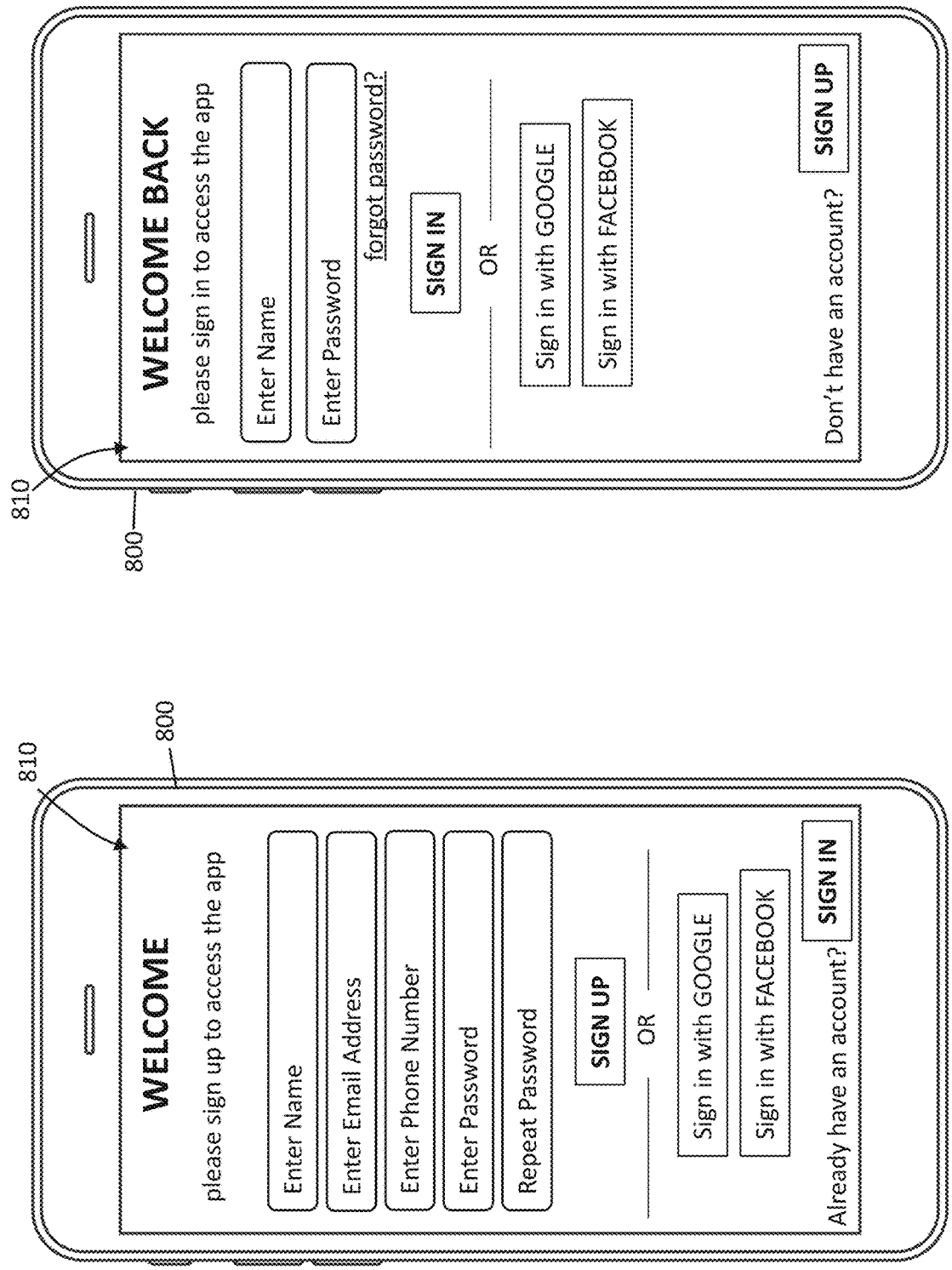

SYSTEM AND METHOD FOR ADMINISTERING AND MEASURING GERMICIDAL TREATMENTS WITH CLOUD-BASED MANAGEMENT AND CONTROL

CLAIM OF PRIORITY/CROSS-REFERENCE TO RELATED APPLICATION

The present application is a Continuation-In-Part (CIP) patent application of previously-filed, currently-pending U.S. patent application Ser. No. 17/530,532 filed on Nov. 19, 2021, which is a Continuation-In-Part (CIP) patent application of previously-filed, currently-pending U.S. patent application Ser. No. 17/096,193 filed on Nov. 12, 2020.

The contents of both of the above-referenced, prior-filed patent applications, namely, U.S. patent application Ser. No. 17/530,532 filed on Nov. 19, 2021 and U.S. patent application Ser. No. 17/096,193 filed on Nov. 12, 2020, are incorporated herein in their entirety by reference.

FIELD OF THE INVENTION

The present invention is generally directed to a system and method for monitoring, measuring, and in some cases, controlling one or more components or parameters of a disinfecting or germicidal system, including but not limited to an ultraviolet (UV) light system. Other embodiments disclosed herein are directed to a disinfection or germicidal chamber, which may be in the form of a duct assembly, configured to disinfect or sanitize air as it flows through the chamber.

BACKGROUND OF THE INVENTION

A number of floor and wall-mounted ultraviolet (UV) systems are known, but suffer from many defects and drawbacks which lead to ineffective or inefficient disinfecting or germicidal applications of the ambient air in a room. For example, many floor and wall-mounted ultraviolet light systems have an exhaust port that is close in physical proximity to the intake port. This defect creates many untreated zones of air in a room and/or uneven sanitizing of the air in the room.

In addition, some heating, ventilating and air conditioning (HVAC) systems may incorporate ultraviolet light intended to disinfect or sanitize the air as it circulates through the HVAC system and the building. One problem with this approach, however, is that a central HVAC system operates to provide heat or air conditioning to an entire building and air is oftentimes exchanged more often and more efficiently in some rooms than in other rooms, for example, depending on the distance the room is from the HVAC system, the size of the room, the number of HVAC vents, etc. Furthermore, since exposure time to a UV light source is critical to the effectiveness of disinfection and sanitization, an HVAC system would likely need to cycle air multiple times before a potentially effective sanitization can occur. However, since HVAC systems often do not stay turned on and may only cycle air when a thermostat signals for heating or cooling, these systems have significant inherent flaws, at least for purposes of providing disinfecting and sanitizing capabilities.

Accordingly, there is a need in the art for a more effective and more efficient system that can disinfect and sanitize the air in a single room or multiple rooms of a particular building or structure, whether residential or commercial.

The proposed system or assembly, of at least one embodiment disclosed herein, can mount to ceilings where other ductwork and electrical lines are located. Inlet and outlet vents can be spaced an optimal distance away from one another (e.g., over twenty feet apart). In addition, the proposed germicidal ducting assembly may be a stand-alone device not connected to an HVAC system, can run or operate continuously regardless of whether a thermostat has triggered the need for heating or cooling, and can be disposed in a single room or multiple rooms, which is not possible for floor and wall-mounted system.

Additionally, the energy output of ultraviolet lamps and light sources inherently degrade over time. For example, current shortwave ultraviolet (UVC) lamp disinfection systems have a lifetime of 8,000 to 16,000 hours. There are, however, a number of factors in addition to the rated lifetime of the lamp with nominal usages practices that can increase the degradation and therefore decrease the effectiveness of the UVC light source, including, for example, the number of times the light source is cycled on and off, the type of start process, e.g., preheat start, instant on start, etc. Accordingly, as a UVC lamp ages and as the lamp is used, its energy levels decrease and eventually the lamp will fail. Efficacy of a lamp to destroy pathogens is directly related to its UVC energy output. If the irradiance energy of a lamp or light source falls, it becomes less effective at destroying a pathogen, thus leaving the pathogens available to infect humans. For these, and potentially other reasons, UVC lamps are routinely replaced at some arbitrary time based on the supposition that they are no longer effective. Worse, in many cases, the UVC lamps are never changed and thus no longer perform as intended or expected.

More in particular, the current effectiveness of a UVC lamp or light source cannot be visually examined since the UVC radiation will damage the eyes. While there are some manual card-style dosimeters or electronic spectrometers that can be used to measure the energy of a lamp's output, these devices are expensive and must be manually placed and retrieved to obtain a reading. Instead, UVC lamps are often changed on an estimated maintenance cycle, which May not be accurate. Replacing the lamps too soon can cause unnecessary labor and expenses, while replacing the lamps too late result in an amount of time where the system was not operating effectively.

In addition, the distance between a surface to be disinfected and the source of the UV light has an impact on the effectiveness of the disinfection process. In particular, the Inverse Square Law can be used to quantify the loss of UV energy and efficiency at longer distances from the light source. Furthermore, rooms with similar areas and sizes are rarely, if ever identical, in that the rooms will often differ in dimensions, shapes, furnishings, shadows, angle of UV incidence, surface types and porosity, and UV reflectivity. In this manner, treatment distances and UV dosing levels may vary greatly from room to room.

Accordingly, UV sensitive paper or one-time dosimeter dots can be positioned around a room in an effort to provide an approximation of the dosing level at each position. These dots or paper are often used once when the first treatment is performed, and only sporadically or not at all after the first treatment.

This sporadic or one-time dosimeter dot use has an inherent and devastating flaw. For instance, the UV equipment (e.g., UV light sources) suffers from degradation over time, which is not visible to the human eye. Additionally, since the operator often cannot be present while the UV lamps or light sources are activated, one or more of the lamps may be completely out or not properly functioning or operating without the operator knowing.

Furthermore, dosimeter dots cannot be used to target specific pathogens. For instance, the dosimeter dots change colors as the mJ/cm² exposure increases. Typically, a dosimeter dot is designed to only indicate two or three discrete dose levels, which are often wide apart. For example, one dosimeter dot may measure 6 and 25 mJ/cm², while another may measure 25, 50 and 100 mJ/cm². The color shadings are subtle and often open to subjective interpretation. In some cases, if the operator has a color vision deficiency or is color blind, it may be difficult or even impossible for the operator to identify certain color shadings or changes in the dosimeter dots. Color determination may also be influenced by ambient lighting quality where being viewed, known or unknown vision problems of the person reading or interpreting them, and other color-effecting problems or factors. Since each pathogen requires a specific dosing level to be neutralized, levels which may differ by as little as 1 mJ/cm², dosimeter dots cannot be used to effectively target specific pathogens.

Moreover, it is also worth noting that room treatment when determined by dosimeter dots is time based and not based on actual dose level. For instance, if 20 mJ/cm² is desired, then an approximation of the duration time for treatment is determined from the time required to reach 25 mJ/cm² on a dot. This now becomes an approximation of a subjective, and often flawed, value.

Another technique for measuring UV energy or dosing in a room may be through the use of a traditional UV meter. These are simple devices that are programmatically static and perform only one function. Operationally, technicians who deploy and set up mobile UV disinfection systems may accidentally or deliberately cut treatment time short, or they may likewise miss or ignore a room or area that has been exposed to pathogenic organisms. Even the positioning misplacement of mobile units in a room from its predetermined location will affect the treatment level. For example, if treatment time was determined by a dosimeter dot or UV meter, then placing the mobile unit in a different location than where it was during measurement negate the intended dosing plan due to the Inverse Square Law. One or all of these scenarios are possible at any time, thereby leaving rooms and areas only partially treated or not treated at all.

Accordingly, there is a need in the art for a system and method for monitoring and managing UV dose levels in real-time to achieve the minimum lethal dose levels that can, in some cases or embodiments, be user-defined for specific pathogens. The proposed system and method may utilize the integration of one or more sensors, controllers, wired and/or wireless communications, remote or cloud-based storage and retrieval, sensor location identifiers, and notification and signaling techniques. This will, among other features and benefits, enhance UV disinfection devices and processes for optimal pathogen destruction.

In addition, the proposed system and method may extend the maintenance period and remove the guess work from determining the effectiveness of a UV lighting and germicidal system. For instance, in some embodiments, the proposed system and method will incorporate sensors, controllers and one or more back-up or reserve UV light sources. When the sensors detect low efficiency or low UV energy, the controller, or other component(s) of the system and method, May automatically activate a back-up or reserve UV light(s) and in some cases can generate a signal indicating that maintenance (e.g., replacing the lamps) is recommended or required.

SUMMARY OF THE INVENTION

Accordingly, at least one embodiment of the present invention is directed to a germicidal duct assembly. Other embodiments presented herein are directed to systems and/or method of conducting germicidal treatment within a room or other chamber and/or of measuring and monitoring the treatment with the use of one or more sensors, a remote management system or cloud server, and in some cases, a mobile device.

As described herein, several embodiments of the present inventions disclose the use of ultraviolet light, for example, from one or more ultraviolet lamps or light sources. Ultraviolet (sometimes referenced as UV) radiation is a form of radiation that is measured on the electromagnetic (EM) spectrum. There are several forms of UV radiation or UV light defined as UVA, UVB and UVC light or radiation often defined by the corresponding wavelengths measures in nanometers (nm). More specifically, UVA light or radiation is often defined as having a wavelength of approximately 315 nm to 400 nm; UVB light or radiation is often defined as having a wavelength of approximately 280 nm to 315 nam; and UVC light or radiation is often defined as having a wavelength of approximately 100 nm to 280 nm. In general, UVC light or radiation is known to be an effective disinfectant for air, water and nonporous surfaces, however, in some instances, UVA and UVB can also provide effective disinfection properties. Accordingly, the term ultraviolet or UV, as used herein, can include any of the UV light or radiation forms, such as UVA, UVB or UVC. Furthermore, when any one of the UV forms is mentioned herein, such as UVA, UVB or UVC, it is contemplated that the other forms may be substituted or used as well. More specifically, if UVA is mentioned herein, this includes UVB and/or UVC unless specifically started otherwise; if UVB is mentioned herein, this includes UVA and/or UVC unless specifically stated otherwise; and if UVC is mentioned herein, this includes UVA and UVB unless specifically stated otherwise.

In any event, as provided herein, the germicidal duct assembly embodiment includes an inlet assembly, an irradiation chamber, and an outlet assembly. The germicidal duct assembly can be installed in or on ceilings and operates independent of any HVAC or other system. In other words, the assembly of at least one embodiment can be structured to effectively provide active, localized ventilation and disinfecting/sanitizing in single room or multiple rooms.

More specifically, the inlet assembly may include at least one flexible, semi-rigid or rigid inlet duct or tube connected at one end to the irradiation chamber and at the other end to an inlet vent. A fan can be used to draw air or otherwise facilitate the flow of air into the inlet assembly and to the irradiation chamber where the air will be exposed to a germicidal source, including, but not limited to ultraviolet light emitted by one or more ultraviolet light sources. In some cases, multiple inlet ducts can be connected to a single irradiation chamber, such that air from multiple locations (whether in the same room or different rooms) can be directed into the irradiation chamber. In such a case, each of the inlet ducts can include one or more inlet fans such that air can be drawn into each of the separate inlet ducts.

Similarly, the outlet duct may include at least one flexible, semi-rigid or rigid outlet duct or tube connected at one end to the irradiation chamber and at the other end to an outlet vent. A fan can be used to facilitate the flow of air from the irradiation chamber, through the outlet duct and into the room. In some cases, multiple outlet ducts are connected to a common or single irradiation chamber, such that disinfected or sanitized air can be distributed to multiple locations (whether in the same room or different room). In such a case, each of the outlet ducts or outlet assemblies can include one or more fans such that air can be directed from the irradiation chamber through each of the outlet ducts.

Furthermore, the irradiation chamber of the at least one embodiment of the present invention comprises at least one ultraviolet light source disposed within an interior portion thereof. Instead of, or in addition to the at least one ultraviolet light source, some embodiments may include a bipolar ionization source or generator, a photocatalytic oxidation (PCO) source or generator, or other germicidal sources or air purification systems. In some embodiments, the ultraviolet light source(s) or other germicidal sources have an elongated configuration and are disposed in an oblique manner relative to a longitudinal axis of said irradiation chamber. In the case of ultraviolet light sources, this ensures that some UV light shines into or is emitted into the inlet assembly, e.g., into the inlet duct(s) and/or an optional connecting pipe, and/or into the outlet assembly. This increases the exposure time of the air as it travels through the inlet ducts to irradiation chamber and out of the outlet ducts.

In some embodiments, a reflecting material or surface is provided on any one or more of the interior of the inlet duct(s), the interior of a connecting pipe, the interior of the irradiation chamber, and/or the interior of the outlet duct. For instance, in at least one embodiment, the reflective material or surface may include a diffusely reflective surface, thereby causing Lambertian reflectance within the assembly. The reflective material or surface acts similar to a photomultiplier or diffuser to direct the iridescence energy more evenly and widely throughout the pipe(s), duct(s) or tube(s), and may in some instances increase the iridescence energy in the pipe(s), duct(s) or tube(s). As just an example, the reflecting material or surface of at least one embodiment may be constructed of or otherwise include polytetrafluoroethylene (PTFE), although other reflective or diffusing materials are contemplated.

Furthermore, in other embodiments, the present invention is directed to or otherwise includes one or more sensors, including but not limited to a UV sensor, UV wavelength sensor, sensors of other electromagnetic wavelengths, fluid (e.g., air or water) flow rate sensors or meters, temperature sensors, time sensors (e.g., to record the total UV lamp operating hours), humidity sensors, pressure sensors, etc. The one or more sensors can be communicatively connected (e.g., wired or wirelessly) to a controller or circuitry that compares the measured energy, time, fluid flow, or other measured amount with a predetermined minimum or maximum threshold amount. The predetermined minimum or maximum threshold amount(s) may be defined by a user or preset by the manufacturer or operator. When the measured UV energy, UV dose level or other measurements recorded or measured by the one or more sensors exceeds a maximum or falls below the minimum level, corrective action, non-corrective action, or one or more notifications may be initiated.

As an example, in one embodiment, backup or reserve UV light sources can be automatically activated or turned on in order to increase the UV energy level. For example, the active UV light sources can either remain on (and therefore continue to produce some UV light) or be disconnected when the backup or reserve lights are turned on or activated. The sensors and system can then continue to monitor the UV energy output level to determine if or when additional maintenance (e.g., replacing the light sources or lamps) is needed or if available, additional backup or reserve lights are activated.

In addition, one or more light emitting diode(s), LED(s), indicator lamp(s) or display(s) can be installed or mounted on the system or in a separate remote location to indicate the current UV energy or dose level, when maintenance is required or recommended, or the general status of the system.

In this manner, the system and method of at least one embodiment can provide for continuous, effective disinfection of pathogens by maintaining desired UV energy, dosing or other levels. It also extends the need to replace lamps by having an automated backup lamp system that can provide for visual or audible indication that the lamps are nearing the end of their life cycle. One or more reports can also be generated providing information as to various information and/or data pertaining to the UV lamps, such as, the total output time (e.g., the total time the UV lamps have been on), output levels, time schedules, etc.

In some embodiments, a cloud-based or remote management system communicative with the one or more controllers may also be implemented. In particular, the sensor(s) may measure energy or dose levels of UV in the treatment chamber (or other parameters as indicated herein) and communicate those measurements along with an identifier, for example, to the remote management system. In some cases, the identifier is location-specific (or otherwise unique to a particular location) and can be used to report the precise location of the sensor in the treatment chamber or room. User-defined or manufacturer-defined minimum and/or maximum parameters (e.g., energy levels, dose levels, time schedules, etc.) may be entered into or stored by the cloud/remote management system or locally (e.g., at the controller) via a human machine interface.

In the event a parameter or measurement falls below the minimum threshold or exceeds a maximum threshold, an action (e.g., a corrective action, non-corrective action, notification, etc.) may be taken, either automatically or manually, by the controller, remote management system, a data or email server, or other connected device. It should be noted that exceeding the maximum dose level for a particular location could mean that the treatment overexposes furniture, equipment, etc., which can discolor or breakdown materials. Further, the time used to overdose a location or room takes way time that could be used to treat other rooms or locations. In other words, overdosing can reduce the disinfection productivity of a technician or of the equipment used for the treatment.

For example, the action taken may be corrective to bring a parameter back into compliance with the threshold setting (e.g., increasing air flow through a fan, decreasing air flow through a fan, increasing UV output, decreasing UV output, etc.) and/or the action taken can be a message, signal, notification, alert (audible and/or visible), etc.

Furthermore, the one or more sensors or controllers of at least one embodiment may be placed in either a fixed location of a room or chamber, or may be moved from room to room, building to building or location to location. During a germicidal or UV session, each sensor May have a defined location regardless if the sensor is fixed or movable. For instance, when the sensor is fixed to a location and activated, the sensor's unique identifier (e.g., serial number, unique ID) may be used and transmitted to the remote management system for tracking the data obtained or measured by the sensor. When the sensor is movable, a location-specific identifier may be used to identify the location of the sensor during measurement times (e.g., during the germicidal or UV treatment session).

As just an example, in at least one embodiment, specific location identifiers can be generated or obtained by quick response codes (QR codes), bar codes, RFIDs, or other machine readable codes. When the sensor is moved to a different or new location (e.g., between germicidal or UV sessions), the machine-readable code at or associated with the new location is scanned or read, and the location specific identifier obtained therefrom is used or communicated with the measurements recorded in order to identify where the measurements were recorded.

Unlike dosimeter dots and UV meters, placement location of the UV source is not an issue with the use of the sensors and controllers of at least one embodiment of the present invention. For instance, if a specific dose was estimated by a dosimeter dot when the UV source was in a first location, then if the UV source is placed in a second, different location during the treatment session or during the next treatment session, the energy or dose levels around the room will be altered and not at the desired dosing level. Using the cloud or remote management system, controller and sensors of at least one embodiment of the present invention, however, if the specific minimum dose is entered into the database or HMI for an exact room and location, the sensor will measure and report the real-time dose it receives, regardless of a change in the UV source's location. User defined and/or predetermined actions can then be taken, if necessary and in accordance with certain embodiments of the present invention.

It should also be noted that cloud-based control has a number of benefits and functions that is not found in other stand-alone UV systems and devices. For example, cloud-control using the remote management system described herein can allow immediate response to (1) a local, regional or global pathogen crises, (2) pathogens that are endemic to specific geographic regions, or (3) even when a different pathogen treatment is needed between patient change-overs in a hospital room, for example. More specifically, a managing user at a hospital or nursing home could change a room's dose to one level after a COVID patient leaves, and then change it again if the next patient had tuberculosis, and so on. The controller or sensor of at least one embodiment may be able to download or otherwise receive from the remote management system each new dose level or other parameter or threshold when the next UV treatment is started, and then take any appropriate action, if necessary, for example, if the treatment was inadequate.

Furthermore, knowledge by a user of the minimum lethal UV dose for a specific pathogen may not be required. For instance, the remote management system or cloud server could include a list of pathogens with their minimum lethal UV dose. A user could simply select the pathogen or pathogens to be treated and the management system would communicate the appropriate dose to the controller(s).

In certain embodiments or implementations of the present invention, the controller(s), sensor(s) and/or management system along with the communication architecture therebetween may operate autonomously. In other words, their function may not depend on any other device(s). As such, the system and method of at least one embodiment may be used in a universal manner with any manufacturers' UV surface or air treatment devices. Certain embodiments of the invention can, however, manage other devices, such as, an external relay connected to the controller that may be used to turn off power to connected UV sources, for example, once a minimum UV dose threshold has been reached. The thresholds or parameters of multiple sensors can be used to collectively determine when power should be disconnected to a light source, such as a UV lamp, a fan, or other component(s).

Moreover, as a function of the ability for the system and method of at least one embodiment to connect both wirelessly and wired using open standards, integration with any third-party UV device's controls may be possible. For example, robotic UV floor units are often programmed to move from one location to the next after each defined treatment duration. This movement is time schedule based and occurs regardless of whether a lethal UV dose has been applied in all areas. With integration when one or more sensors of the present invention reaches the minimum thresholds, a command could be issued by the controller or management system to the robot to move to the next location.

These and other objects, features and advantages of the present invention will become more apparent when the drawings as well as the detailed description are taken into consideration.

BRIEF DESCRIPTION OF THE DRAWINGS

FIG. 1A is an elevation view of the germicidal duct assembly as disclosed in accordance with at least one embodiment of the present invention.

FIG. 1B is an exploded view of the germicidal duct assembly illustrated in FIG. 1A.

FIG. 2A. is an elevation view of the germicidal duct assembly as disclosed in accordance with another embodiment of the present invention.

FIG. 2B is an exploded view of the germicidal duct assembly illustrated in FIG. 2A.

FIG. 8 is an end view of the irradiation chamber of another embodiment with three UV light sources.

FIG. 10A is a perspective view of the irradiation chamber of yet another embodiment of the present invention.

FIG. 10B is a cut away view of the irradiation chamber illustrated in FIG. 10A.

FIG. 11A is a partial cut-away view of the connecting pipe illustrating a reflective surface or material disposed therein in accordance with at least one embodiment of the present invention.

FIG. 11B is a partial cut-away view of the inlet duct illustrating a reflective surface or material disposed therein in accordance with at least one embodiment of the present invention.

FIG. 12B is a perspective view of the irradiation chamber of at least one embodiment of the present invention illustrating a plurality of UV light sources, at least one sensor and at least one controller.

FIG. 22A is a schematic of an exemplary screenshot of a management backend tool as disclosed in accordance with at least one embodiment of the present invention.

FIG. 22B is a schematic of an exemplary screenshot of a management backend tool showing a list of pathogens as disclosed in accordance with at least one embodiment of the present invention.

FIG. 24A is an exemplary screenshot of a mobile application and mobile device showing a sign up screen in accordance with at least one embodiment.

FIG. 24B is an exemplary screenshot of a mobile application and mobile device showing a sign in screen in accordance with at least one embodiment.

Like reference numerals refer to like parts throughout the several views of the drawings provided herein.

DETAILED DESCRIPTION OF THE INVENTION

Figure 3B:
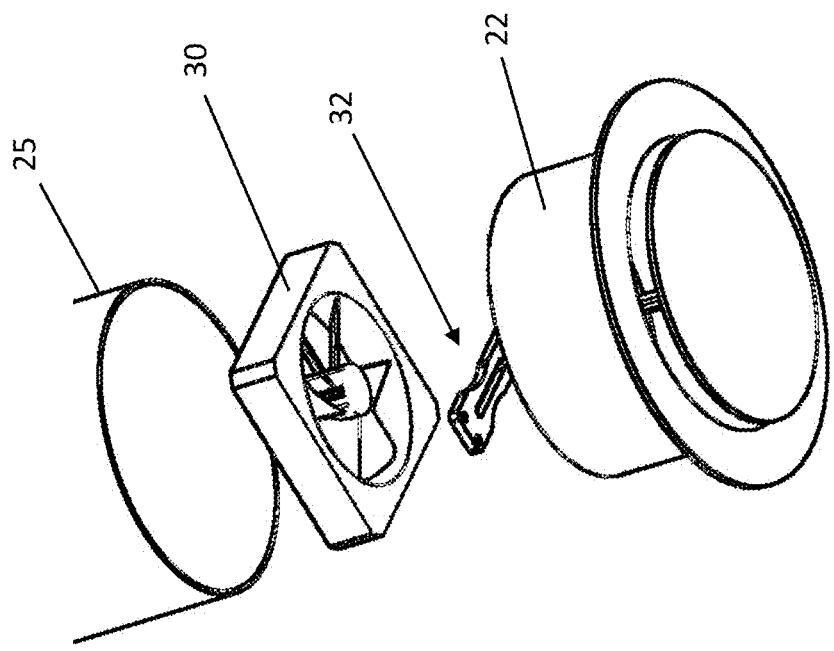
FIG. 3B is another exploded perspective view of the inlet vent, inlet fan and a portion of the inlet duct as disclosed in accordance with another embodiment of the present invention.
Figure 3A:
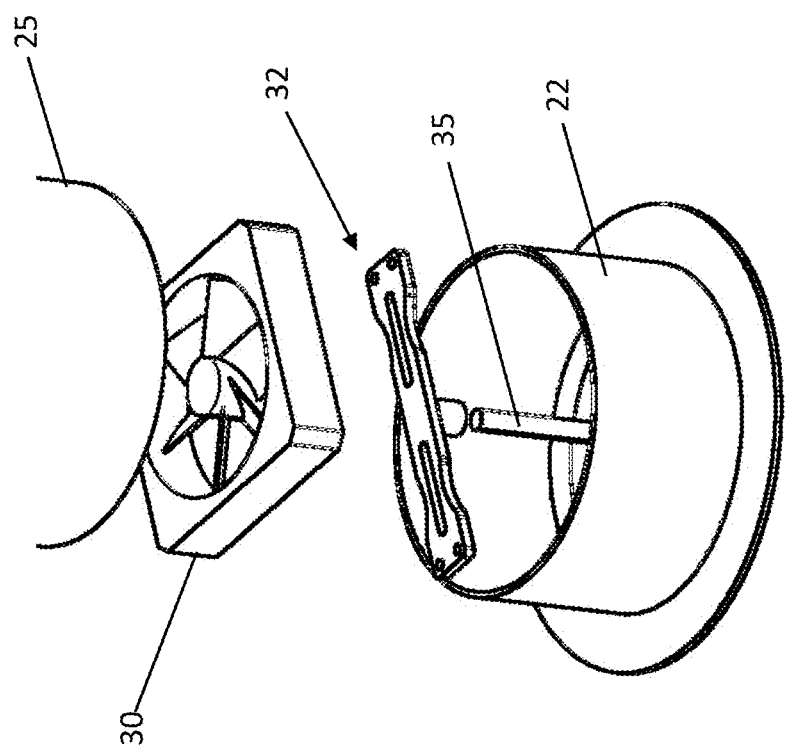
FIG. 3A is an exploded perspective view of the inlet vent, inlet fan and a portion of the inlet duct as disclosed in accordance with another embodiment of the present invention.
Figure 4A:
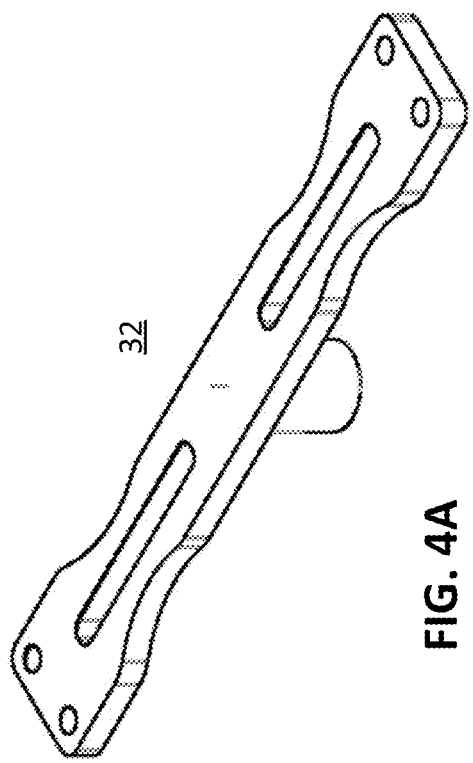
FIG. 4A is a perspective view of the fan mount as disclosed in accordance with at least one embodiment of the present invention.
Figure 4B:
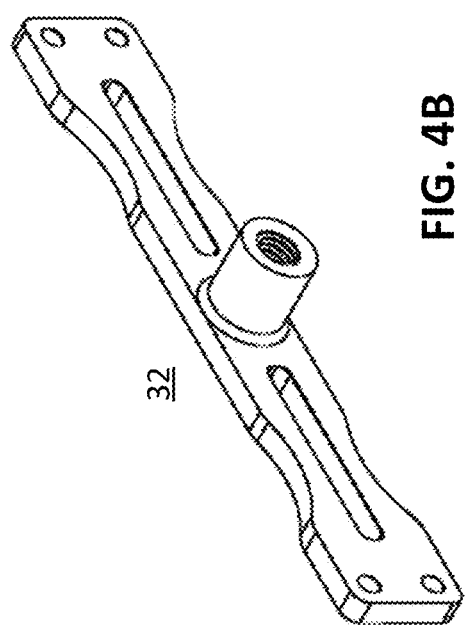
FIG. 4B is another perspective view of the fan mount illustrated in FIG. 4A.
Figure 4C:
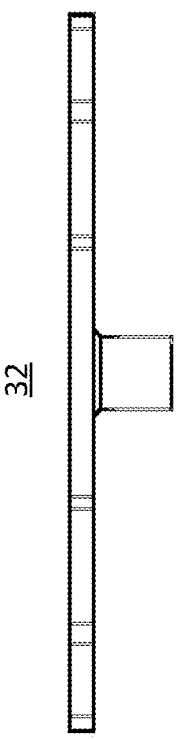
FIG. 4C is an elevation view of the fan mount illustrated in FIGS. 4A and 4B.

As shown in the accompanying drawings, and with particular reference to FIGS. 1A and 2A, at least one embodiment of the present invention is generally directed to a disinfecting or germicidal duct assembly referenced as 10. Other embodiments disclosed herein, and referenced below for example in FIGS. 13 through 20, are directed to systems 200, 400 and methods 300, 500 for detecting and measuring germicidal treatment of a treatment chamber, which may include one or more rooms of a house, building or other structure.

Specifically, with reference to FIGS. 1A and 2A, for example, the duct assembly 10 of certain embodiments of the present invention is a stand-alone, independent or local system that uses a germicidal source, such as, for example ultraviolet (UV) light, including but not limited to shortwave ultraviolet light (often referred to as UVC light) or light having a wavelength in the range of approximately 100 nm to 280 nm, to disinfect or sanitize air as the air flows through the assembly 10 and is exposed to the UV light. In other words, the assembly 10 of at least one embodiment is not part of or connected to a standard heating, ventilation and air conditioning (HVAC) system, but rather operates, creates a flow of air and disinfects on its own and independent of any HVAC or other external systems.

It should be noted that other germicidal or disinfecting sources can be used in connection with the various embodiments disclosed herein instead of or in addition to one or more UV light sources. For example, the germicidal or disinfecting source(s) may include bipolar ionization sources, generators or other technology. More in particular, bipolar ionization sources put positive and negative ions into the air that can then be distributed into one or more rooms in connection with the duct assembly of the present invention. The ions can then kill or inactivate bacteria, viruses, mold, volatile organic compounds (VOC), odors, and cause minute particles in the air to coalesce into larger particles that can be caught by an air filter. Furthermore, other germicidal or disinfecting sources that can be used may include photocatalytic oxidation (PCO) sources or generators, for example.

Furthermore, the duct assembly 10 of at least one embodiment of the present invention is intended to be installed or mounted overhead, for example, above or within a drop ceiling, as generally referenced as 12 in FIGS. 1A and 2A (e.g., in a classroom, office, senior care home, etc.) or on or in open ceilings (e.g., often found in retail stores, restaurants, warehouses, manufacturing plants, etc.).

Still referring to FIGS. 1A and 2A, for example, the disinfecting duct assembly 10 of at least one embodiment includes an inlet assembly 20, an irradiation chamber 40, and an outlet assembly 60. As will become apparent from the disclosure provided herein, air (for example, from a room in a building, home or other structure) flows or is drawn into the inlet assembly 20, as shown by reference arrow A1, through the irradiation chamber 40, and out of the outlet assembly 60, as shown by reference arrow A2 (for example, back into the same room or into a different room.)

One or more disinfecting or germicidal sources, such as, for example, a germicidal light sources is/are disposed within the irradiation chamber 40, such that, as the air flows through the irradiation chamber 40, the air is exposed to the disinfecting or germicidal source, such as ultraviolet light emitted by the light source(s), which in turn will disinfect or sanitize the air. The disinfected or sanitized air will then flow through the outlet assembly 60 and back into the room or into a different room.

In this manner, it should be noted that the disinfecting duct assembly 10 of at least one embodiment may be disposed in a single room (e.g., such that air from the room will flow into the assembly 10 and back into the same room) or span across multiple rooms (such that air from one or more rooms will flow into the assembly 10 and out into one or more different rooms).

In any event, referring to FIGS. 1A through 2B, the irradiation chamber 40 of at least one embodiment includes a first end 40a connected to the inlet assembly 20 and a second end 40b connected to the outlet assembly 60. The inlet assembly 20, irradiation chamber 40 and outlet assembly 60 collectively define an interior pathway through which the air is able to flow. As just an example, the irradiation chamber 40 may be constructed of an elongated, cylindrical pipe or rectangular duct, such as, but not limited to a galvanized steel round pipe or rectangular duct. In some embodiments, the irradiation chamber 40 may be twenty-four to sixty inches in length and have a twelve inch diameter, although other shapes, sizes and materials are contemplated within the full spirit and scope of the present invention.

Moreover, the inlet assembly 20 of at least one embodiment includes one or more inlet ducts 25 constructed out of or otherwise including one or more flexible, semi-rigid or rigid ducts, pipes, or tubes (e.g., a standard HVAC duct) and can include an inlet vent 22 or opening at an inlet end 20a thereof. As just an example, the inlet duct(s) 25 may be a six inch diameter flexible round duct, although other sizes, shapes and materials are contemplated. For instance, the inlet duct(s) 25 may be flexible and therefore easily positionable or movable, while in other embodiments, the inlet duct(s) 25 may be rigid or semi-rigid.

In some cases, a coupler, such as an end cap, reducer or increaser can be used or disposed at the first end 40a of the irradiation chamber 40 to facilitate connection between the inlet assembly 20 and the irradiation chamber 40. For example, if the connecting diameter of the inlet assembly 20 is smaller than the connecting diameter of the irradiation chamber 40, a coupler 42a or increaser may be needed such that one end of the coupler 42a is sized and configured to connect to the inlet assembly 20 and the other end of the coupler 42a is sized and configured to connect to the irradiation chamber 40.

It should also be noted that, although not shown in the drawings, the inlet assembly 20 can include a plurality of inlet ducts 25 each having separate inlet vents 22 and each connected to or independently communicative with the irradiation chamber 40. For example, the single end of a "Y" shaped connector (not shown) can connect to the first end 40a of the irradiation chamber 40 such that two (or more) separate inlet ducts 25 can connect to the irradiation chamber 40, thereby allowing air from two (or more) separate locations (either in the same room or different rooms) to enter into the same irradiation chamber 40.

In addition, with reference to FIGS. 1B, 2B and 3A through 4C, for example, the inlet assembly 20 of at least one embodiment includes an inlet fan 30 structured and configured to draw air into or otherwise facilitate the flow of air into the inlet assembly 20. As an example, the inlet fan 30 may be mounted to the inlet vent 22 with a mounting bracket 32. In this manner, air will be drawn through the opening(s) 23 of vent 22 by the fan 30 and pass or flow through the inlet assembly 20 to the irradiation chamber 40. The mounting bracket 32, for example, may attach to a rod 35 which extends from the vent 22. Mounting holes or slots in the bracket can then be used to mount the fan 30 thereto. It should be noted, however, that the inlet fan 30 can be connected to the assembly 10 along virtually any portion of the inlet assembly 20 for facilitating the flow of air into the inlet assembly 20 as provided in accordance with a number of embodiments disclosed herein.

Some embodiments of the inlet assembly 20, however, may not need or have an inlet fan 30. For example, as disclosed below, the outlet assembly 60 of some embodiments may include one or more outlet fans 70. In some cases, the outlet fan(s) 70 may be large enough or powerful enough to draw air into the inlet assembly 20 such that additional inlet fan(s) 30 may not be necessary.

Further, the outlet assembly 60 of at least one embodiment includes one or more outlet ducts 65 constructed out of or otherwise including one or more flexible or rigid ducts, pipes, or tubes (e.g., a standard HVAC duct) and can include an outlet vent 62 or opening at an outlet end 60B. As just an example, the outlet duct(s) 65 may be a six inch diameter flexible round duct, although other sizes, shapes and materials are contemplated. For instance, similar to the inlet duct(s) 25, the outlet duct(s) 65 of some embodiments may be flexible and therefore easily positionable or movable, while in other embodiments, the outlet duct(s) 65 may be rigid or semi-rigid.

Further, in some cases, a coupler, such as an end cap, reducer or increaser can be used or disposed at the second end 40b of the irradiation chamber 40 to facilitate connection between the outlet assembly 60 and the irradiation chamber 40. For example, if the connecting diameter of the outlet assembly 60 is smaller than the connecting diameter of the irradiation chamber 40, a coupler 42b or reducer may be needed such that one end of the coupler 42b is sized and configured to connect to the irradiation chamber 40 and the other end of the coupler 42b is sized and configured to connect to the outlet assembly 60.

It should also be noted that, although not shown in the drawings, the outlet assembly 60 can include a plurality of outlet ducts 65 each having separate outlet vents 62 and each connected to or independently communicative with the irradiation chamber 40. For example, the single end of a "Y" shaped connector, not shown, can connect to the second end 40b of the irradiation chamber 40 such that two (or more) separate outlet ducts 65 can connect to the irradiation chamber 40, thereby allowing disinfected air to flow out of the irradiation chamber 40 and into two or more separate locations (either in the same room or different rooms).

Figure 5:
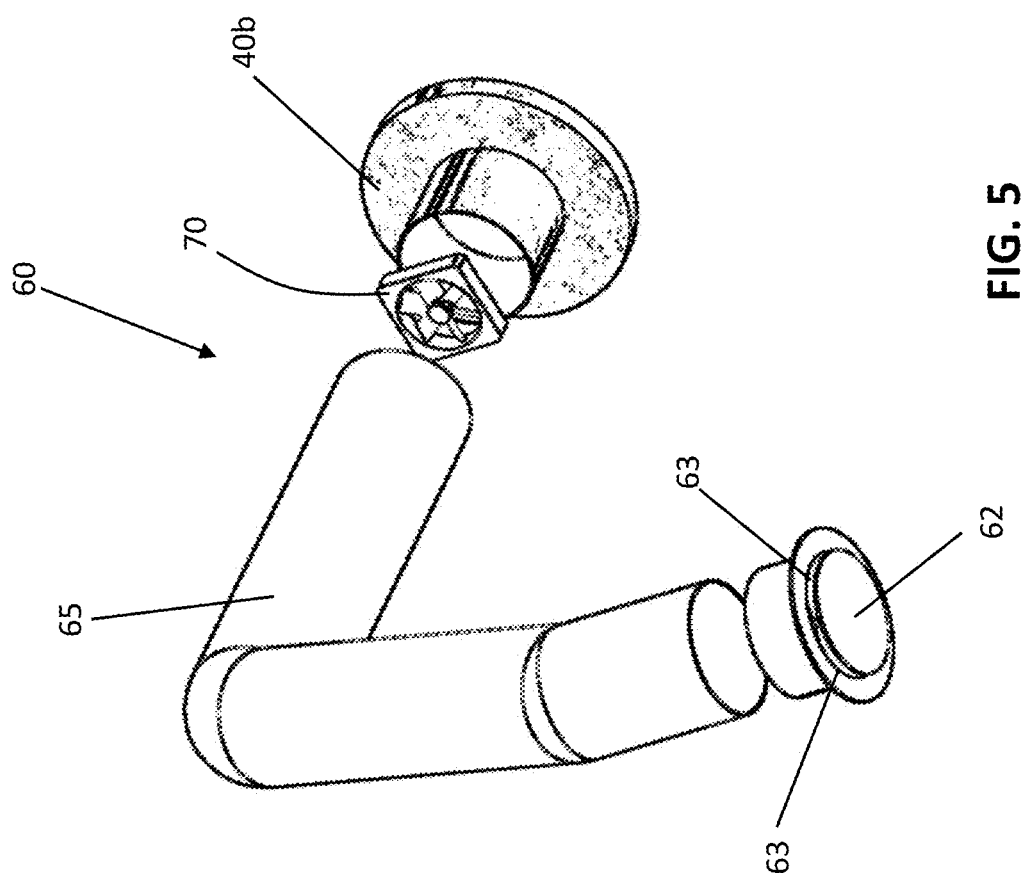
FIG. 5 is a perspective exploded view of the outlet assembly and coupler as disclosed in accordance with at least one embodiment of the present invention.

In addition, with reference to FIGS. 1B, 2B, and 5, for example, the outlet assembly 60 of at least one embodiment includes an outlet fan 70 structured and configured to facilitate the flow of air out of the irradiation chamber 40 and/or out of the outlet assembly 60. As an example, the outlet fan 70 may be mounted proximate the second end 40b of the irradiation chamber, for example, to or within coupler 40b which extends from or is otherwise attached to the irradiation chamber 40. In this manner, disinfected air will flow out of the irradiation chamber 40 via the fan 70 and through the opening(s) 63 of vent 62.

Some embodiments of the outlet assembly 60, however, may not need or have an outlet fan 70. For example, as disclosed above, the inlet assembly 20 of some embodiments may include one or more inlet fans 30. In some cases, the inlet fan(s) 30 may be large enough or powerful enough to draw air into the inlet assembly 20 and direct the air through the irradiation chamber 40 and out of the outlet assembly 60 such that additional outlet fan(s) 70 may not be necessary.

In this manner, the germicidal duct assembly 10 of at least one embodiment includes at least one fan 30, 70 disposed in or proximate the inlet assembly 20 (e.g., an inlet fan 30) and/or disposed in or proximate the outlet assembly 60 (e.g., an outlet fan 70).

Figure 6:
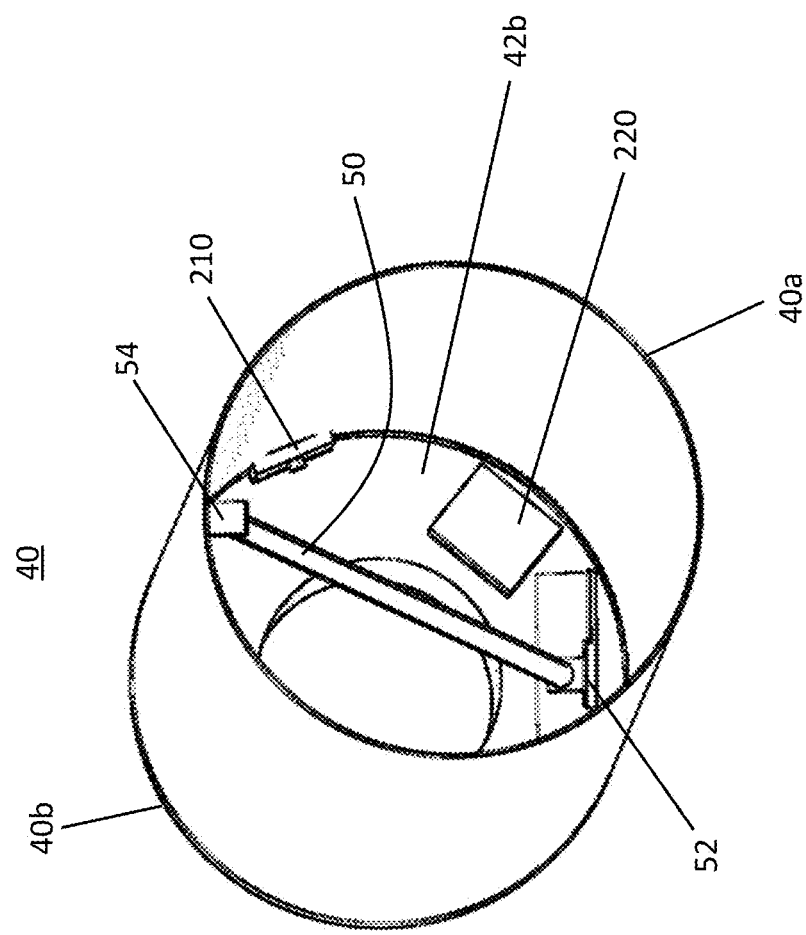
FIG. 6 is a cut-away, perspective view of the irradiation chamber as disclosed in accordance with at least one embodiment of the present invention.

In any event, with reference now to FIG. 6, the irradiation chamber 40 of at least one embodiment includes at least one disinfecting or germicidal source, such as a disinfecting or germicidal light source 50 disposed therein. In particular, the disinfecting or germicidal light source 50 of at least one embodiment is a light bulb, light tube, light emitting diode (LED) light or other structure that emits germicidal ultraviolet light. More specifically, in at least one exemplary embodiment, the disinfecting or germicidal light source 50 is structured to emit short wavelength ultraviolet light (UVC light) or light having a wavelength in the range of approximately 100 nm to 280 nm, although light having other wavelengths may be used.

For instance, the disinfecting or germicidal light source 50 of at least one embodiment May be mounted to an inside surface of one of the couplers 42a, 42b and extend inward through at least a portion of the irradiation chamber 40. As an example, one or more mounting holes may be provided in coupler 42b, to which a light socket 52 can be mounted. The light source or bulb 50 can then connect or mount to the socket 52 and extend within the irradiation chamber 40. A support mount 54 may be secured to the opposing end of the light source 50, as shown in FIG. 6, for example. The support mount 54 may be attached or mounted to an inside surface of the irradiation chamber 40, to the first coupler 42a or other location spaced a distance from the socket 52.

In some instances, the light source(s) 50 include(s) an elongated configuration (e.g., as shown in FIG. 6, and can extend at least substantially along the length of the irradiation chamber 40. More specifically, the light source(s) 50 may begin at or near one coupler 42b and extend into and through the irradiation chamber 40 to the other coupler 42a or proximate the other coupler 42a, for example, at first end 40a of the irradiation chamber 40. In particular, in some cases, as shown in FIG. 6, the end or support mount 54 may connect to the inside surface of the irradiation chamber 40 proximate the first end 40a thereof.

Figure 7B:
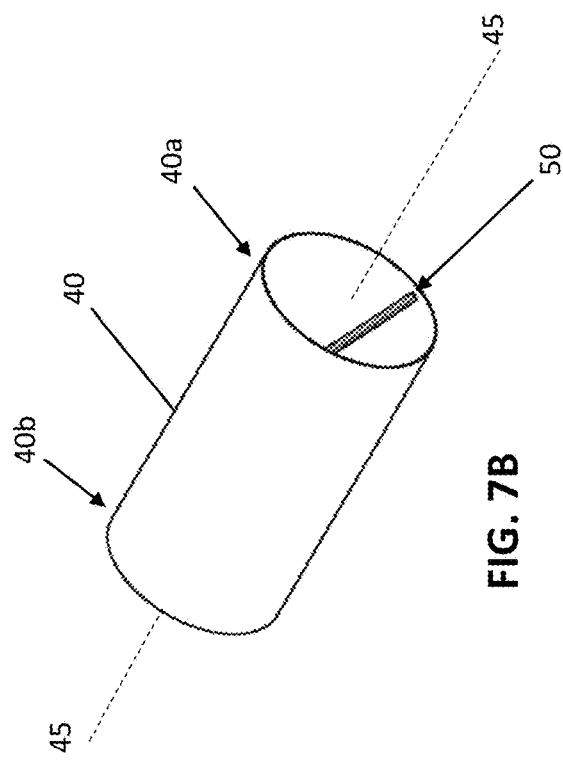
FIG. 7B is a perspective view from the first end of the irradiation chamber shown in FIG. 7A.

In addition, the one or more light sources 50 of at least one embodiment is/are disposed in an oblique, staggered or angled manner relative to a longitudinal axis 45 of the irradiation chamber 40. More specifically, in at least one embodiment, the irradiation chamber 40 comprises a tube-like configuration defined as a cylinder with opposing ends, such as first end 40a and second end 40b. With reference to FIGS. 7A and 7B, a longitudinal axis 45 is defined as extending longitudinally through the center of the chamber 40, as illustrated.

More specifically, the oblique disposition of the one or more light sources 50 is such that the elongated light sources is/are not parallel to the longitudinal axis 45 of the irradiation chamber 40. This angular, staggered or oblique positioning of the light source(s) 50 allows the emitted germicidal ultraviolet light to shine or travel at least partially into the inlet assembly 20. By doing so, the air that travels or flows through the assembly 10 of at least one embodiment of the present invention may be exposed to the germicidal ultraviolet light prior to entering or flowing into the irradiation chamber 40, as well as while the air is in the irradiation chamber 40. This provides additional exposure time to the air that flows through the assembly 10 of certain embodiments of the present invention.

Figure 7C:
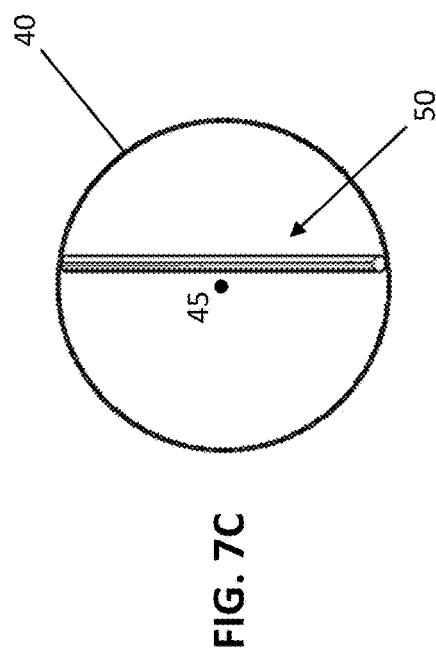
FIG. 7C is an end view of the irradiation chamber with one UV light source as disclosed in accordance with at least one embodiment of the present invention.
Figure 7A:
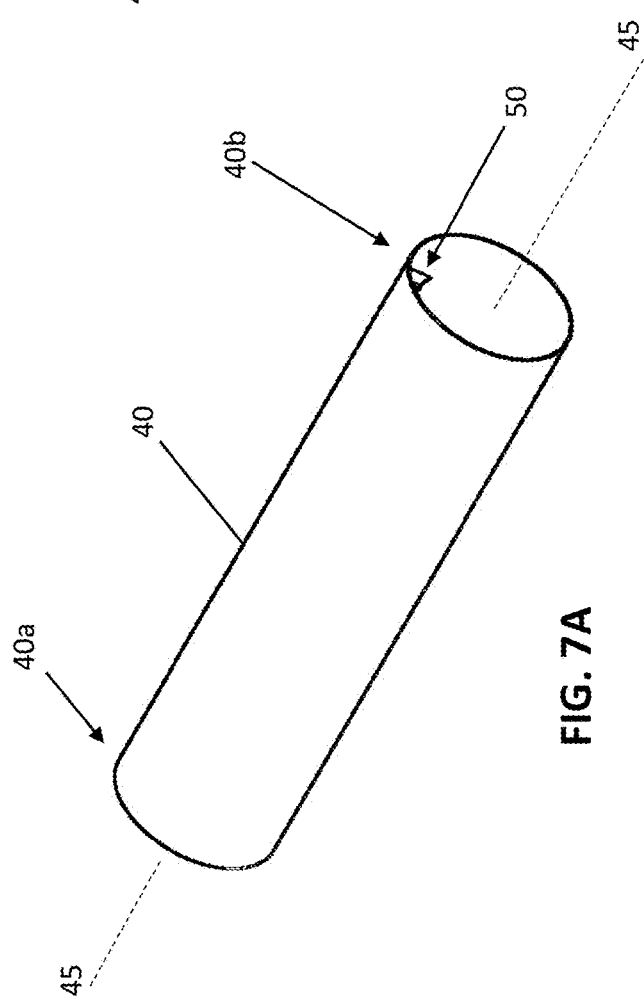
FIG. 7A is a perspective view from the second end of the irradiation chamber with one UV light source, as disclosed in accordance with at least one embodiment of the present invention.

For example, with reference to FIGS. 7A, 7B and 7C, the irradiation chamber 40 of at least one embodiment is shown along with the longitudinal axis 45 and a single light source 50 disposed therein. As provided below, additional light source(s) 50 can be included to give more disinfecting or germicidal power. For example, in the embodiment that has multiple inlet ducts 25 and multiple inlet vents (e.g., coming from the same or different rooms), UV energy or power May need to be increased by increasing the number of light sources 50 disposed in the irradiation chamber 40.

As represented in FIGS. 7B and 7C, the light source 50 spans through the irradiation chamber 40 and crosses from one internal side of the chamber 40 to the other, and is therefore disposed in an oblique manner and not parallel to the axis 45. More specifically, FIG. 7A shows and end perspective view from second end 40a of the irradiation chamber 40 with the light source 50 connected to a top or upper end 41a of the irradiation chamber 40. FIG. 7B shows the same irradiation chamber 40 in a perspective view from the first end 40a illustrating the light source is connected to or extends to an opposite or lower side 41b of the irradiation chamber 40.

Similarly, FIG. 8 shows an end view of the irradiation chamber 40 of at least one embodiment with three light sources 50 disposed therein. As shown, the three light sources 50 are disposed in an oblique or angled manner relative to each other and relative to the longitudinal axis 45. In this embodiment, each of the three light sources 50 also extend through the longitudinal axis 45 such that in the end view (as shown in FIG. 45) the light sources 50 are symmetrically disposed, although the light sources 50 do not collide or contact one another.

Figure 9B:
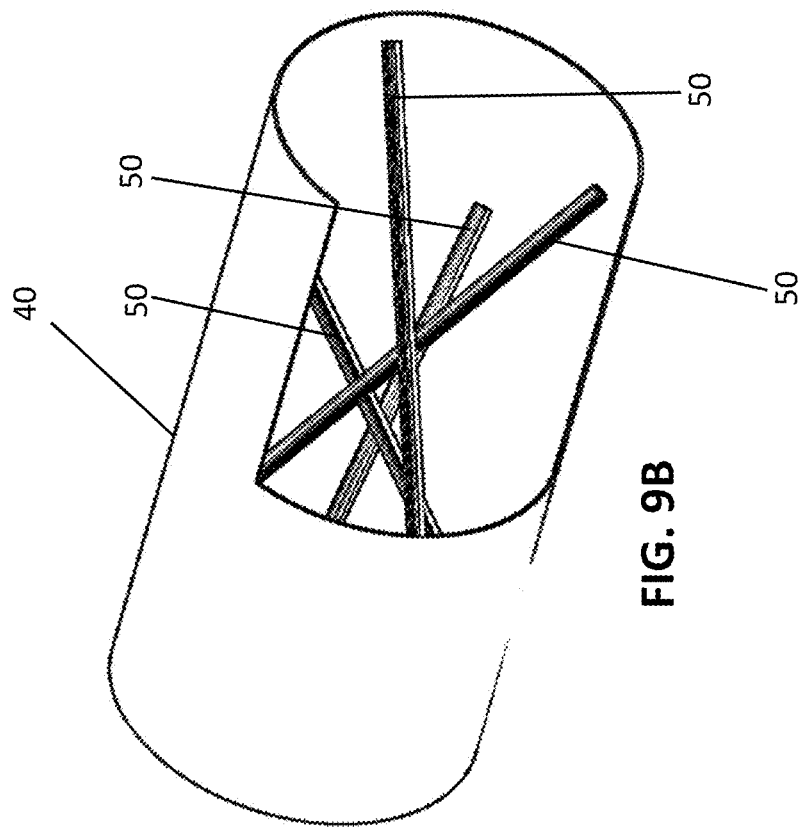
FIG. 9B is a cut-away view of the irradiation chamber of at least one embodiment with four UV light sources.
Figure 9A:
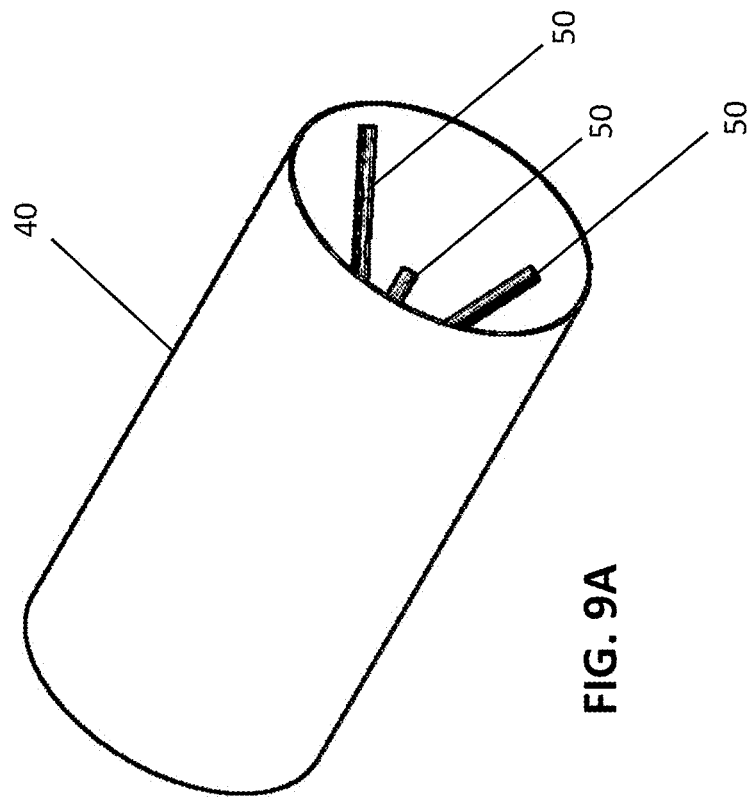
FIG. 9A is a perspective view of the irradiation chamber of another embodiment with a plurality of UV light sources.
Figure 9D:
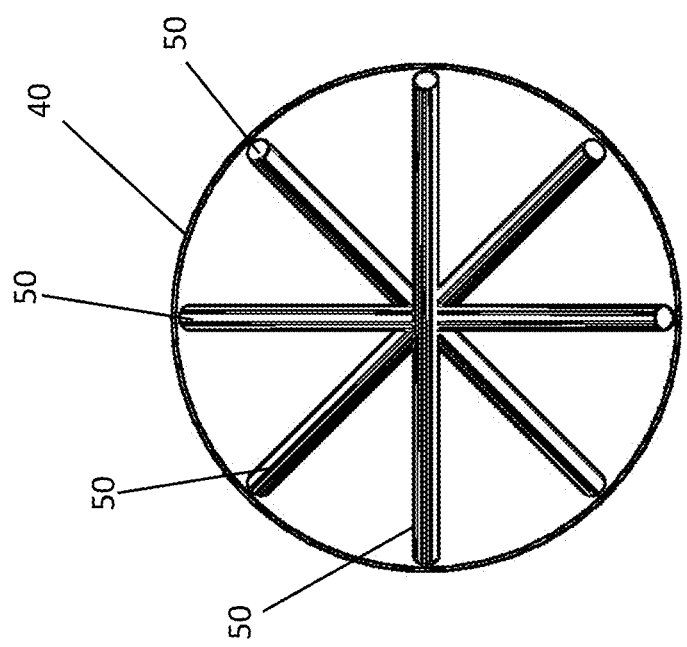
FIG. 9D is an end view of the irradiation chamber illustrated in FIGS. 9B and 9C.
Figure 9C:
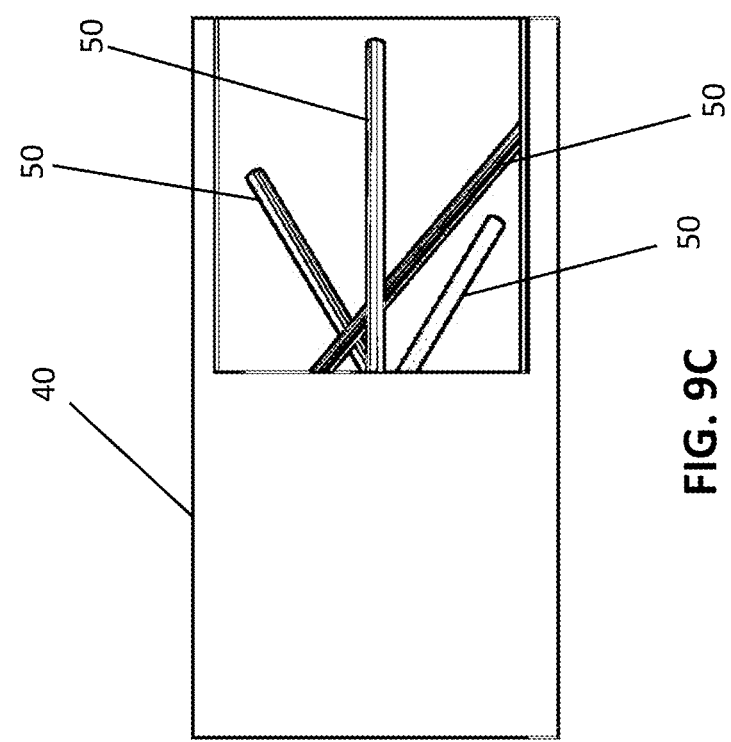
FIG. 9C is a side and partial cut-away view of the irradiation chamber illustrated in FIG. 9B.

FIGS. 9A through 9D illustrate another embodiment of the irradiation chamber 40, this time with four light sources 50 disposed in an oblique, staggered or angled manner therein. More specifically, FIGS. 9B and 9C illustrate partial cut-away views of the irradiation chamber 40 showing how the various light sources 50 are angularly disposed or obliquely disposed relative to one another and relative to a longitudinal axis 45 without the light sources 50 colliding with one another. When viewed from the end, such as in FIG. 9D, the light sources 50 appear symmetrically positioned.

For instance, the oblique or staggered light source arrangement allows the lights to be staggered in the chamber 40 to achieve a symmetrical axis view without the light sources 50 colliding in the middle. This can be scalable by increasing the chamber length to hold more light sources and to add to the axial light density. The chamber diameter can also be increased thereby increasing the light tube angle therein.

In addition, it should also be noted that with the obliquely or angularly positioned light source(s) 50, as the air flows through the irradiation chamber 40, the flowing air will impact the light source(s) 50 and cause the air to break up or mix, thereby increasing exposure and/or exposure time to the ultraviolet light as the air passes from the inlet assembly 20 to the outlet assembly 60.

Figure 10C:
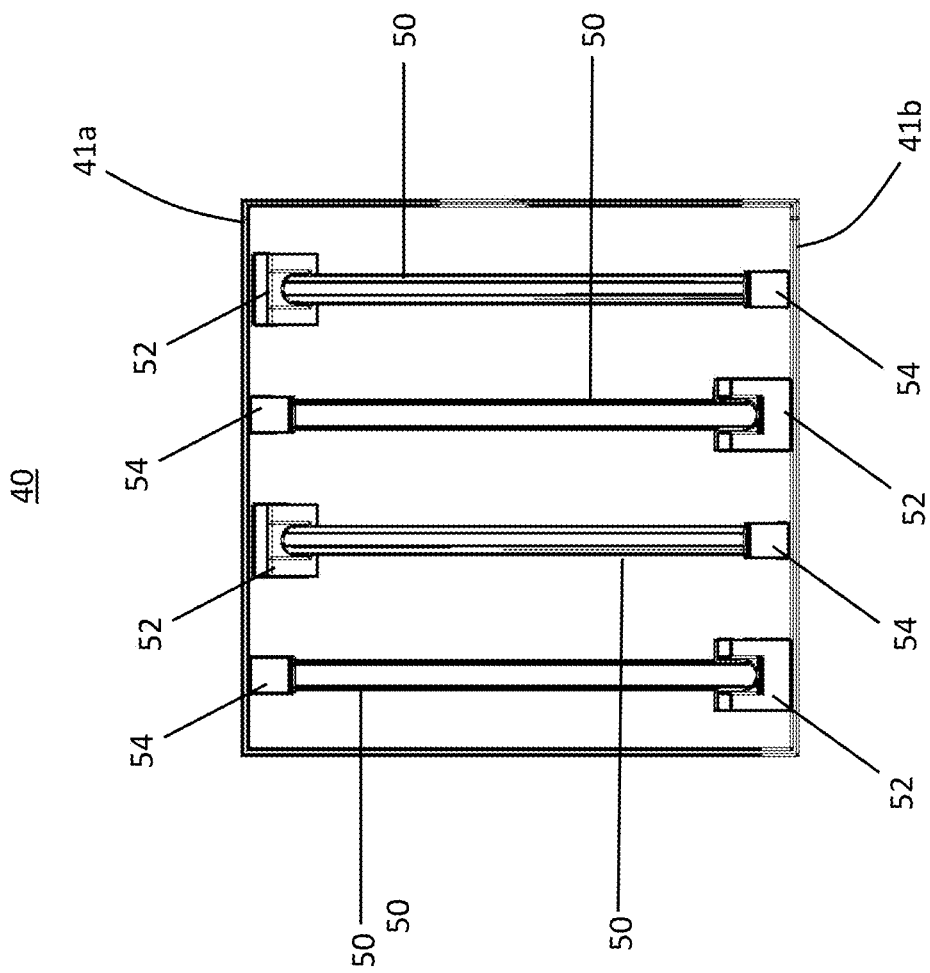
FIG. 10C is an end view of the irradiation chamber illustrated in FIGS. 10A and 10B.

Furthermore, FIGS. 10A, 10B and 10C illustrate yet another embodiment of the irradiation chamber 40 of the present invention, showing a rectangular irradiation chamber 40, or otherwise, an irradiation chamber 40 with a rectangular cross-section. In this embodiment, the plurality of light sources 50 are shown as being disposed in an oblique orientation relative to the longitudinal axis 45 of the chamber 40. In this example, each light source 50 spans from one end (e.g., a top 41a or bottom end) of the chamber 40 to the other opposite end of the chamber 40. In other implementations, the light sources 50 may be arranged from side-to-side, or in another oblique or staggered arrangement.

Referring again to FIGS. 2A and 2B, it should also be noted that the inlet assembly 20 of at least one embodiment of the present invention may include an optional connection pipe or duct disposed between the irradiation chamber 40 and the flexible inlet duct(s) 25. The connection pipe or duct 125 may be constructed of an elongated, cylindrical pipe or rectangular duct, such as, but not limited to a galvanized steel round duct pipe or rectangular duct. In some embodiments, the connection pipe 125 may be twenty to forty eight inches in length and have an eight or ten inch diameter, although other shapes, sizes and materials are contemplated. In the event the connection pipe 125 has a diameter that is different than that of the flexible duct 25 and/or irradiation chamber 40, couplers, such as increasers or reducers may be needed, as described above, to facilitate interconnection there between.

The optional connection pipe or ducts 125 can be used as a pre-exposure chamber such that the germicidal light from the light source(s) 50 of the irradiation chamber 40 may shine or travel into the connection pipe or duct 125, thereby exposing the air to the germicidal UV light prior to the air reaching to or travelling through the irradiation chamber 40.

Figure 11C:
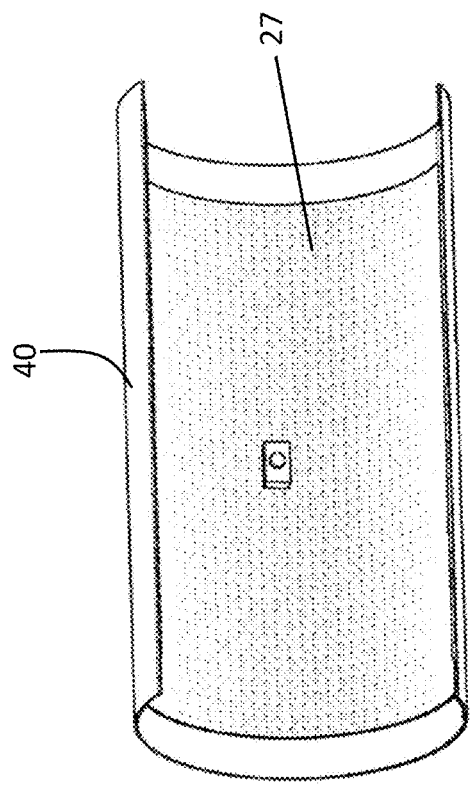
FIG. 11C is a partial cut-away view of the irradiation chamber illustrating a reflective surface or material disposed therein in accordance with at least one embodiment of the present invention.
Figure 11D:
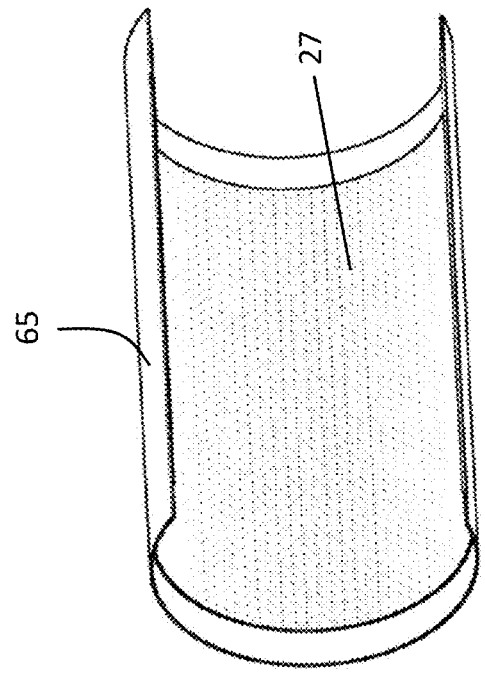
FIG. 11D is a partial cut-away view of the outlet duct illustrating a reflective surface or material disposed therein in accordance with at least one embodiment of the present invention

Moreover, in at least one embodiment, with reference to FIG. 11A, at least some or all of the interior surface of the connection pipe 125 may include a light reflecting material or surface 27 disposed thereon. FIGS. 11B, 11C and 11D are provided to also illustrate that, in some embodiment, the light reflecting material or surface 27 may be disposed on all of some of the interior surfaces of the inlet duct(s) 25 (e.g., FIG. 11B), the irradiation chamber 40 (e.g., FIG. 11C) and/or the outlet duct(s) 65 (e.g., FIG. 11D). More specifically, the light reflecting material or surface 27 may be included on the interior surface of any one of the connection duct/pipe 125, inlet duct(s) 25, irradiation chamber 40, or outlet duct(s) 65, each one of the connection duct/pipe 125, inlet duct(s) 25, irradiation chamber 40, and outlet duct(s)

65, or a combination of two or more of the connection duct/pipe 125, inlet duct(s) 25, irradiation chamber 40, and/or outlet duct(s) 65.

More in particular, the light reflecting material or surface 125 of at least one embodiment is structured to be highly reflective and capable of facilitating the germicidal or disinfecting light emitted from the light source(s) 50 to reflect and travel through the inlet duct(s) 25, the connecting pipe or duct 125, the irradiation chamber 40 and/or the outlet duct(s) 65. In other words, the reflective material or surface 27 may, in some embodiments be disposed on a portion of or the entire inside surface of the connection duct/pipe 125, inlet duct(s) 25, irradiation chamber 40, and/or outlet duct(s) 65.

Specifically, in at least one embodiment, the reflective material or surface 27 may include a diffusely reflective surface, thereby causing Lambertian reflectance which is the property that defines an ideal matte or diffusely reflective surface and is named after Johann Heinrich Lambert who introduced the concept of perfect diffusion. In other words, the reflective material or surface 27 acts similar to a photomultiplier to direct the iridescence energy more evenly and widely throughout the pipe(s), duct(s) or tube(s), and may in some instances increase the iridescence energy in the pipe(s), duct(s) or tube(s). In some cases, the Lambertian reflectance of the interior surface(s) of either one or more of the connection duct/pipe 125, inlet duct(s) 25, irradiation chamber 40, and/or outlet duct(s) 65 can be near 90% to 97%. As just an example, the reflecting material or surface may be constructed of or otherwise include polytetrafluoroethylene (PTFE), although other reflective or diffusing materials are contemplated. For instance, one such reflective material or surface is the POREX® VIRTEK® PTFE material provided by POREX FILTRATION GROUP®.

Furthermore, referring back to FIG. 6, in some embodiments mounting holes (not shown) may be formed within the coupler 42b in order to mount the lamp socket(s) 52, an electronic ballast, and a fan power supply. Additional holes 43 can be used to route an AC electrical connection (not shown) to provide power to the light source(s), fan(s) and any one or more sensor(s) described below. In some cases, the inlet fan 30 can be powered by a power line running through the irradiation chamber 40 and down the inside of the inlet duct(s) 25. Other manners of powering the light source(s) 50, fan(s), sensor(s), etc. are contemplated within the full spirit and scope of the present invention.

Yet another embodiment of the present invention includes one or more ultraviolet or UV sensors 210 and a controller 220 to automatically, or in response to human input, control the light output of one or more of the light source(s). The controller 220 may include various control logic, electrical relays and other components and circuits that are structured and configured to operate the system or method of at least one embodiment as described below. In some embodiments, a human-machine interface (HMI) may be included to provide information (e.g., as determined by the one or more sensors) to a user and to provide controls to the user to enter data, upper or lower energy or dosage limits, etc.

It should also be noted that the UV sensor(s) 210, controller(s) 220 and/or interface described herein can be implemented and operable in connection with the germicidal duct assembly 10, while in other cases, the UV sensors, controller(s) and/or interface can be implemented independent of the germicidal duct assembly 10. In other words, the present application discloses a UV controlling system and method, using the UV sensor(s) and controller(s) described herein, which may be implemented with the presently described germicidal duct assembly 10 or with other UV systems (separate and apart from the germicidal duct assembly 10) now known or later developed.

Figure 12A:
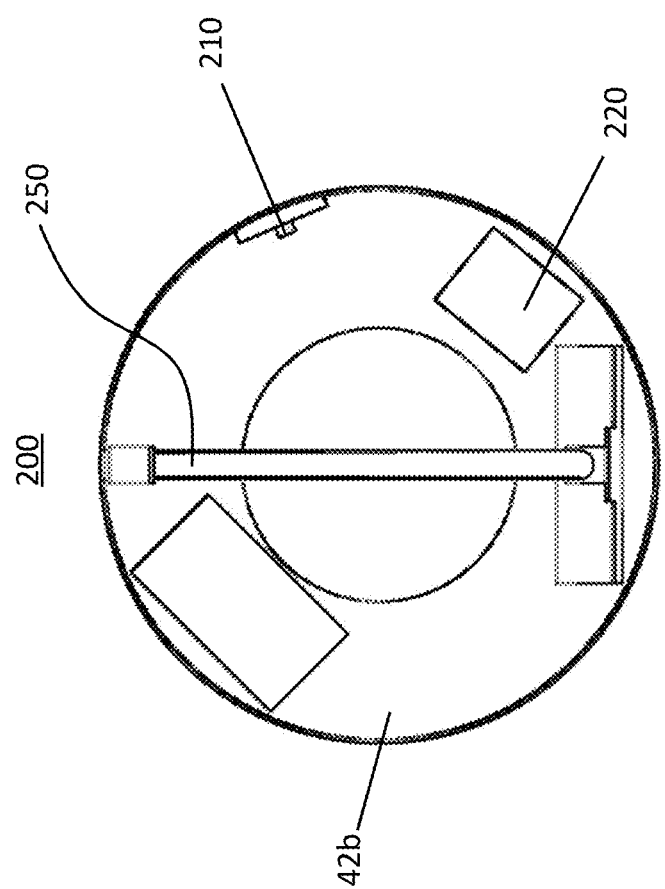
FIG. 12A is an end view of the irradiation chamber of at least one embodiment of the present invention illustrating one UV light source, a sensor and a controller.
Figure 13:
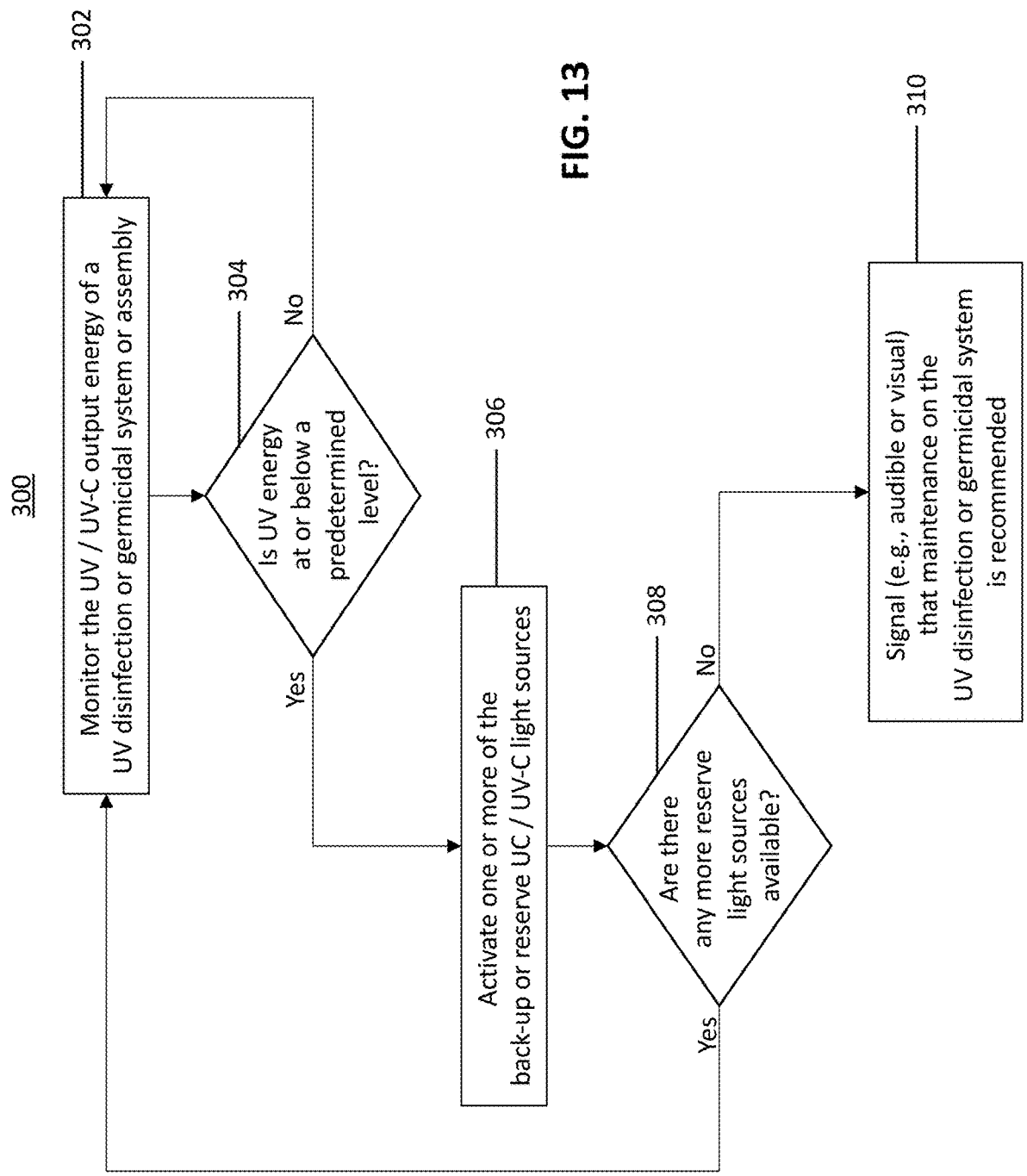
FIG. 13 is a high level flow chart illustrating the method of managing, monitoring and controlling a UV light system as disclosed in accordance with at least one embodiment of the present invention.

In any event, with reference to FIGS. 12A, 12B and 13 an exemplary system 200 and method 300 are shown. The system 200 of at least one embodiment includes at least one disinfecting or germicidal light source 250 (e.g., as shown in FIG. 12A) or a plurality of disinfecting or germicidal light sources 250a, 250b, 250c 250d, which is/are structured to emit germicidal or disinfecting light such as ultraviolet (UV) light, and in some instance, short-wave ultraviolet light (often referred to as UVC light) or light having a wavelength in the range of approximately 100 nm to 280 nm. These lights 250, 250a-d and system 200 can be used in connection with the germicidal duct assembly 10 disclosed herein such that the lights 250, 250a-d extend into an irradiation chamber 40 where a flow of air is exposed to the lights. In other cases, the system 200 and lights 250, 250a-d can be used with virtually any germicidal or disinfecting product configured to disinfect air or items exposed to the light.

Furthermore, and still referring to FIGS. 12A and 12B, the system 200 also includes one or more sensors, referenced as 210, and one or more controllers, referenced as 220. The sensor(s) 210 can be any ultraviolet light sensors or short-wave ultraviolet light (UVC) sensors that are exposed to the light emitted by the one or more light sources 250, 250a-d. The sensor(s) 210 can be communicatively connected to the controller 220 as well as a power supply (not shown). The controller 220 may be mounted virtually anywhere in the system 200, for example, on or within the chamber 40, coupler 42b, internally or externally to the system, locally or remotely to the system 220, etc.

Moreover, the sensor(s) 210 of at least one embodiment are structured and configured to measure or monitor the energy level of the UV light(s) within the chamber or of the UV lighting product or system. In other embodiments, the one or more sensors 210 may monitor or measure other environmental or other factors, including, but in no way limited to, the wavelength of the UV light, electromagnetic wavelengths, air flow rate, ambient or other temperatures, UV lamp operating hours or time, humidity, pressure, dosage, etc. In this manner, the one or more sensors 210 as disclosed and as used herein may include, but are certainly not limited to, an air flow sensor, an ultraviolet wavelength sensor, a temperature sensor or thermometer, a timer, a humidity sensor, a pressure sensor, dosage sensor, etc.

Furthermore, as will be described in more detail below, when the energy level, air flow rate, UV dosage level, or other factor measured or detected by the sensor(s) 210 falls below or exceeds a predetermined threshold or treatment parameter, the system 200, 400 and/or method 300, 500 of at least one embodiment will initiate corrective or other actions, such as, activating an inactive UV light source 250a-d to raise the UV energy level output, increasing or decreasing a fan speed to increase or decrease air flow, raise or lower the ambient temperature within the treatment chamber, generate a warning message or notification, etc.

More specifically, the system 200 of at least one embodiment includes at least one active germicidal or UV light source (e.g., 250a) and at least one back-up or reserve germicidal or UV light source (e.g., 250b, 250c, 250d). The back-up or reserve germicidal or UV light source(s) 250b, 250c, 250d are at least initially inactive or otherwise turned off and not emitting UV light. It is contemplated that, in some cases, the back-up or reserve germicidal or UV light source(s) can be configured to emit a small amount of light when in the deactivated state.

Accordingly, as represented at block 302 in FIG. 13, the sensor(s) 210 of at least one exemplary embodiment are configured to monitor the output energy or UV energy of a UV disinfecting or germicidal system. In many cases, less than all of the UV lights are active (e.g., 250a) at one time, leaving the other lights (e.g., 250b, 250c, 250d) off or inactive. With reference to 304 in FIG. 13, the controller 220 or control logic therein will determine, based on the information or data provided by the sensor(s) 210, whether the energy level emitted by the UV lights is at or below a predetermine threshold or treatment parameter. If it is not, then the sensor(s) 210 continue to monitor the energy level, dosage level, etc. with no change.

If, on the other hand, the energy level, dosage level or other measurement reaches, exceeds or falls below a predetermined level (e.g., due to ballast failure, lamp degradation over time, lamp degradation due to debris build-up, etc.), then, as shown at 306, the controller 220 of at least one embodiment will activate one or more of the back-up or reserve UV lights (e.g., 250b, 250c, 250d). In that case, the back-up or reserve UV lights will then be converted to active UV lights thereby emitting a high UV energy level. In some cases, the previous active light (250a) may be completely deactivated or turned off, while in other cases, it may be left to continue to emit UV energy, if any.

For example, in some cases, when the energy level measured by the sensor(s) 210 is too low or otherwise reaches a predetermine lower limit, the system or controller 220 may activate an electrical relay or circuit path that will power one or more of the back-up or reserve UV light(s) 250b, 250c, 250d. Other manners of activating one or more of the back-up or reserve UV lights is contemplated. In any case, with the back-up or reserve UV lights activated, the energy level in the chamber or otherwise emitted by the system 200 will increase to an operable level.

The cycle then repeats itself until the last reserve UV light(s) in the irradiation or treatment chamber or system have reached or fallen below the lower threshold level. For instance, with reference to 308 in FIG. 13, if, after activating one or more reserve UV lights, there are still some remaining reserve UV lights that have not been activated, then the process or method 300 will continue to monitor the UV energy level, as above. If, on the other hand, there are not any more reserve UV lights to activate when or if the energy reaches or falls below the lower limit, then, as shown at 310, the method 300 of at least one embodiment will signal (e.g., audibly or visually) that the system needs or requires maintenance.

For example, there may be an interface 240, as shown, for example, in FIGS. 14A, 14B, 14C and 14D, which can be communicatively connected to the controller 220 and/or sensor(s) 210, and which can signal to a user that maintenance of the UV system may be needed. In other cases, separate indicate lamps or light emitting diodes, LEDs, can be installed on or in the system to indicate that all of the UV lights have been activated and maintenance is required or recommended. Accordingly, the degraded UV lights can then be replaced with new or replacement UV lights and the method 300 can repeat itself.

Figure 14B:
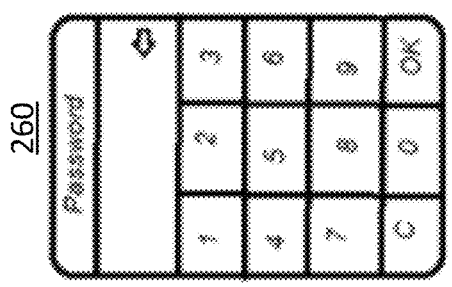
FIG. 14B is another exemplary view of a human-machine interface for the system and method for managing, monitoring and controlling a UV light system and UV energy output as disclosed in accordance with at least one embodiment of the present invention.
Figure 14A:
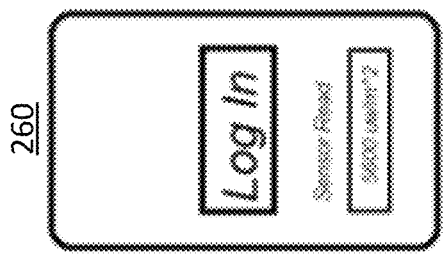
FIG. 14A is an exemplary view of a human-machine interface for the system and method for managing, monitoring and controlling a UV light system and UV energy output as disclosed in accordance with at least one embodiment of the present invention.
Figure 14D:
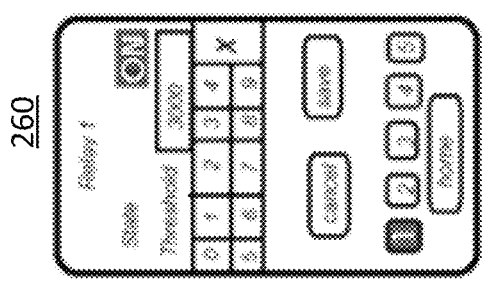
FIG. 14D is yet another exemplary view of a human-machine interface for the system and method for managing, monitoring and controlling a UV light system and UV energy output as disclosed in accordance with at least one embodiment of the present invention.
Figure 14C:
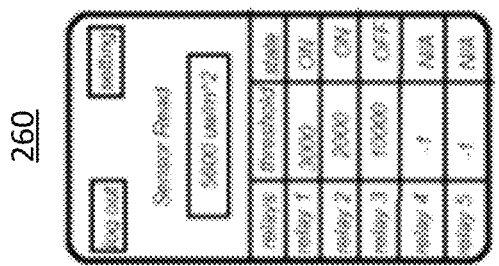
FIG. 14C is another exemplary view of a human-machine interface for the system and method for managing, monitoring and controlling a UV light system and UV energy output as disclosed in accordance with at least one embodiment of the present invention.

FIGS. 14A and 14B show an exemplary login and password screen. As shown in FIG. 14C, for example, a user may set or define the lower level or lower limit value for the UV or UVC energy in the chamber of system 200 as measured by the sensor(s) 210, which may be uW/cm$^2$ or mW/cm$^2$. The low value or lower limit would typically be the minimum amount of energy within the irradiation chamber 40 or system 200 that would provide a desired level of disinfection of the air passing there through. For instance, depending on the type of pathogen desired to be killed or disinfected, the lower level or limit may vary from one application or implementation to another. For instance, each bacteria and virus has its own level of energy required to kill it or make it inactive. That level can also vary depending on the desired kill or inactivation percentage. UV energy at the treatment point is a key variable in the equation.

In some implementations, the controller will automatically activate a previously inactive UV light source when the energy level drops to or below the defined lower limit or threshold. In this manner, the system and method of at least one embodiment allows for monitoring the energy level of the system and maintaining a minimum predetermined level of irradiance energy without human intervention.

With reference to FIG. 14C, the interface 260, for example, can display the current measured energy level or irradiation level of the system 200 as measured by the one or more sensors 210. Additional information that can be displayed and provided by the system or interface 260 can include, for example, identification of the specific UV lights that are active or operating, an identification of the specific UV lights that have reached or passed the minimum threshold or lower limit referenced above, air flow rate (e.g., if an airflow rate sensor is included), a calculation of Fluence value (e.g., "Dosing" level) measured as uJ/cm$^2$ or mJ/cm$^2$), etc. The calculation of Fluence/Dosing is based upon the irradiation energy at a specific treatment distance and the duration of the treatment.

For instance, duration of the pathogen exposure, in seconds, would be calculated from the volume of the chamber (V), for example in cubic-feet (which can be entered or programmed into the interface by the user), the air flow rate (R), for example in cubic-feet per second, and the resultant time (T), for example in seconds required for an sir segment to pass through the chamber. If no air flow meter is installed, then the cumulative flow rate of the fans on the inlet side of the assembly would be used. Fluence/Dosing (D) is then calculated from the UVC Irradiance (I) and the exposure duration (T). An exemplary formula is as follows: V/R=T and T×I=D If a one-foot diameter by two-foot long irradiation chamber is used, then the volume equals 1.57 cubic-feet. If Irradiance is 4.4 mW/cm$^2$ and fan speed if about 80 cubic-feet per minute, which equals 1.33 cubic inches per second, then 1.57/1.33×4.4=5.2 mJ/cm$^2$ Fluence/Dosing of the pathogens. The Fluence/Dosing of at least one embodiment of the present invention may be easily increased if required to kill or make UV resistant pathogens inactive. Increasing the length of the irradiation chamber will increase time (T) and the addition of active UV light source(s) will increase irradiance (I).

Figure 15:
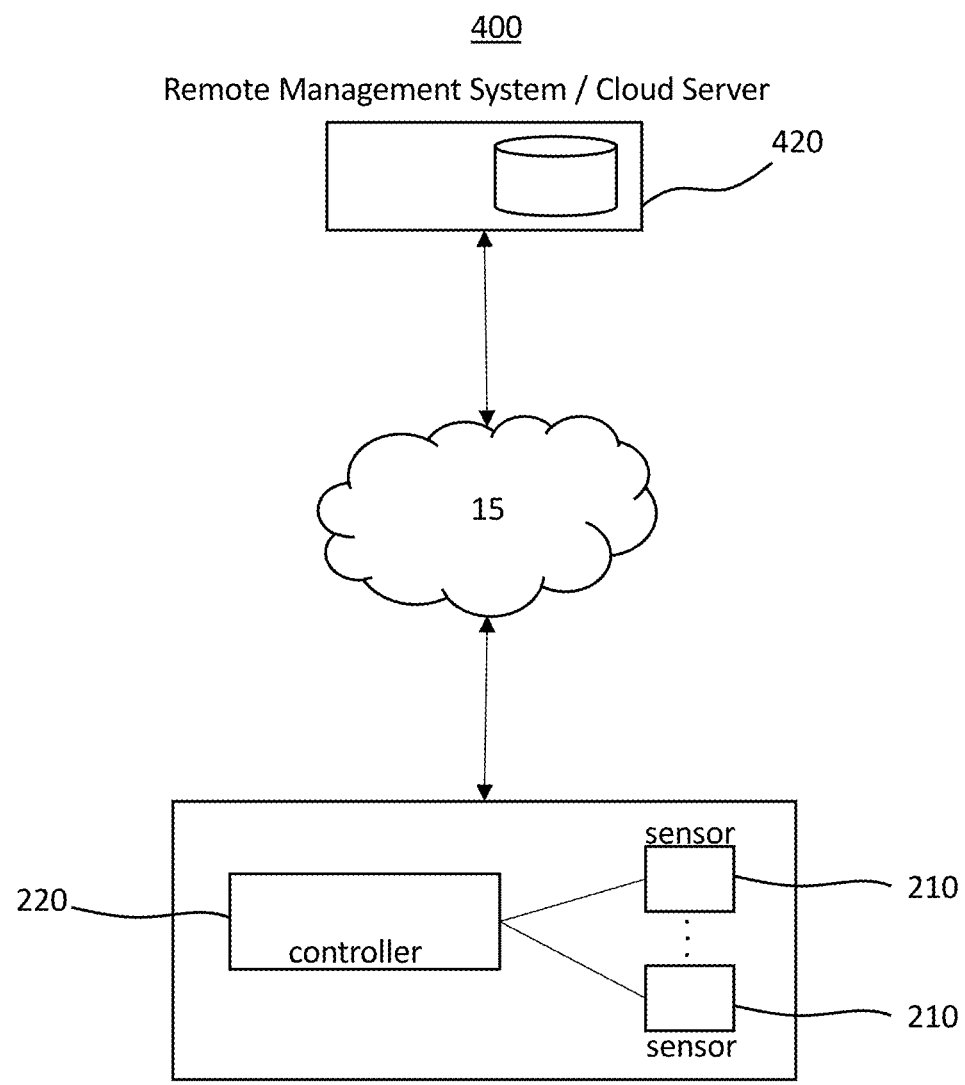
FIG. 15 is a block diagram of the system for detecting and measuring germicidal treatment of a treatment chamber as disclosed in accordance with at least one embodiment of the present invention.
Figure 17:
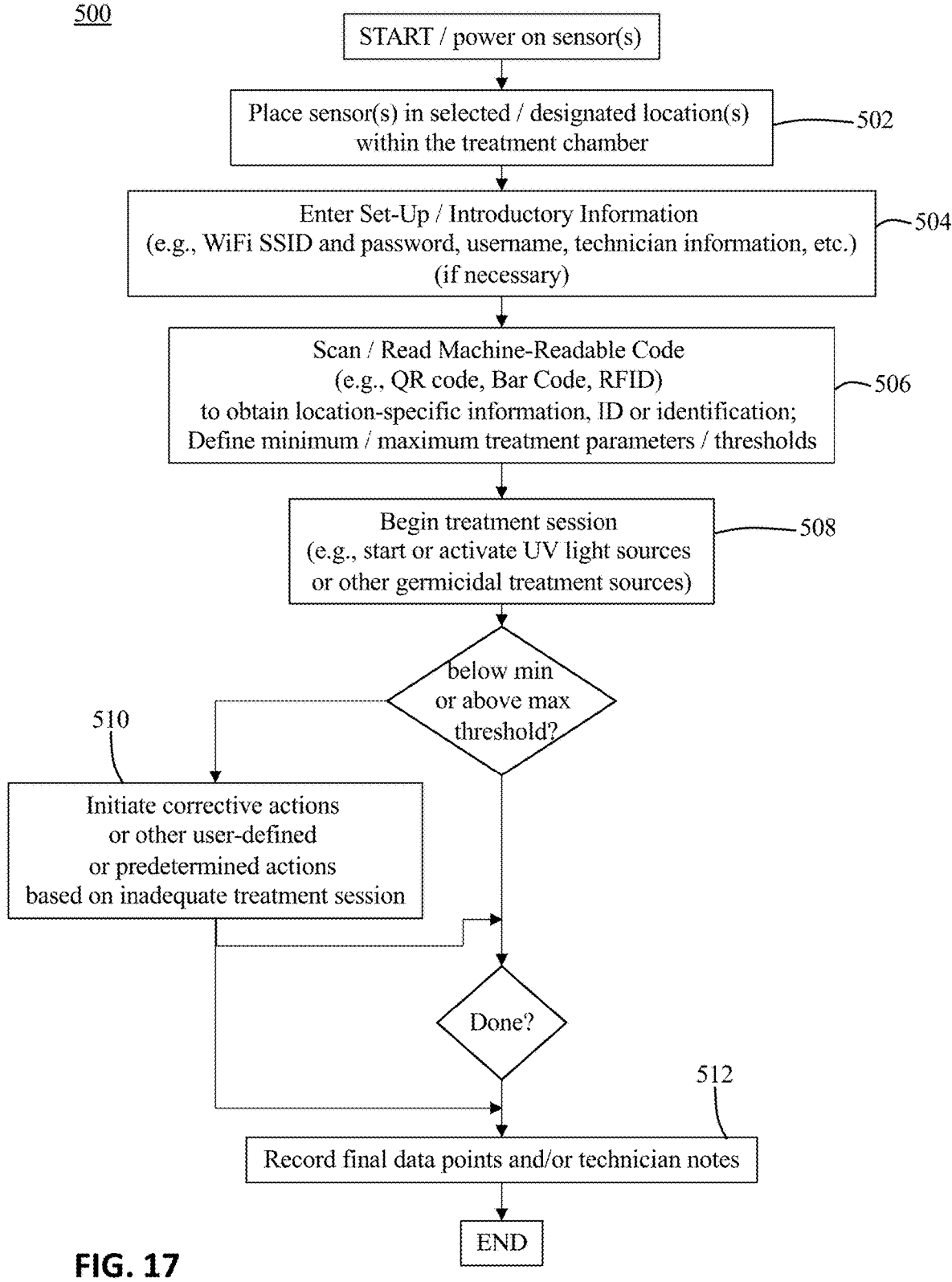
FIG. 17 is a high-level flow chart of the method for detecting and measuring germicidal treatment of a treatment chamber as disclosed in accordance with at least one embodiment of the present invention.

With reference now to the system 400 and method 500 illustrated in FIGS. 15 and 17, respectively, a cloud-based or remote management system 420 is included, which allows for remote storage, management and control of various features and functions, as provided herein. More in particular, the remote management system 420 may be communicative with one or more controllers 220 via one or more communication or computer networks 15. Multiple modes of communication may be implemented such that the management system 420 and controller(s) 220 can communicate over one or more data networks, telecommunication networks or virtually any communication network within the full spirit and scope of the present invention. Accordingly, the network or communication channel 15 may be defined as one or more telecommunication networks, including for example, wireless mobile telecommunications technology (e.g., third generation or 3G networks, fourth generation or 4G networks, fifth generation or 5G networks, long-term evolution or LTE networks, etc.), as well as computer networks, the Internet or world wide web, global telex networks, data or TCP/IP networks, such as Wide Area Networks (WAN), Metropolitan Area Networks (MAN), Local Area Networks (LAN), Internet Area Networks (IAN), etc.

Figure 16A:
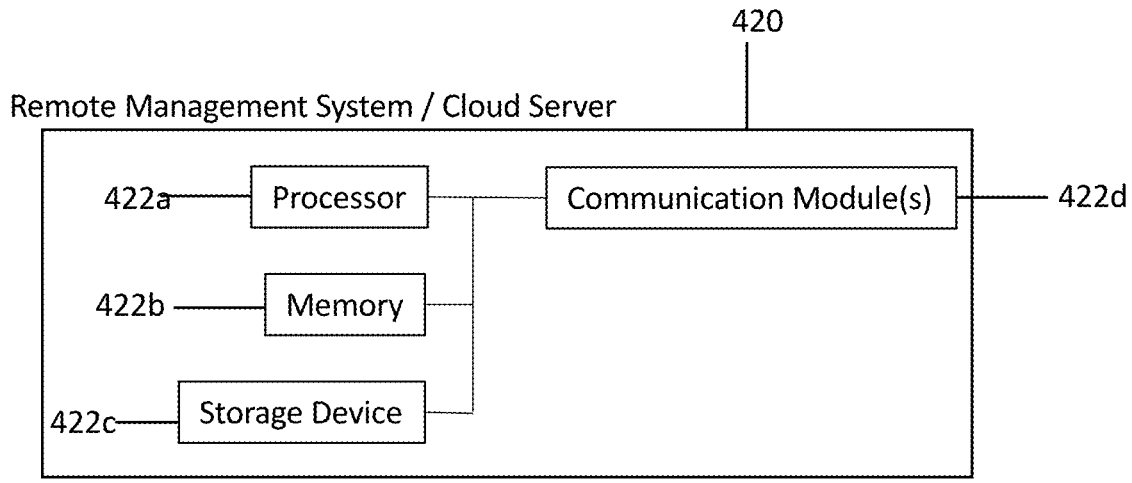
FIG. 16A is a block diagram of the remote management system as disclosed in accordance with at least one embodiment of the present invention.
Figure 16B:
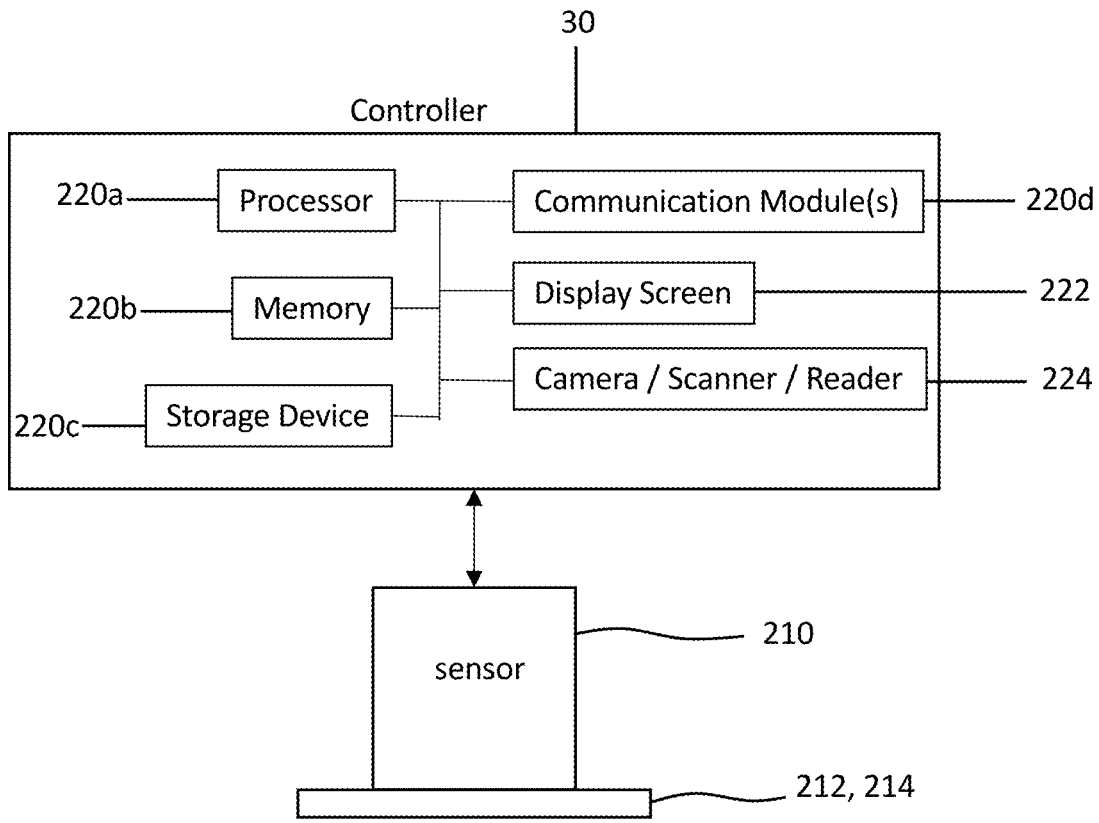
FIG. 16B is a block diagram of the controller and sensor as disclosed in accordance with at least one embodiment of the present invention.

In this manner, and with reference to FIGS. 16A and 16B, the management system 420 and the controller(s) 220 of at least one embodiment each includes a processor, memory, a data storage device, and one or more communication modules, among other components. For instance, the management system 420 may but need not necessarily operate as or be implemented as a server or cloud-based server, and may include virtually any one or more computing devices such as a web or other server, desktop or laptop computer, mobile device, etc. Furthermore, the controller(s) 220 as used herein may include any computing device that includes one or more processors, microprocessors, microcontrollers, single-board or multi-board computers, etc.

Specifically, as used herein, the processor 422a of the management device 420 includes any device cooperatively structured to execute or implement computer instructions, software, etc., including, for example, the various features and components as described in accordance with at least one embodiment of the present invention. The memory device 422b, as used herein, May include but is not limited to random access memory (RAM) or other like devices configured to implement the present invention in the intended manner, for example, by storing and assisting with the execution of one or more applications, modules, or components capable of implementing the features as described herein. In some cases, the processor and memory can be combined to a single microcontroller as is known in the art. Further, the data storage device 422c, as used herein, May include a hard disk drive, solid state drive, virtual drive, could-based storage drive, or other types of volatile or non-volatile memory. It should be noted that non-transitory computer readable media includes all computer-readable media except for a transitory, propagating signal. The one or more communication modules 422d, as used herein, includes one or more modules implemented in hardware and/or software adapted to communicate a signal, message, or data communication via the network(s) 15, for example, to/from the controller(s) 220.

Further, as used herein, the processor 220a of controller 220 includes any device cooperatively structured to execute or implement computer instructions, software, etc. The memory device 220b, as used herein, may include but is not limited to random access memory (RAM) or other like devices configured to implement the present invention in the intended manner, for example, by storing and assisting with the execution of one or more applications, modules, or components capable of implementing the features as described herein. In some cases, the processor and memory can be combined to a single microcontroller as is known in the art. Further, the data storage device 220c, as used herein, may include a hard disk drive, solid state drive, virtual drive, could-based storage drive, or other types of volatile or non-volatile memory. It should be noted that non-transitory computer readable media includes all computer-readable media except for a transitory, propagating signal. The one or more communication modules 220d, as used herein, includes one or more modules implemented in hardware and/or software adapted to communicate a signal, message, or data communication via the network(s) 15, for example, to/from the remote management system 420.

It should also be noted that the controller 220 of at least one embodiment may include additional components or features that facilitate implementation of the present invention in the intended manner. For example, as represented in FIG. 16B, the controller may also include a display 222, such as but not limited to a touchscreen, monitor, LCD or LED screen, or other display to show data, information, log-in information, information or data measured by the sensor(s), etc. in addition, the controller 220 of at least one embodiment may also include a device 224, such as a camera, image capturing device, reader, or scanner that is capable of or otherwise operates to scan, read and/or input a machine-readable code. As used herein, the machine-readable code may be used to store information (e.g., a location identifier, as discussed herein), and may be in the form of a quick response code (QR code), bar code, etc.

Figure 19:
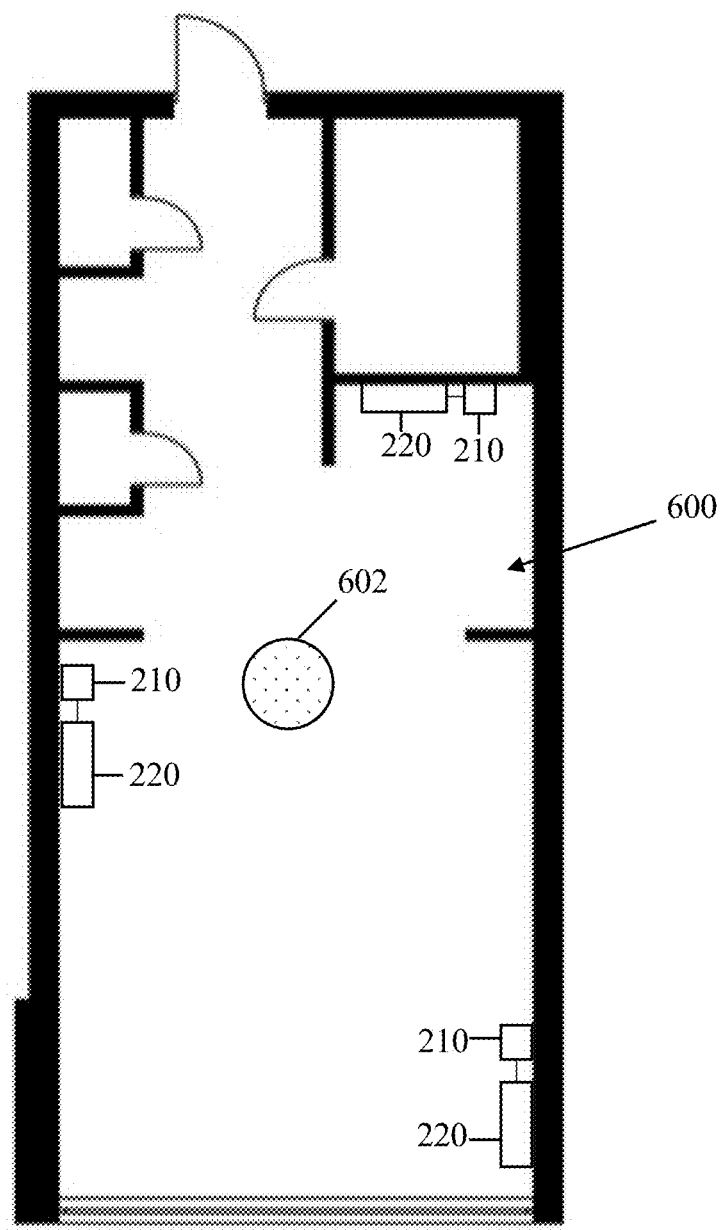
FIG. 19 is a floorplan view of an exemplary treatment chamber with a UV source and a plurality of sensors and controllers disposed throughout.
Figure 20:
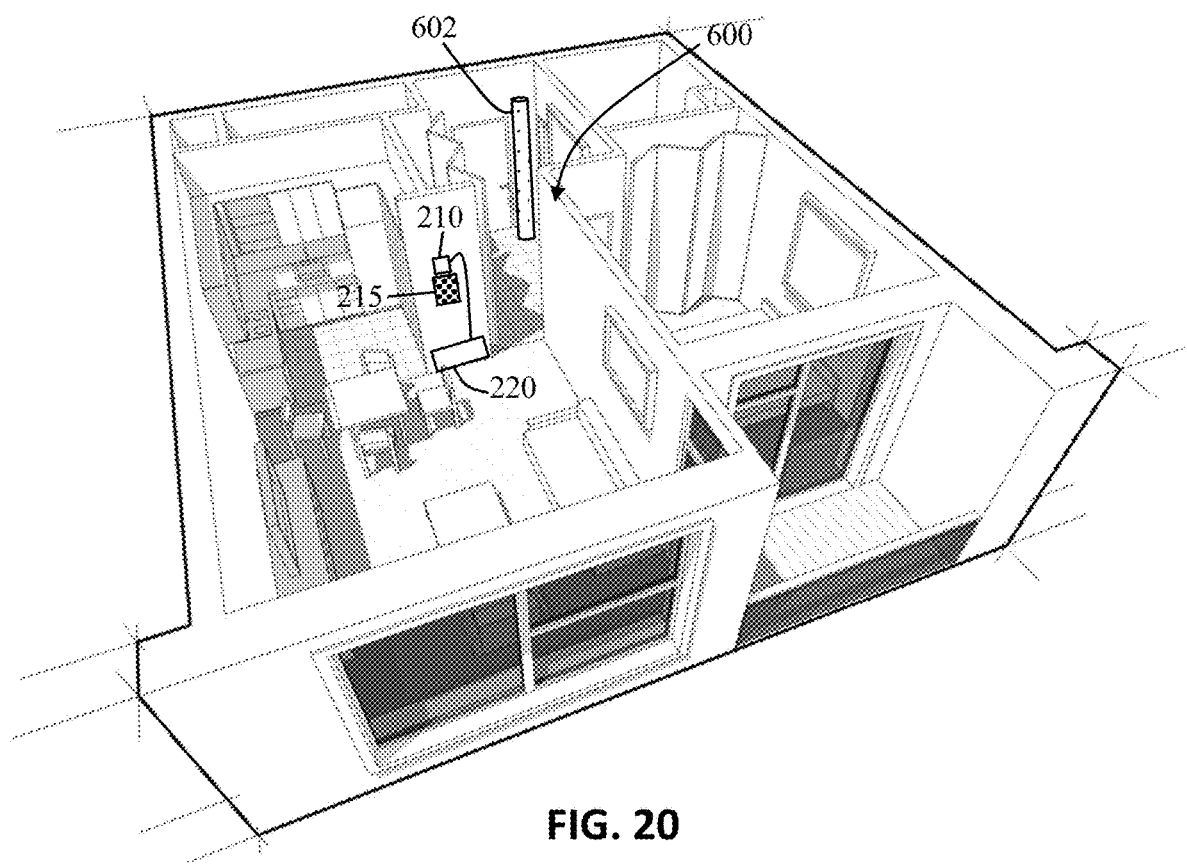
FIG. 20 is a perspective floorplan view of another exemplary treatment chamber with a UV source and a plurality of sensors and controllers disposed throughout.

In particular, with reference to FIG. 17, the method 500 of at least one embodiment is illustrated in a high-level flow chart. Initially, as represented at 502, at least one sensor 210 is disposed or placed in a selected location within a treatment chamber 600. The treatment chamber 600, as used herein, may include virtually any space or area, partially or fully enclosed, where a disinfecting treatment is to be performed in accordance with at least one embodiment of the present invention, for example, but not limited to one or more germicidal or disinfecting UV light sources 602. In this manner, the treatment chamber may be in the form of an HVAC duct, a duct assembly as disclosed in accordance with some embodiments of the present invention, a restaurant, a dining area, a hospital room, bedroom, convention or meeting room, any one or more rooms or areas in a home, building or other structure, etc. As non-limiting example, FIGS. 19 and 20 illustrate exemplary treatment chambers 600 in the form of one or more rooms or living areas.

Figure 18A:
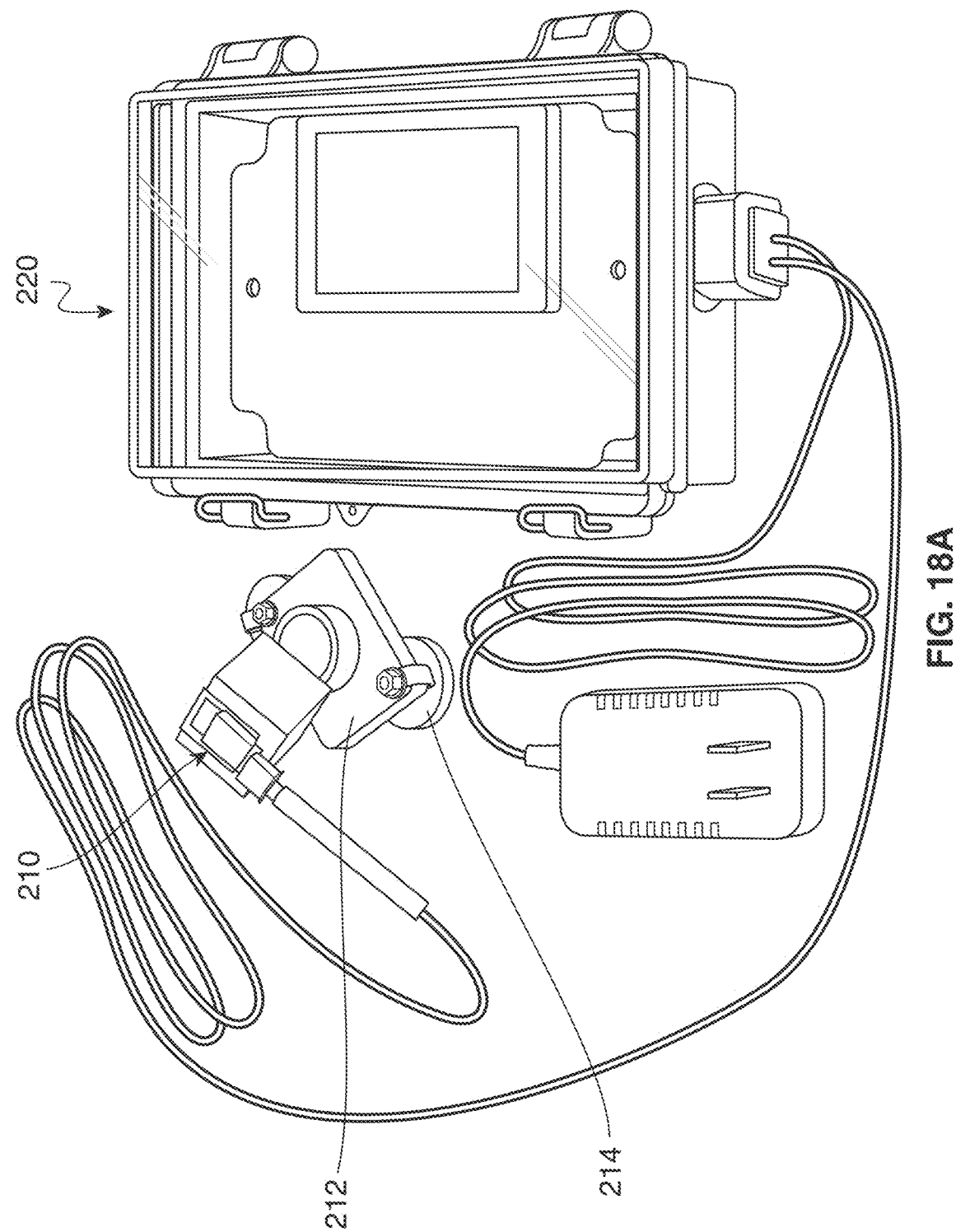
FIG. 18A is an exemplary illustration of the sensor and controller as disclosed in accordance with at least one embodiment of the present invention.
Figure 18B:
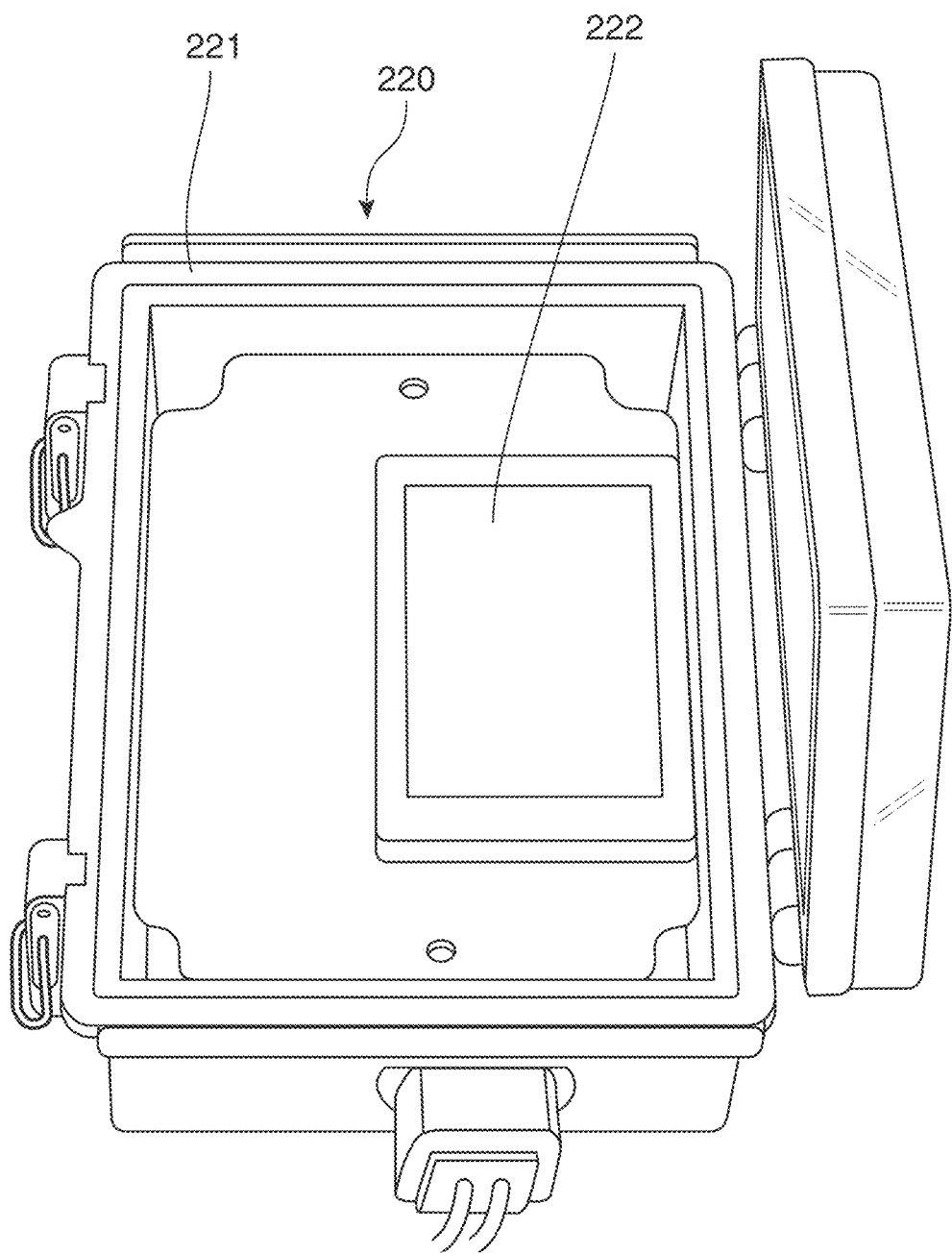
FIG. 18B is another view of the controller as disclosed in accordance with at least one embodiment of the present invention.
Figure 18C:
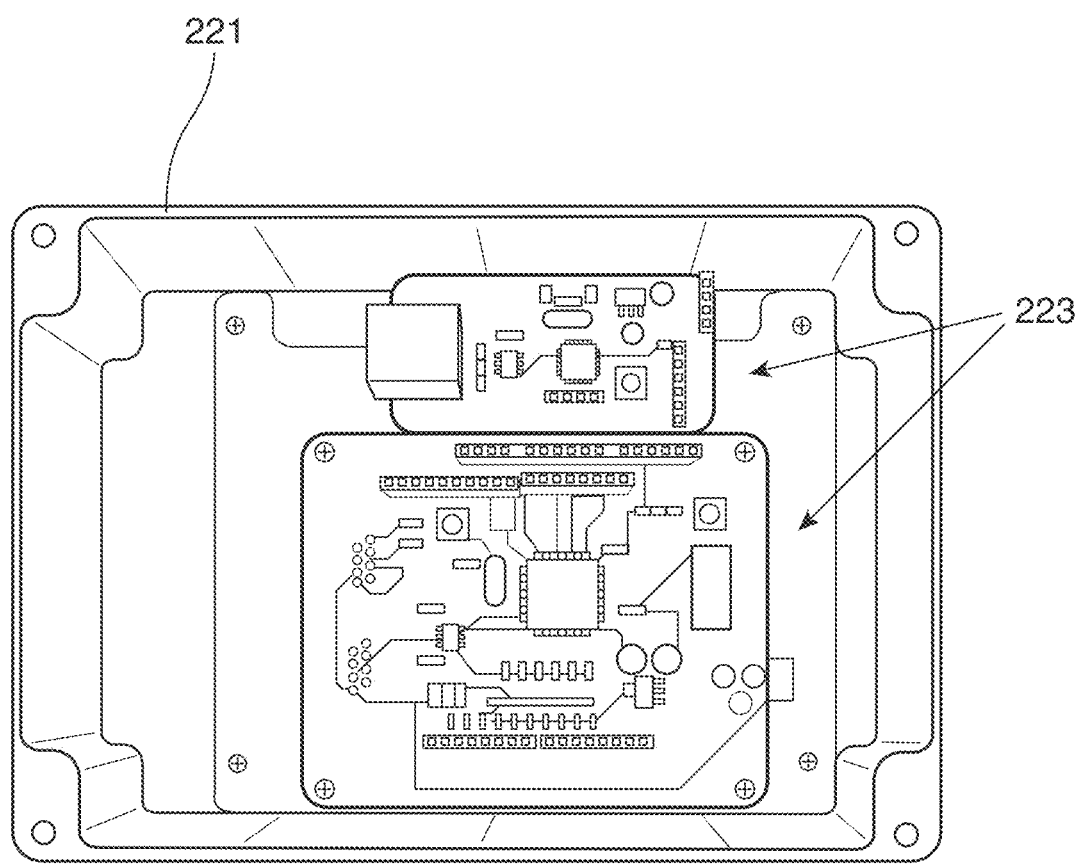
FIG. 18C is yet another view of the controller as disclosed in accordance with at least one embodiment of the present invention.

In any event, referring now to FIGS. 18A-18C, the sensor(s) 210 and controller(s) 220 as disclosed in accordance with at least one exemplary embodiment is shown. For example, the one or more sensor(s) 210 may be communicative with the controller 220 in a manner to transmit or communicate readings or measurements obtained by the sensor(s) 210 to the controller 220. In the embodiment illustrated, the sensor 210 is communicatively interconnected to the controller 220 via a wire or cable, however, it is also contemplated that in other embodiments or implementations, the sensor 210 may communicate with the controller wirelessly, for example, via Bluetooth, ZigBee, Wi-Fi, or other wireless communication networks.

Still referring to FIG. 18A, the sensor 210 (which is shown disposed within a housing) is attached to a mount 212 and/or one or more attachment or mounting devices 214. In particular, the mount 212 may be used to attach the sensor 210 to a surface, such as a wall, table or countertop, floor, ceiling, etc. In some cases, the mount 212 may swivel, rotate or allow some movement such that the sensor can be rotated, angled or moved in a manner such that it is facing the light source(s) 602 or so that it can be positioned in a desired orientation. Mounting device(s) 214 may be magnets (or otherwise have magnetic capabilities), adhesives, tacks, etc. that allows the mount 212 and therefore the sensor 210 to secure to the surface.

It should also be noted that while in the embodiment shown in FIG. 18A one sensor is attached to one controller 220, in other embodiments or implementations, a plurality of sensors 210 may communicate with a single controller 220, and similarly, a plurality of controllers 220 may be communicative with one or more sensors 210.

With reference to FIG. 18B, the controller 220 of at least one embodiment is shown to include a housing 221 and a display screen 222. In the embodiment shown, the housing 221 is in the form of an encasement with an openable lid or cover to access the display screen 222, however, other housings and/or implementations are contemplated within the full spirit and scope of the various embodiments of the present invention.

FIG. 18C illustrates the one or more control boards 223 disposed within the housing 221 of the controller 220 of at least one embodiment of the present invention. The control board 223 may include the processor, memory and storage device of the controller 220, as disclosed herein, and may operate to control the display screen, receive and/or transmit communications to/from the sensor(s) 210 and remote management system 420, etc. Of course, the control board 223 illustrated in FIG. 18C is exemplary in nature and is not to be considered limiting in any manner.

Referring again to the flow chart of FIG. 17, as shown at 502, the method 500 includes disposing or positioning the one or more sensors 210 in a selected location within the treatment chamber 600. As provided herein, the sensor(s) 210 is communicative with the controller 220, and the controller 220 is communicate with the remote management system 420.

In some embodiments, prior to initiating the germicidal or UV treatment session (e.g., prior to activating the UV light source(s)), the sensor(s) 210 and/or controller(s) 220 are initiated or set-up. In order to do so, in some cases, as shown at 504, certain set-up or initializing information may need to be entered, if not done so previously. Such information or initializing steps May include connecting the controller 220 to the communication network 15, for example, by entering WiFi/Hotspot SSID and password information, entering a user ID and password (e.g., by the operating technician or employee), etc.

In addition, it may be necessary to communicate with the remote management system 420 in order to identify the precise location of the sensor 210. For instance, the location of the sensor 210, within the treatment chamber 600 or otherwise within a room, may determine a particular treatment parameter or threshold corresponding to a particular treatment session. As just an example, a sensor 210 positioned closer to the UV light source may have a different minimum or maximum energy or dosage threshold or parameter than a sensor 210 that is positioned farther away from the UV light source, or than a sensor 210 that is obstructed by a wall, furniture, etc. Accordingly, when initializing the sensor(s) 210 prior to the germicidal treatment session, as shown at 506, the location of the sensor 210 is determined and in some cases communicated to the remote management system 420. It should also be noted that in some embodiments or implementations, the location of the sensor 210 (e.g., as identified by a location specific identifier) may be communicated during the treatment session and/or after the treatment session along with the data obtained or recorded by the sensor(s).

In some embodiments, the sensor 210 may be placed in a fixed location such that the location of the sensor does not change from one germicidal treatment session to another. In such a case, it is contemplated that the location information may not need to be communicated to the remote management system 420 each time. In other cases, however, the sensors 210 may be moved from one location to another (e.g., from an initial location to a target, different or new location), for example, for different or subsequent germicidal treatment sessions. When the sensor 210 is moved, a location identifier or other information or data specific to the target location is obtained and may be communicated to the remote management system 420 in order to identify where the sensor 210 will be or is located.

In some embodiments, the location identifier may be obtained by a machine-readable code 215. For example, the machine-readable code 215 may be in the form of a QR code, bar code, RFID, numerical or alphanumerical serial number, etc. which may be read, scanned or interpreted by the controller 220, sensor 210 or in other embodiments as described herein, a mobile device. More specifically, when the sensor 210 is moved to a location within the room or chamber 600, the sensor, controller or mobile device will be used to read the machine-readable code 215 to obtain the new location identifier. The new location identifier will then be transmitted to the remote management system 420 in order to identify where the sensor is now located. In some cases, the location identifier will be communicated at the initial set up prior to the treatment session in order to initialize the location of the sensor. In other cases, the location identifier may be transmitted along with the measurement data obtained by the sensors either during or after the treatment session.

Each location identifier or code 215 will be unique to a room or area, and in some cases, unique to a specific location within the room or area. Accordingly, in some cases, the location identifier or code 215 may be considered a room identifier or code in that it designates or identifies a room (e.g., living room, bedroom, conference room, dining hall, etc.) In this manner, the location identifier or code 215 may be considered a room ID or code. In some cases, the location identifier or code 215 may be more specific and may designate a specific location, area or site within a room or within a larger defined area (e.g., north end of room 26B, northeast corner of dining hall A, etc.) As another example, the location identifier or code 215 may identify the treatment to be in hospital room 628 at Acme Hospital. The location identifier or code 215 may also be specific to a location in the room, such as on a particular floor, wall, table, next to a particular window, etc. in hospital room 628 at Acme Hospital. In this manner, if the location identifier or code designates a general or broader area such as a room, it can be and is sometimes referred to as a room code or ID herein. A location identifier designated as room code or ID may include or be associated with several site-specific location identifiers, for example, that are placed within the room.

In some embodiments, the machine-readable location identifier or code 215 may be physically attached to the location, for example, to a wall within a room. In this manner, in order to identify that a particular sensor 210 is now in a particular room, the controller 220 or sensor 210 will scan the code 215 to obtain the unique location identifier and communicate that identifier to the remote management system 420. This is shown in FIGS. 19 and 20, for example.

In other cases, the location identifier or code 215 may be shown or displayed in a room diagram, photo, phone, tablet, or other device. Once the code or identifier is scanned or read, then the diagram, map, photo, etc. can be used to show where in the room the sensor should be placed during the germicidal session.

Based on the particular location of the sensor 210, for example, as defined by the location identifier discussed above, one or more treatment parameters or thresholds can be defined for the sensor. In particular, the remote management system 420 may, in at least one embodiment, have a plurality of data and parameters that can be used to define minimum and/or maximum thresholds for each sensor, depending on the type of sensor (e.g., air flow sensor, UV wavelength sensor, etc.) and the type of targeted pathogen. Accordingly, the treatment parameter or threshold may be in the form of an energy level, dosage level, air flow rate, temperature, pressure, etc.

With the sensor(s) 210 in place and the treatment parameter(s) or threshold(s) defined for each sensor, as shown at 508, the germicidal treatment session may begin. For example, the UV light source(s) may be activated or turned on, and the sensors begin to monitor the treatment.

If, during the germicidal treatment of the treatment chamber 600, or in some cases after the germicidal treatment of the treatment chamber 600, it is determined that the treatment parameter(s) or threshold(s) is/are not satisfied, for example, based on the measurement(s) obtained by the sensor(s) 210 as compared to the parameters or thresholds provided or defined by the management system 420, then one or more actions are initiated, as represented as 510. In particular, if the one or more parameters is not obtained and the minimum parameters or thresholds are not achieved (e.g., air flow is too low, UV energy or dosing levels are too low, etc.) or if the one or more parameters or maximum thresholds are exceeded (e.g., air flow is too high, UV energy or dosing levels are too high), then it may be determined that the parameter(s) or threshold(s) is/are not satisfied.

More specifically, in some cases, the controller 220 or management system 420 is communicative with one or more of the germicidal treatment components or devices, such as one or more of the UV light sources, fans, heaters, coolers, etc. In such a case, the actions represented in 510 may be defined as a corrective action that automatically adjusts one or more settings or controls of at least one germicidal treatment component. In particular, the actions may include communicating with the UV or germicidal treatment component to perform a new function, activate or deactivate a UV lamp or bulb, activate or deactivate a fan, move the component to a new or different location, etc.

In some cases, or embodiments, the controller 220 or management system 420 may be communicative with one or more relays or power devices such that the action(s) represented in 510 may include activating or deactivating a relay or power component, which in turn, activates or deactivates one or more treatment components such as UV light sources, UV lamps, UV bulbs, fans, heaters, coolers, etc.

Additionally, the actions represented at 510 in FIG. 17 may also or instead include one or more messages or notification, for example, in the form of a text message, SMS message, email message, phone call, etc. to one or more designated recipients or users indicting the status of the treatment and the failure to satisfy the one or more parameters or thresholds. The notifications or alerts may also be in the form of one or more warning light(s) or indicators on the controller and/or sensor.

In any event, when the treatment session is completed, e.g., based on the expiration of a predetermined amount of time or based upon reaching certain predetermined energy or dosing levels, as shown at 512, the treatment session details (e.g., location information of the sensors, room identification number(s) or code(s), QR code identification number(s) or code(s), sensor identification number(s) or code(s), UVC device identification number(s), final UV dose level, total time of UVC detection, date, start time, end time, technician identification, and technician notes) may be communicated to the remote management system 420 for recordation and storage.

Figure 21:
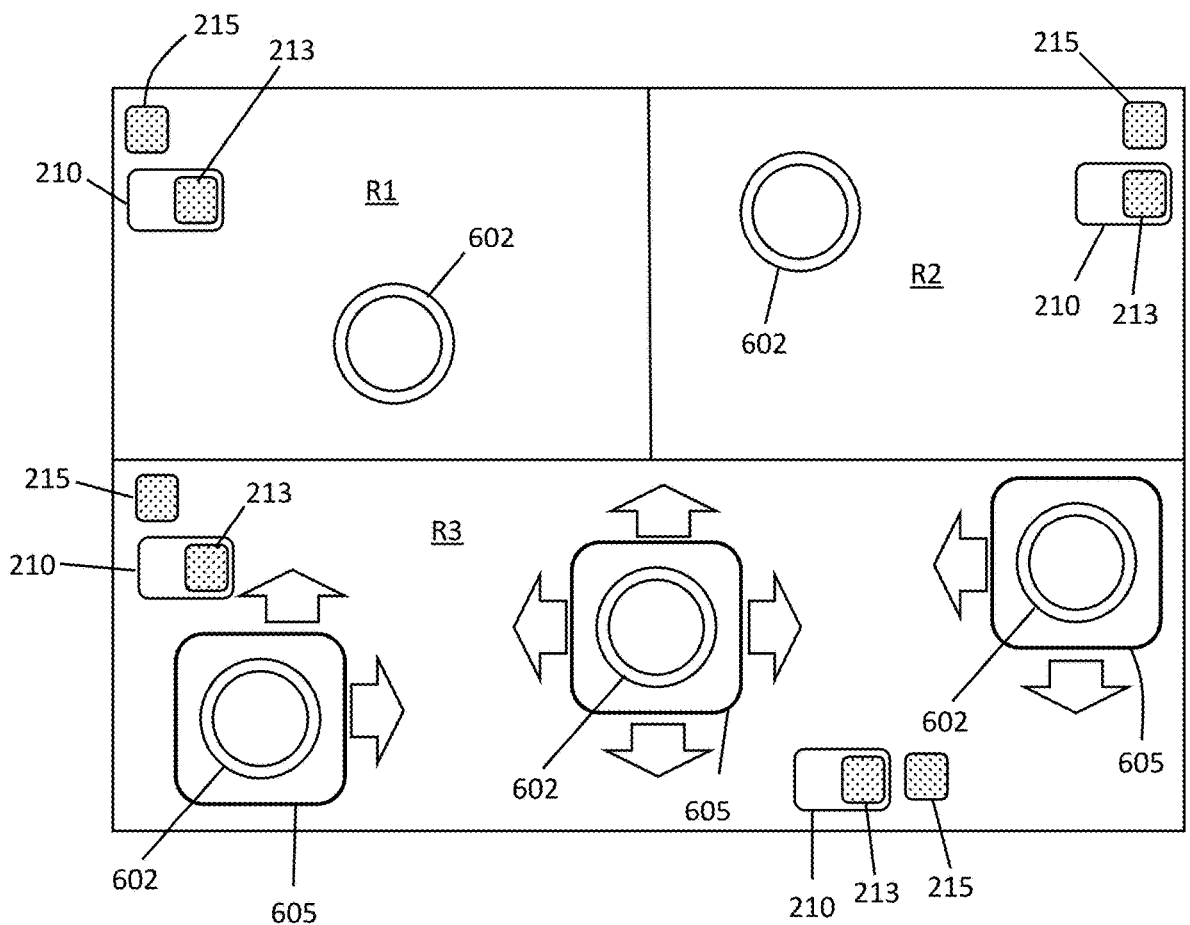
FIG. 21 is a floorplan view of further exemplary treatment chambers as disclosed in accordance with at least one embodiment of the present invention.

With reference now to FIG. 21, further exemplary embodiments of the present invention are shown. In this example, a top-down floorplan-style view is shown of a building with three rooms R1, R2 and R3. At least one sensor 210 is placed in each of the rooms along with at least one germicidal source or UVC source, referenced as 602. As provided with regard to at least one embodiment disclosed herein, the sensor(s) 210 may be fixed or otherwise programmed in accordance with its particular location, or in other embodiments, the sensor(s) 210 may be movable or dynamic in that they can be selectively moved from one location to another, if desired or as desired. In particular, when a sensor 210 is moved from one room or location to another room or location (including from one location or site within a room to another location or site within the same room), e.g., in between or even during treatments, in at least one embodiment, the moved sensor 210 may need to be identified, paired to or associated to each location or the new location for each UV treatment.

Accordingly, in at least one embodiment, the sensor 210 may include an identifier, code, etc. (such as, but not limited to a QR code, bar code, RFID, numeric or alphanumeric serial number, etc.) referenced as 213. The sensor code 213 may be in addition to the location code 215, such that, prior to treatment, the location code 215 may be scanned or read and the sensor code 213 may also be scanned or read. By doing so, an association between the location (identified by the scanned location code 215) and the sensor 210 placed in or proximate to the location (identified by the scanned sensor code 213) is communicated to the management system 420. When the treatment is finished, the results of the treatment, e.g., the data obtained by the sensor(s) 210 during treatment, can be communicated to the cloud or management system 420, or in some cases, a local storage or mobile device, as described below. In this manner, any sensor 210 can be used at any location through the association created by the linked IDs or codes 213, 215, and therefore, the sensor location and associated parameters of certain embodiments need not be pre-programmed and can thus be considered dynamic.

It should also be noted that, as provided herein, a mobile device 800 may be used to perform the scanning and reading of the codes 213, 215, as well as other functions. The mobile device 800 may be in the form of a handheld scanner or reader, although in several embodiments, the mobile device 800 includes a mobile phone, smartphone, tablet computer, etc. and thus may be, but is in no way limited to, an APPLE® iPHONE®, ANDROID® based phone, APPLE® iPAD®, ANDROID® based tablet, or other like devices. In this manner, the mobile device 800 may be communicative with the management system 420 of at least one embodiment of the present invention in order to transmit various information and data, such as sensor identification information, location identification information, and other information, including the results of the treatment in some cases, in accordance with the various embodiments disclosed herein.

Furthermore, as provided herein, the sensor(s) 210 may also be in communication with the management system 420 and/or mobile device 800, for example, to report results, receive minimum/maximum dosage levels, treatment protocols, etc. Similarly, the UV source(s) 602 may also be in communication with the management system 420 and/or mobile device 800 to send and/or receive treatment protocol information such as, but not limited to, minimum/maximum dosage levels, for activation/deactivation of the light source, movement of the light source throughout the location, etc.

Moreover, since the room or location identification (e.g., via the code 215) may be stored in the cloud server or management system 420, and since the room or location identification is associated with a known facility or a known room or location R1, R2, R3 of a known facility, then any sensor 210 with a cloud-registered code 213 or identification can be used at any location. In other words, any sensor 210 can simply be used at any location by associating the sensor 210 with the location R1, R2, or R3 through the codes 213, 215 (e.g., as provided above). This means that the sensor(s) 210 do not necessarily need to be owned or operated by the particular facility and can instead be owned and/or operated by anyone, including a third-party treatment service, for example.

This may be a benefit since many hospitals, hotels, transportation terminals, etc. may then contract with third-party companies or entities to provide cleaning and disinfection services. Therefore, any entity providing UVC or disinfection services through the present invention for a facility can use one or more cloud-registered sensors 210 to provide treatment at any location in the United States or Worldwide. The treatment data, treatment entity's name, and sensor ID (sensor identification), and all other data acquired will be associated with the corresponding and correct room/location for the treated facility. In this manner, a national or international network of unrelated companies that provide UVC or other germicidal treatment can service any hospital, restaurant or facility with registered QR codes.

More in particular, FIGS. 22A-22F provide exemplary illustrations of a back-end dashboard 700 for a user to access, or a representative of a facility or disinfection entity, in accordance with at least one exemplary embodiment of the present invention. The dashboard or back-end 700 may be accessible by a user (e.g., an employee or representative of the hospital, restaurant or other facility, a user or representative of a third-party disinfection entity, or a user of the method or system of the present invention such as a product manager) through the use of a computer or computing device, including but not limited to a desktop computer, laptop computer, tablet computer, mobile phone or smartphone, etc.

For example, FIG. 22A illustrates an exemplary screenshot showing several defined locations, which may be separated by groups, such as "North Wing," "East Wing," etc. as desired or convenient. In the embodiment shown, each location includes a name 702a, a description 702b, an identification of one or more pathogens 702c, and in some cases, a minimum and maximum dose level 702d, 702e and a date of last treatment 702f. As an example, the pathogen identified is the target pathogen desired to be eliminated or disabled at that location. It should be noted that in some embodiments more than one pathogen may be assigned to or identified by a single location, and of course, multiple locations can have the same target pathogen(s).

More specifically, with reference to FIG. 22B, and in particular as referenced at 704, several pathogens, organisms, microbes, species, strains, etc. may be entered and defined through the back-end management system 700 of at least one embodiment of the present invention. For each of the identified pathogens or organisms 704, in some cases, a species 704a and/or strain 704b may be identified or specified. A label or name 704c may also be entered or specified for easier identification. Specifically, however, for each of the pathogens or organisms 704 identified, a lethal dose is defined, as shown at 704e, which may correspond with a particular lamp type identified at 704d. In particular, as provided herein, each pathogen 704 has its own lethal dose value. These lethal dose values are often (although not always) measured in terms of $mJ/cm^2$ and are the multiplication product of UV energy times exposure time in seconds. Research from various institutions determine what dose level is effective at deactivating or killing a pathogen under specific conditions and environments and to what log level (percentage) the pathogen is deactivated or killed. As provided in FIG. 22B, this information is entered into the system or method, for example, at the backend management system 700.

Thus, with reference again to FIG. 22A, when one or more pathogens are identified at 702c for each room or location (e.g., the pathogen(s) which are desired to be removed or disabled at each location), that pathogen or those pathogens are referenced to the list in FIG. 22B to include the corresponding lethal dose levels 704e, and in some cases, a minimum and/or maximum dose level that may also be defined for each pathogen, if desired.

Figure 22C:
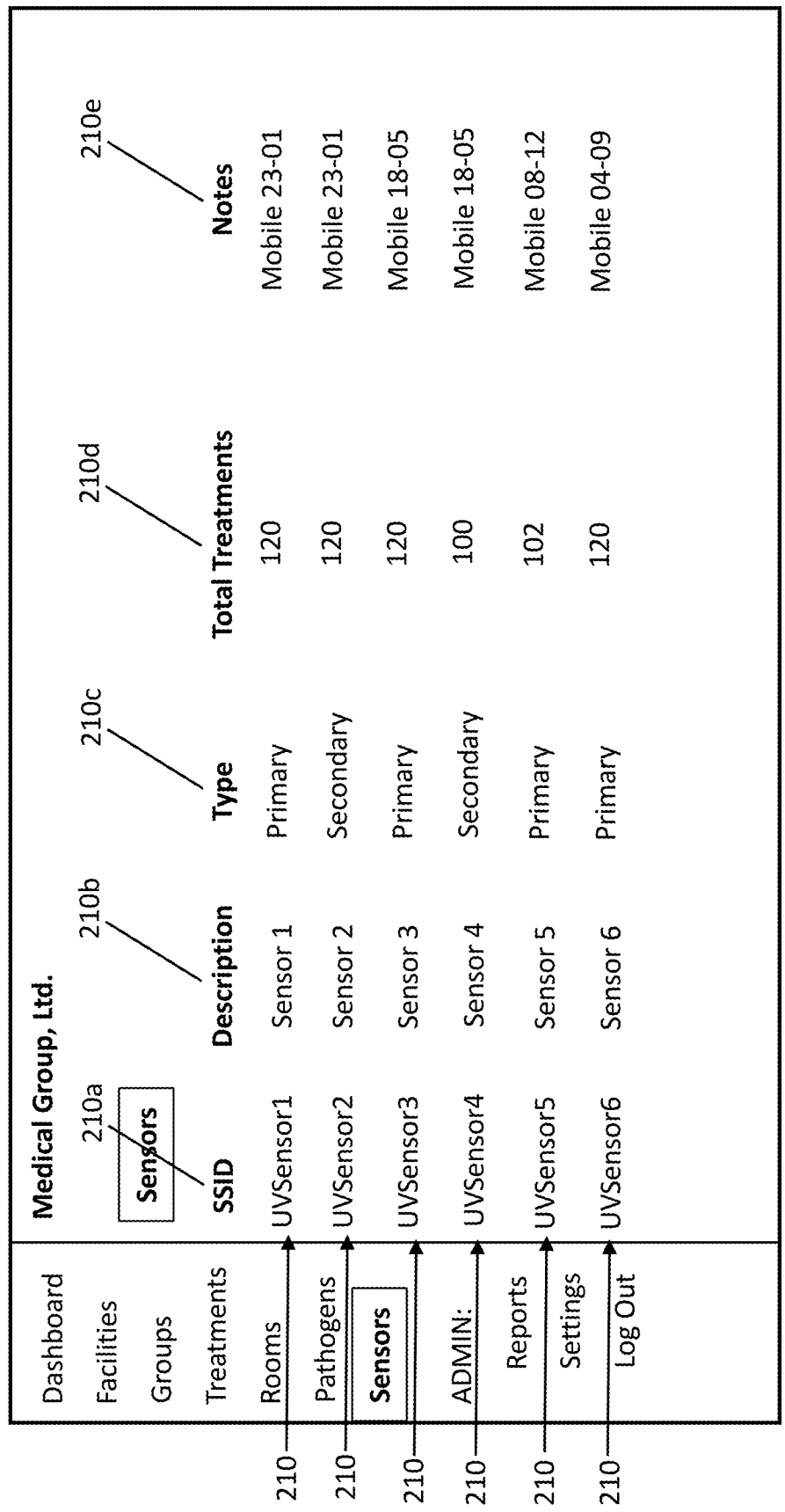
FIG. 22C is a schematic of an exemplary screenshot of a management backend tool showing a list of cloud-registered sensors as disclosed in accordance with at least one embodiment of the present invention.

Next, and with reference now to FIG. 22C, one or more sensors 210 may be defined or recorded into the backend management system 700. For example, each sensor 210 may include a unique identification or ID, 210a, a description 210b, a type of sensor (e.g., primary, secondary, etc.) 210c, a counter 210d for the total number of treatments conducted with the sensor, and/or a section for notes 210e.

Figure 22D:
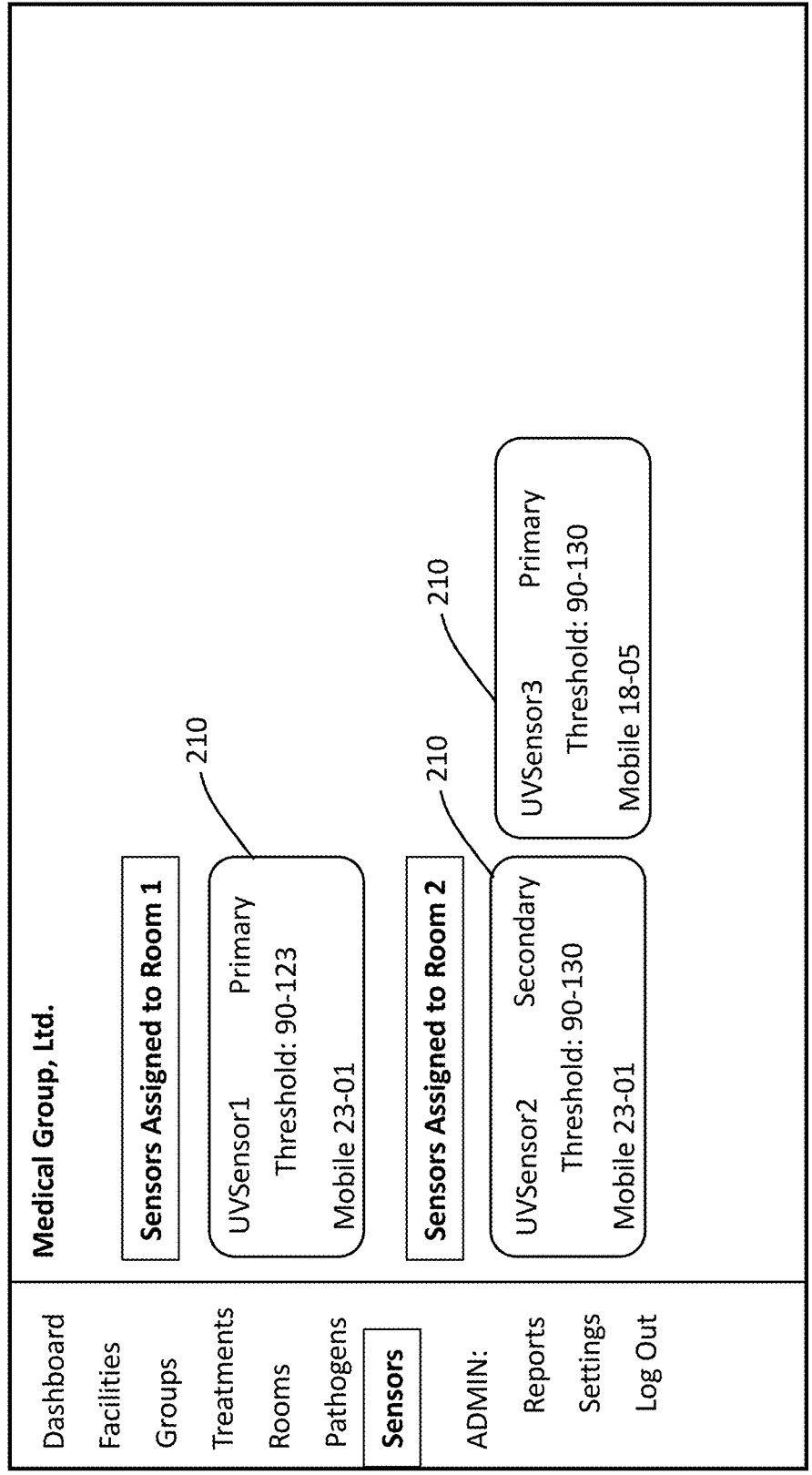
FIG. 22D is a schematic of an exemplary screenshot of a management backend tool showing a list of sensors assigned to rooms as disclosed in accordance with at least one embodiment of the present invention.
Figure 22E:
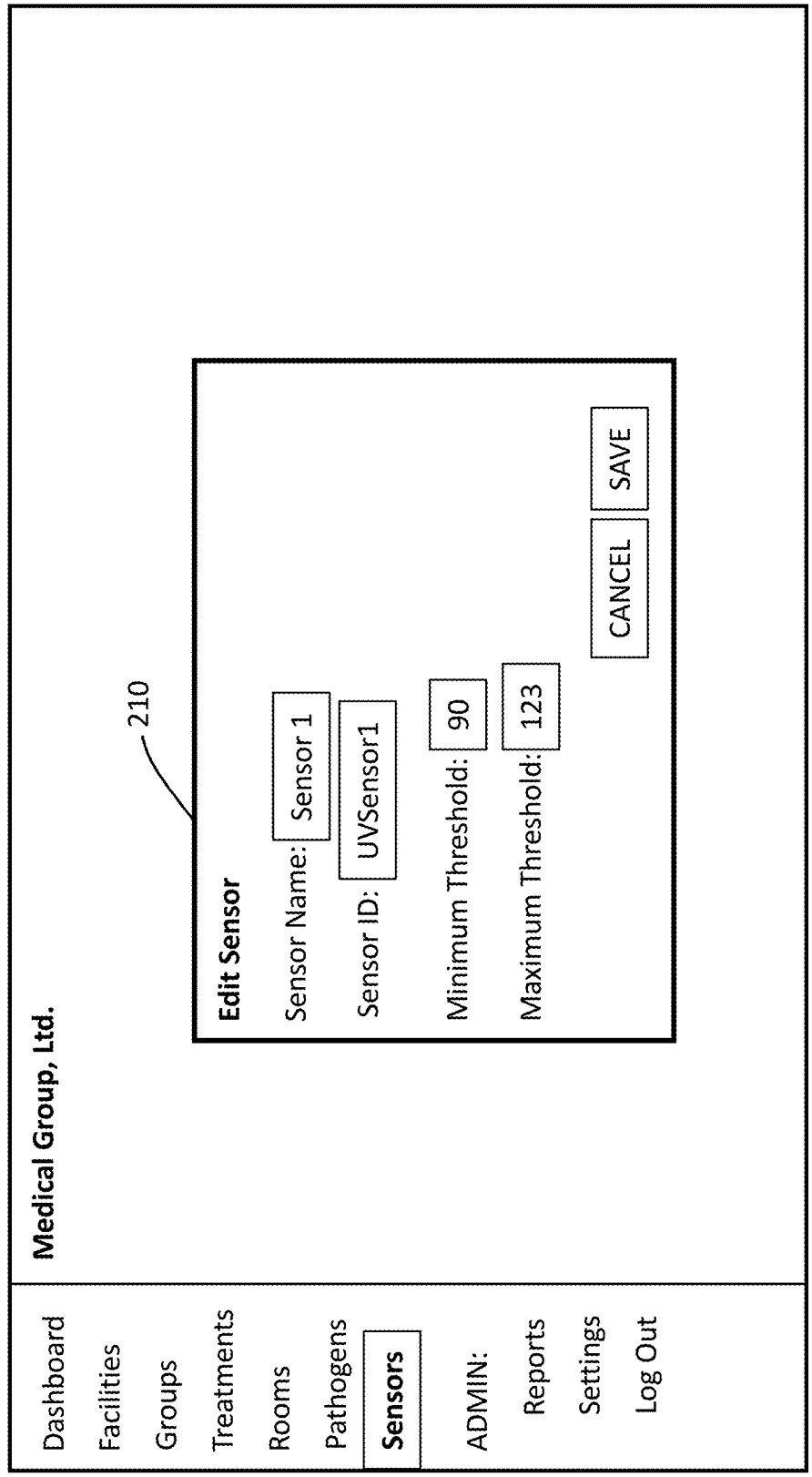
FIG. 22E is a schematic of an exemplary screenshot of a management backend tool where sensor information can be edited as disclosed in accordance with at least one embodiment of the present invention.

With reference to FIGS. 22D and 22E, the sensor(s) may be assigned to a location (e.g., a facility, room, etc.) As provided herein, the assignment of a sensor to a location may be accomplished in several different manners. For example, a sensor may be fixed or semi-fixed in that the sensor may be manually assigned to a location through the backend (or other manners) and not intended to move or otherwise not intended to move frequently. In other cases, the sensor(s) may be assigned or linked to a location before or after each treatment, if desired. This can be done manually though the backend management dashboard 700, although as described herein, assigning a sensor to a location can be accomplished on-site though the use of a mobile device 800. More specifically, a mobile device 800 may be used to scan or read a code 213 associated with the sensor and scan or read a code associated with a location 215. Doing so, for example, through the use of mobile application 810 may assign the particular sensor to a particular location. Since the location may be linked to one or more pathogens (e.g., as shown in FIG. 22A), a desired or lethal dose (e.g., lethal dose parameters 704e, minimum and/or maximum dose levels, etc.), or other treatment protocols, assigning the sensor to the location may also correspondingly assign the treatment protocols to the sensor. In some cases, the parameters May be manually defined for each sensor, if desired.

Figure 22F:
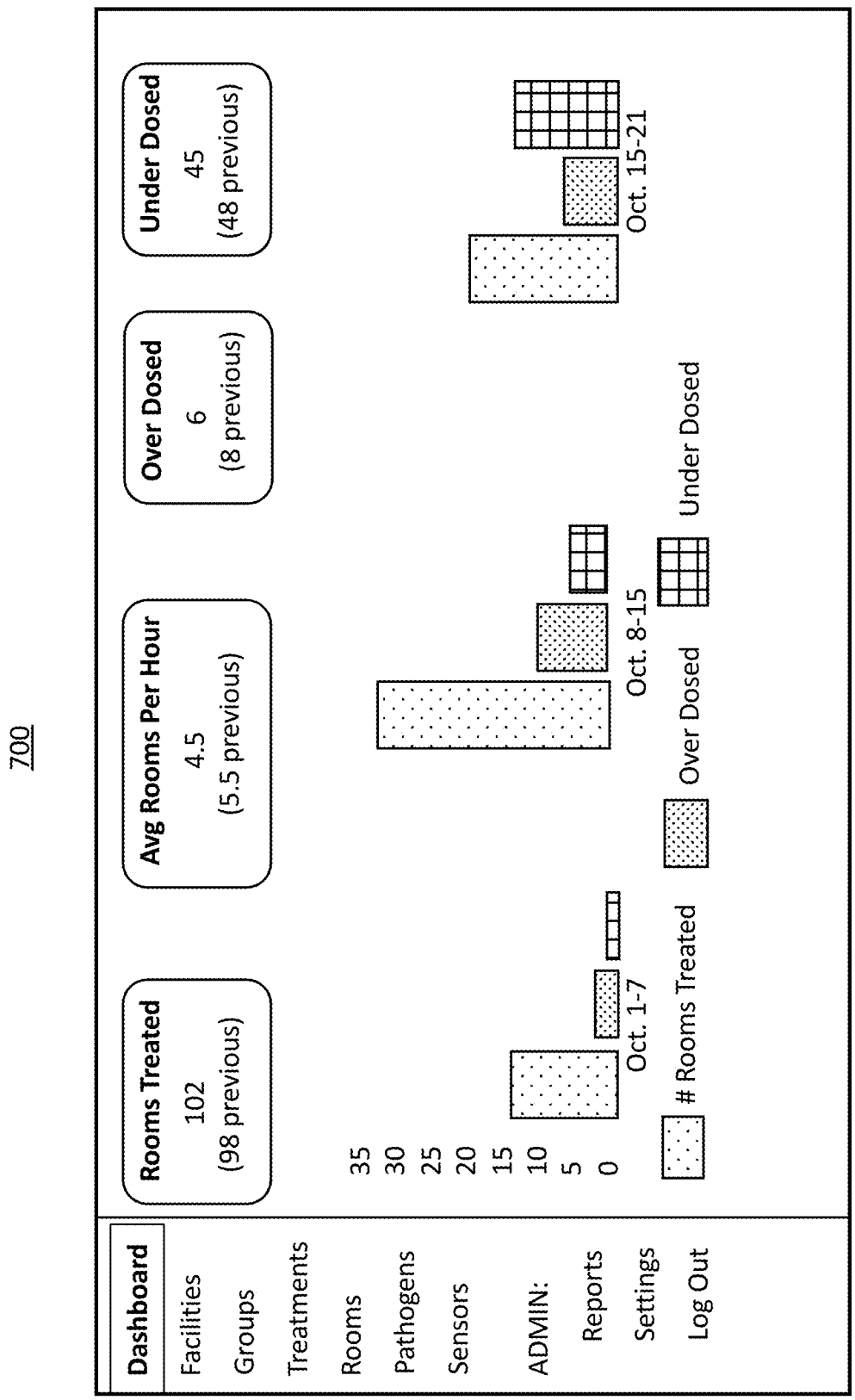
FIG. 22F is a schematic of an exemplary screenshot of a management backend tool graphically illustrating analytics as disclosed in accordance with at least one embodiment of the present invention.

FIG. 22F is provided to show an exemplary performance summary for a particular user, group, facility or entity, based on the data received from the sensor(s) and the treatments performed. Other embodiments may include other data or other summaries as desired.

Furthermore, FIGS. 23 and 24A-K illustrate an exemplary flowchart and screenshots of the mobile device 800, respectively, used in connection with the operation of at least one embodiment of the present invention. More specifically, a mobile application 810 may be accessible by or on the mobile device 800, for example, by being downloaded and installed thereon, by being accessible by the mobile device 800 through a web-based interface, etc. The application 810 facilitates implementation of at least one embodiment of the present invention, as described herein, and may facilitate communication by and/or between the sensor(s) 210, code(s) 213, 215, UV light source(s) 602, and the cloud or management system 420.

Figure 23:
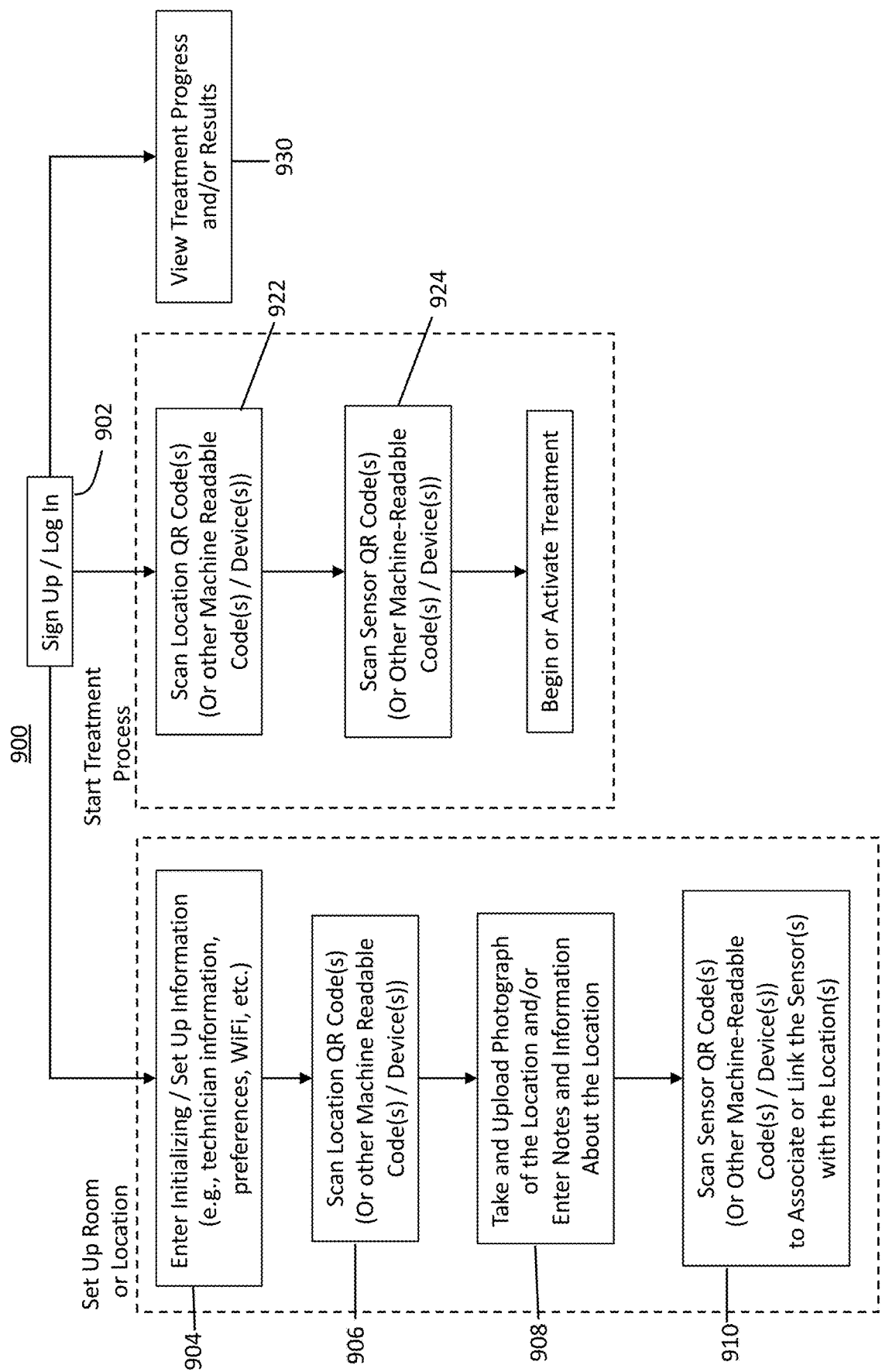
FIG. 23 is a flow chart illustrating an exemplary method of at least one embodiment of the present invention.
Figure 24D:
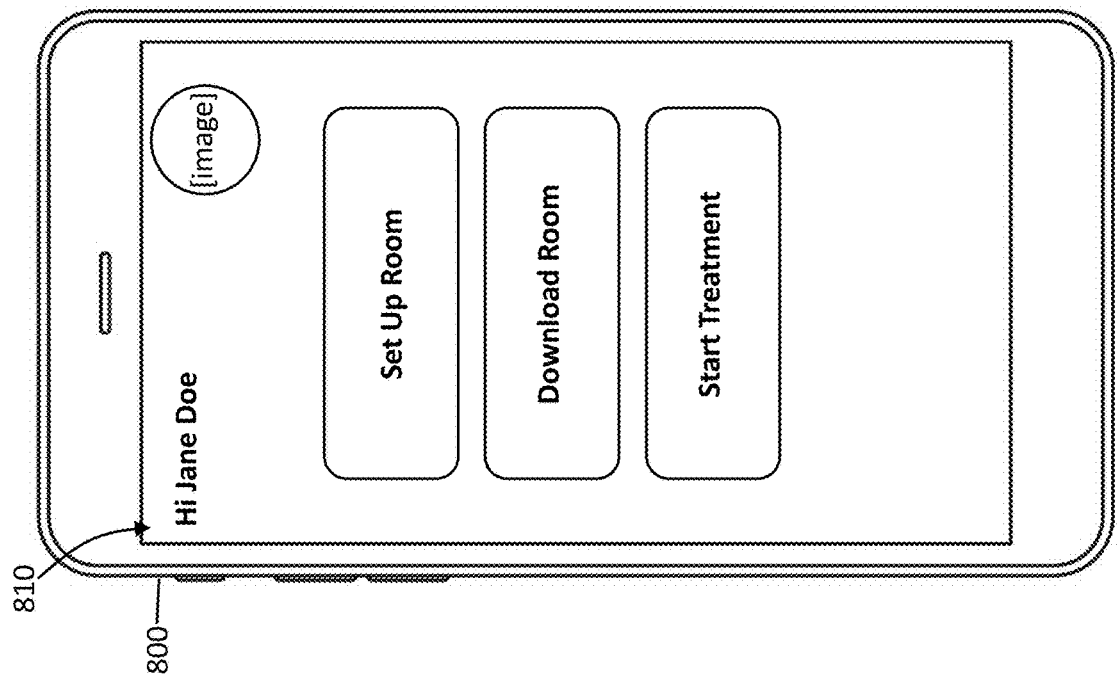
FIG. 24D is an exemplary screenshot of a mobile application and mobile device showing several actions available in accordance with at least one embodiment.
Figure 24C:
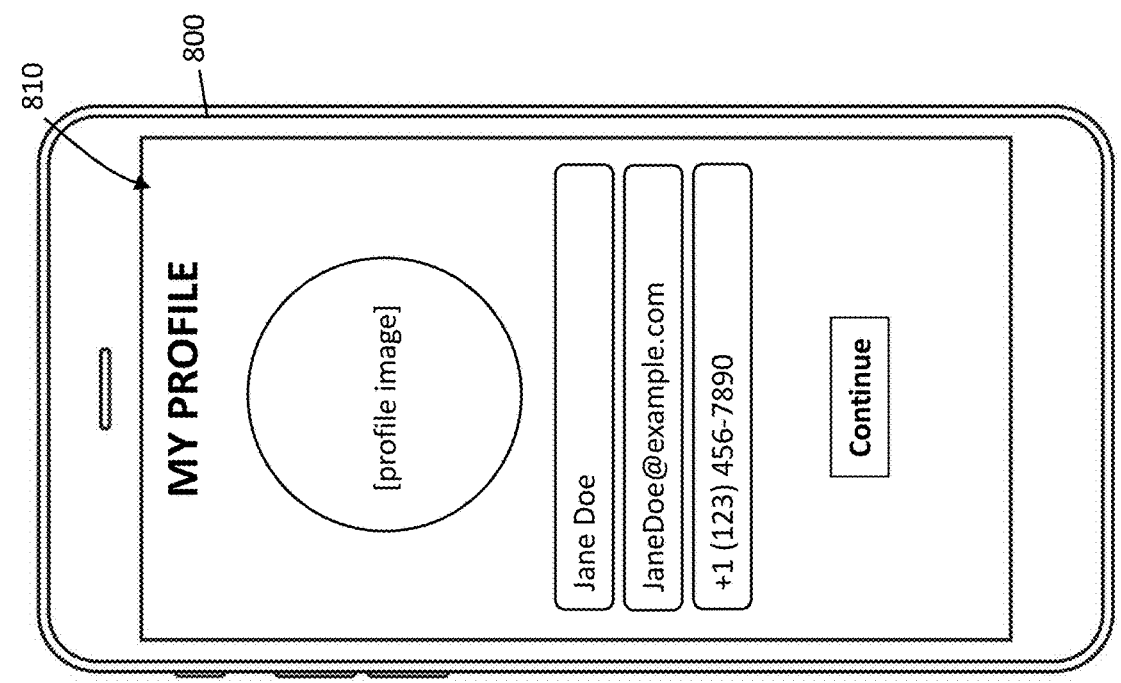
FIG. 24C is an exemplary screenshot of a mobile application and mobile device showing a profile screen in accordance with at least one embodiment.

For instance, as referenced at 902 in FIG. 23, and as exemplified in FIGS. 24A-C, the method 900 of at least one embodiment may include a user signing up or logging into the mobile application 810. The user may be a technician, a representative of the facility or location, a representative of a third-party disinfecting entity, etc. In any case, signing up or logging into the application may require entry of some identifying information, such as name, email address, phone number, password, etc. Signing in with other services, such as GOOGLE® or FACEBOOK® may be allowed in some embodiments.

Furthermore, with reference to FIG. 24D, once logged in, a user may choose to set up a room, download a room, or start a treatment or other functions. More specifically, in some cases, prior to starting treatment within a room or location, the room or location may need to be defined or set up. Doing so may, in some cases, create a location entry in the management backend 700, as described previously. As just an example, as shown a 904, setting up or defining a room may include entering various identifying information for the particular technician (e.g., name, phone number, ID number, email, notes, etc.), particularly if the technician is different than the user. Other information may include days or times for treatment, or other treatment parameters. Furthermore, a local network or WiFi may be set up, for example, by obtaining the SSID and password. This information can then be passed or communicated to one or more sensors, light sources or other equipment in order to allow the equipment to communicate with one another and/or with the remote management system 420.

Figures 24E, 24F:
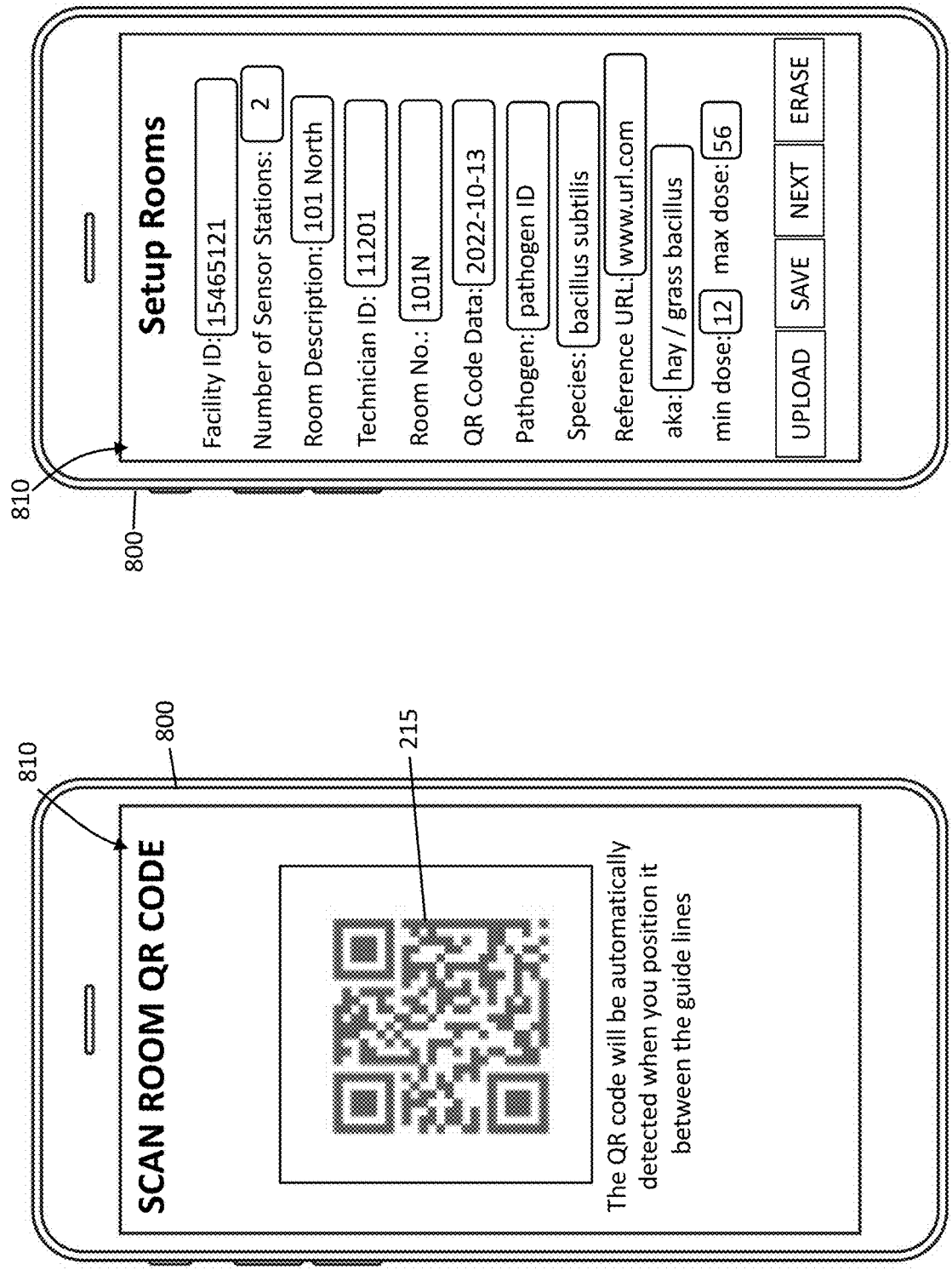
FIG. 24E is an exemplary screenshot of a mobile application and mobile device showing a scan room QR code screen in accordance with at least one embodiment.
FIG. 24F is an exemplary screenshot of a mobile application and mobile device showing a set up room screen in accordance with at least one embodiment.
Figure 24H:
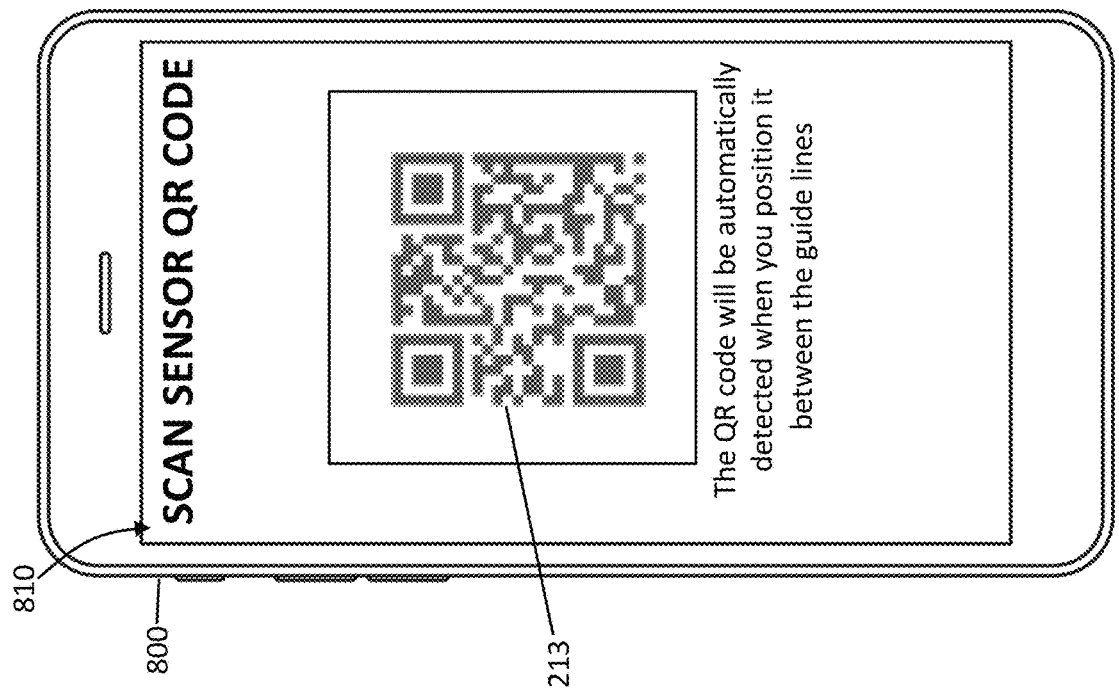
FIG. 24H is an exemplary screenshot of a mobile application and mobile device showing a scan sensor QR code screen in accordance with at least one embodiment.
Figure 24G:
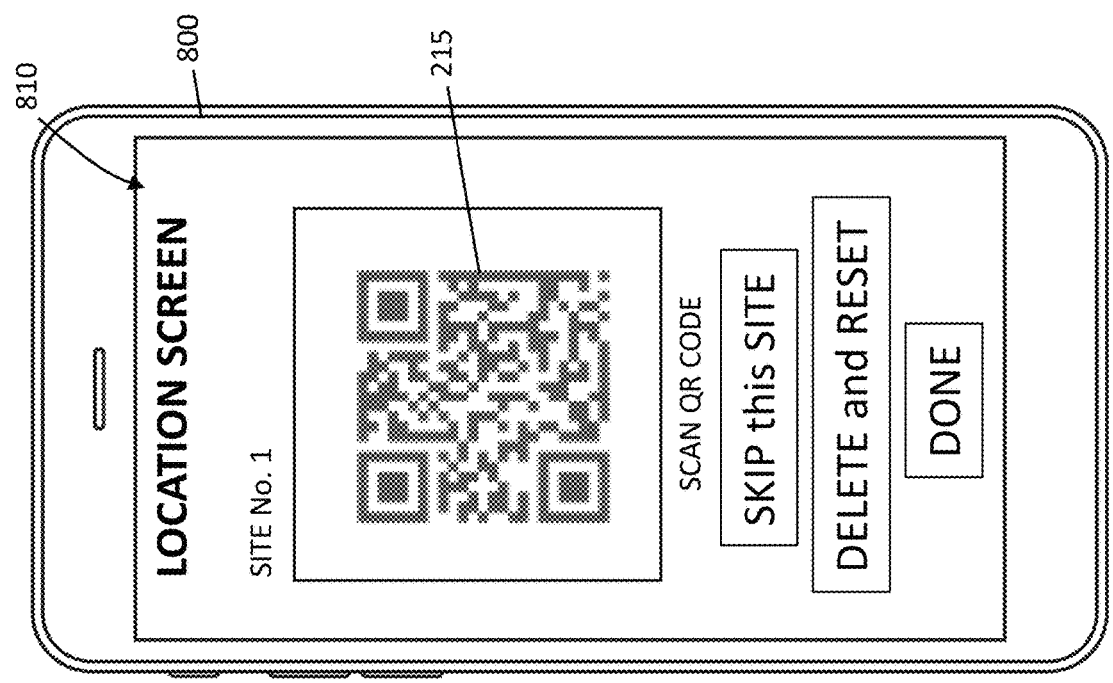
FIG. 24G is an exemplary screenshot of a mobile application and mobile device showing a scan location QR code in accordance with at least one embodiment.
Figure 24J:
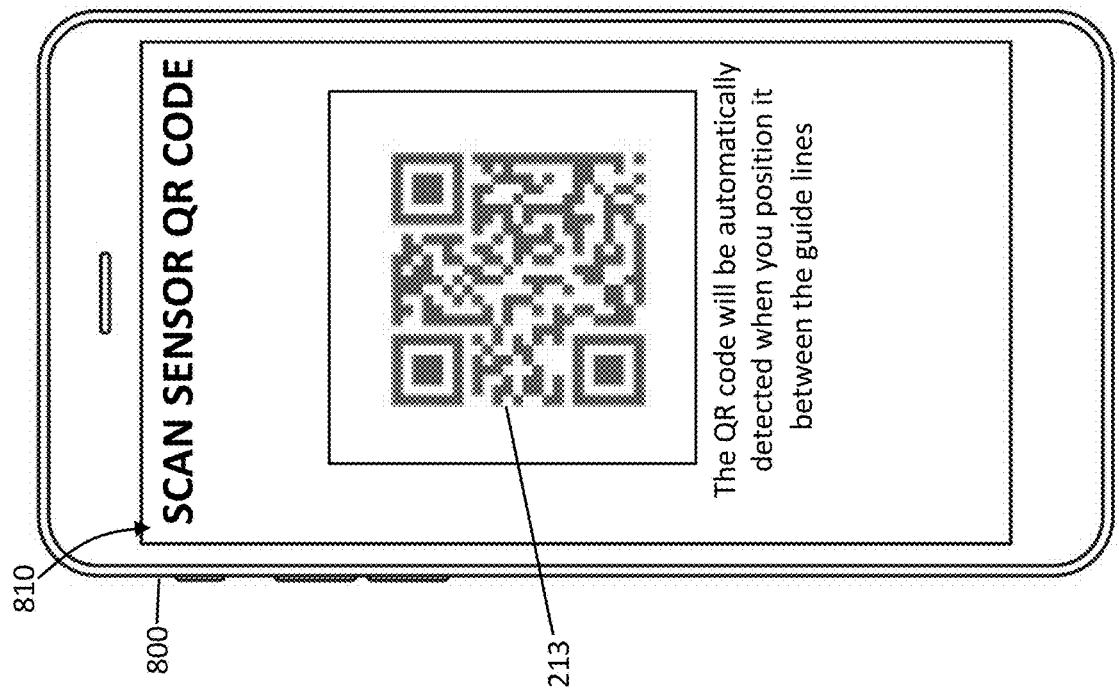
FIG. 24J is an exemplary screenshot of a mobile application and mobile device showing a scan sensor QR code screen in accordance with at least one embodiment.
Figure 24I:
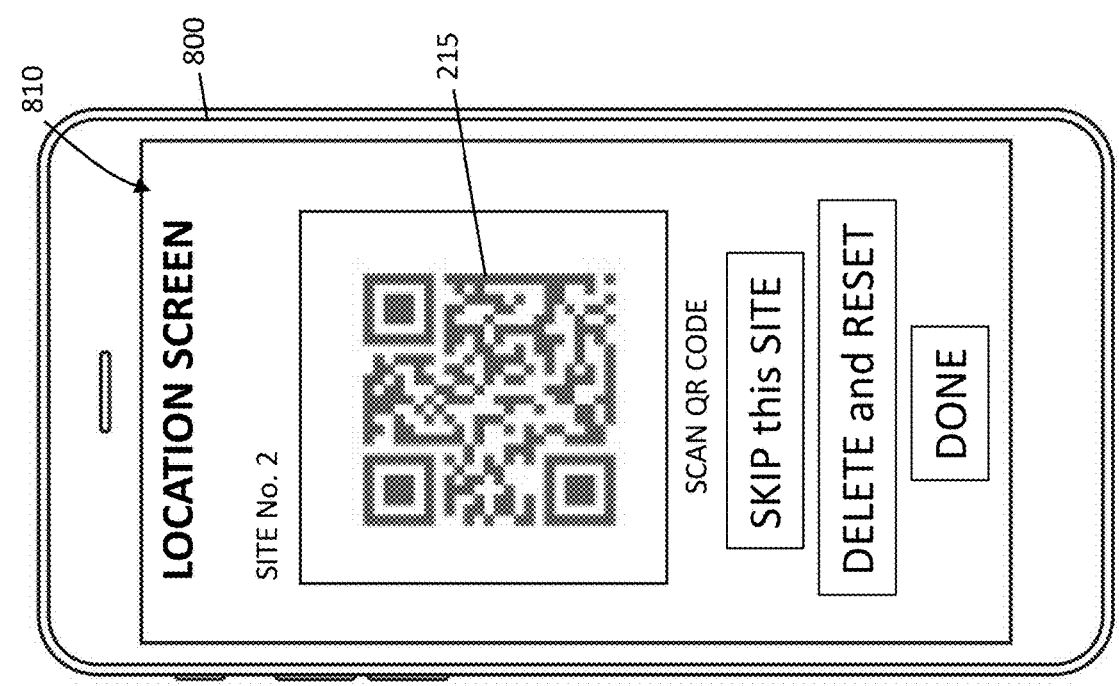
FIG. 24I is an exemplary screenshot of a mobile application and mobile device showing a scan location QR code screen in accordance with at least one embodiment.

Next, setting up the location or room may then entail scanning the location code 215, for example, as shown at 906 in FIG. 23 and in the exemplary screenshot of FIG. 24E. Scanning the location code 215 will obtain the location identification or ID unique to that location. This information can be communicated to the management system 420 and recorded in the corresponding entry. If desired, as shown at 908, one or more photographs of the location or room may be taken and recoded, for example. The photograph(s) may be communicated to and save at the remote management system 420 for later reference and retrieval.

It should also be noted that, within each room or location, there may be several stations or sites where one or more sensors may be placed. In such an embodiment, a single room may include several (e.g., two or more) QR or other codes that need to be recorded and defined. For example, as shown in FIG. 24F, a single room may have two (or more) sensor stations. In some cases, each sensor station includes a separate location code, which during set up, should be scanned or read and recorded.

Furthermore, during set up, as shown at 910, each of the sensors 210 are identified, for example, by scanning or reading the corresponding code 213 associated with the particular sensor 210. In some cases, the location or site code 215 is scanned, then the corresponding sensor code 213 is scanned. Doing so will associate the sensor 210 with the particular location for purposes of treatment and for providing proper treatment protocols, as defined by the management dashboard 700 and provided herein. FIGS. 24G-J are representatives of exemplary screenshots of the location code(s) 215 and the sensor codes 213 being scanned for this step.

Once the room(s), location(s) and sensor(s) are set up and defined, and with the light source(s) in place, then treatment can begin. For example, in at least one embodiment, treatment may begin through activation in the mobile application 810. In such an embodiment, the mobile application 810 may allow the user to start, stop and pause the treatment of a particular room or location by pressing or activating corresponding buttons, not shown. In some cases, prior to starting the treatment, the user may need to scan or read the location code(s) 215 and the sensor code(s) 213, for example, using the mobile device and/or application, as referenced at 922, 924 in FIG. 23.

In any case, treatment protocols and data from the cloud or management system 420 (e.g., location ID, sensor ID, minimum dosage, maximum dosage, lethal dosage, number of sensor locations, etc.) may be obtained. This information can be communicated to the sensor(s) 210 and/or the light source 602 in order to manage or control the treatment based thereupon. As described herein, this information (e.g., treatment protocol information) can be communicated to the sensor(s) 210 and/or the UVC lamps or other light sources 602 from a remote location (e.g., from the remote management system 420) and/or from a local location (e.g., from the mobile device 800 or mobile application 810). In the case of a local communication of treatment protocol information, a technician may download onto the mobile device 800 or previously obtain the treatment protocol information from the cloud or remote server 420. Then, while on-site, the information can be transferred to the local equipment (e.g., sensor(s) 210, controller(s) 220, UVC source(s) 602) through any communication methods, such as wired communications or connections or wireless communication (e.g., Bluetooth, Zigbee, WiFi, local area network, wide area network, world wide web or Internet, etc.)

Figure 24K:
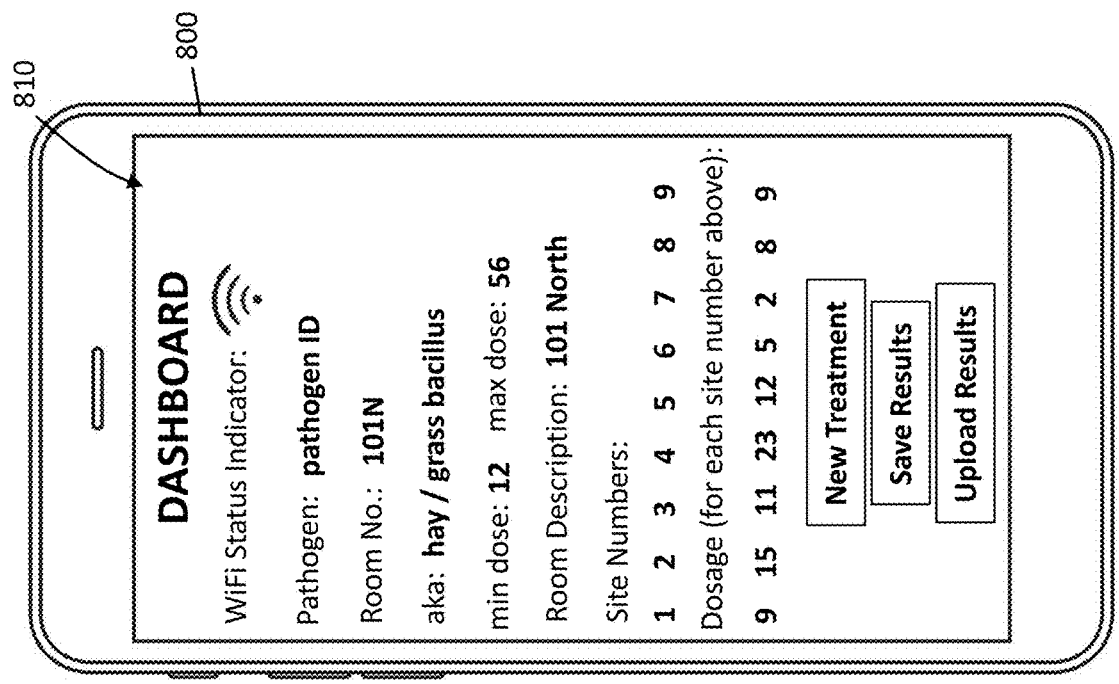
FIG. 24K is an exemplary screenshot of a mobile application and mobile device showing a dashboard in accordance with at least one embodiment.

Furthermore, with reference to FIG. 24K, and as shown at block 930 in FIG. 23, in at least one embodiment, the user may monitor the treatment using the application 810 and/or view the results thereof as recorded by the sensor(s) 210. For example, a dashboard may be provided that shows various treatment information corresponding to a particular location, such as the pathogen targeted (e.g., as defined in the cloud via the management backend 700), the location or room number or ID, the location or room name, the minimum dose level obtained, the maximum dose level obtain, etc. Furthermore, for each location, (e.g., locations 1-9 in the example provided), the dosage level is shown.

It should also be noted that, as mentioned above, the system and method of at least one embodiment of the present invention is not limited to real-time data transfers. More specifically, various treatment data and information, such as but not limited to, room or location ID, dosage treatment levels, minimum/maximum dosages, etc. may be downloaded, saved or recorded to the mobile device 800 (or other device) prior to initiating the treatment. The downloaded information and treatment data can then be communicated to the equipment locally (e.g., the sensor(s), controller(s), light source(s), etc.) from the mobile device 800 without requiring the local equipment to connect to an external network or communicate with the remote management system 420. Similarly, after treatment, the results of the treatment, e.g., dosage levels obtained, time of exposure, etc., can be recorded by or saved on the mobile device 800 (or other local device) and subsequently uploaded to the management system 420.

Additional features of certain embodiments of the present invention may also include an augmented reality (AR) function or option. In particular, when a code is scanned, such as location QR code 215 and/or a sensor QR code 213, a specific room or location is identified based thereupon, as provided herein. Visual pointers, instructions, data, etc. can be displayed in a AR visual, e.g., overlaid, onto the visual view, display of the room or location, as shown through the camera or other like feature of the mobile device. This can assist the technician with placement of the UVC or other treatment equipment, including, for example, the lamps, sensors, relays, etc. The AR overlay or display may also provide assistance with and display of treatment duration, secondary or additional placement areas for treatment equipment, treatment durations for the secondary or additional treatment areas, directionality of the UVC lamps, etc. Furthermore, the AR functionality or display of at least one exemplary embodiment and be used to provide or display operating instructions for the sensor controls, troubleshooting operation issues, maintenance assistance instructions and visuals, special tasks or safety procedures to be performed in the room prior to treatment, etc.

In addition, certain components or treatment equipment of the present invention May include positioning or movable assemblies that allow the equipment to move or to be relocated. As an example, one or more of the UVC lamps may include or be mounted to a positioning assembly, generally referenced as 605 in FIG. 21, which allow the UVC lamp to move or be repositioned within the location or room R3. In this manner, the UVC lamps or light sources 602 equipped with or attached to positioning assembly 605, may considered, or otherwise may function as, robotic UVC units. In this manner, the robotic UVC units 602/605 may in some embodiments operate autonomously in that they receive or gain information regarding the environment, such as, the location of obstacles as well as sensor and dosage information in order to move about the room or other area without human intervention.

In any event, as described herein, since the UVC lamps or light sources may be communicative with the management system 420 of at least one embodiment, it is contemplated that the dose levels (or other data) obtained by the one or more sensors 210 (e.g., placed in the same location or vicinity as the UVC lamp) can be analyzed by the management system 420, mobile device 800 or by the UVC lamps themselves in real-time. When it is determined that a sensor (or more than one sensor) has reached a minimum dose level (or otherwise maintained a particular predefined threshold), then the positioning assembly 605 can automatically operate to reposition one or more of the UVC lamps 602 or light sources in a manner to redirect the UVC light toward one or more other sensors at the location, e.g., in the room, that have not yet reached the minimum dose level (or other threshold).

Accordingly, the positioning assembly 605 to which a UVC lamp 602 is connected or mounted may swing, rotate, lift (e.g., raise) or lower one or more sections of the UVC lamp in order to change or alter the lamp direction and/or orientation (e.g., horizontal, vertical or other orientation). Furthermore, in addition to or instead of the positioning assembly 605 being configured to redirect or reorient the corresponding UVC lamp 602, in some embodiments, the positioning assembly 605 may be structured and configured to physically move the UVC lamp(s) 602 toward the areas(s) that need additional UVC coverage or away from area(s) that have reached or are approaching the maximum dosage level. Movement toward areas that need additional UVC exposure will provide an exponential increase in UVC energy, for example, as defined by the Inverse Square Law, and may be used to avoid obstructions that may be blocking direct UVC light or exposure.

Additionally, the sensor(s) 210 of at least one embodiment may be able to use UVC energy intensity as a method to direct or position the movable or positionable lamp assemblies into an optimal location or orientation. In other words, the UVC lamps 602 may move and the sensor(s) 210 can provide energy readings to the UVC equipment. When peak UVC energy is determined, then the system, method or the UVC lamp(s) 602 would know the best orientation or location.

It should also be noted that the positioning assemblies 605 or other like equipment May contain obstacle avoidance features or sensors (e.g., infrared IR sensors, motion sensors, or other sensors to detect the present of humans, pets, animals or stationary obstacles such as furniture, walls, tables, chairs, etc.) This would minimize the risk of damage to the lamp(s), other treatment equipment or property.

In particular, for the movement and/or positioning feature of at least one embodiment, the sensor(s) and UVC lamps may communicate with one another locally, e.g., through a controller or other locally placed equipment, in order to achieve the desired location(s), etc. described herein. In other embodiments, the sensor(s), UVC lamps, and other locally placed equipment may communicate with the remote service or management system 420 (e.g., via the network or Internet) in order to achieve the desired movement, locations, orientation, etc. described herein. Accordingly, the analysis and/or calculations, as well as the instructions for movement may take place locally and/or remotely.

In some embodiments, one or more of the sensors 210 may be equipped with or otherwise include one or more laser emitters or other like assistance devices in order to provide visual assistance (e.g., to the technician) to ensure accurate placement of the sensors and accurate alignment of the sensors for capturing and reading optimal UVC lamp output.

Furthermore, in some embodiments, it may be beneficial to integrate the system or method of the present invention with an external or third party management software system, including but not limited to a hospital management software (HMS) system. For example, the HMS or other third-party management software system or suite may be integrated with or communicative with a database of the present invention that would allow communication between the HMS and the system of the present invention. More specifically, the HMS or other software system or suite may be able to automatically send pathogen information to the management system 420 of the present invention, as well as room or location ID and day/time available for treatment. The management system 420 or dashboard 700 may be able to then automatically select the appropriate minimum/maximum dosage levels or lethal dosage levels for the specific pathogen. Additionally, the HMS room and treatment information from one or more rooms can then be used by the present system 420 to automatically generate a treatment plan complete with the day/time schedule, minimum/maximum dose levels, and the appropriate QR code for each room. The plan may then be transmitted to the appropriate UVC technician or held for the technician for subsequent access or download.

Furthermore, data stored in the cloud at the management system 420 of the present invention for UVC treatment times, locations and dosages, when associated with a specific UVC device performing each treatment, will allow the cloud server or management system 420 to compute future treatment times and plans required by that UVC device to provide a minimum UVC dosage value for all other pathogens. More specifically, the system and method of at least one embodiment is capable of and configured to track the performance metrics (e.g., output energy levels) of the UVC lamps or sources 602, and based thereupon, automatically adjust the treatment parameter(s) for current or subsequent treatments. For example, over time, the energy output level of a UVC lamp or source will degrade. Further, as the energy output levels of the UVC sources degrade, the dose levels also degrade. Since dose is calculated as the multiplication product of UV energy times exposure time (e.g., in seconds), a decrease in UVC energy means that longer treatment times are required in order to maintain a lethal or minimum pathogen dose.

In this manner, while the operating time of each UVC lamp or source can be tracked and used as an estimation of the degradation of energy output levels and dose levels, such a technique can be significantly inaccurate, which may therefore result in failed treatments. Accordingly, in at least one embodiment of the present invention, the system and method is able to obtain, store and track sensor information (e.g., dosage levels received by each sensor, UVC energy levels received by each sensor) for each treatment, the system and method can use this information to identify the sensor(s) that is/are receiving the weakest UVC energy levels or dose levels. With the actual UVC energy levels and/or dose levels received by each sensor, the system and method is able to identify the location(s) within the room(s) where the UVC energy and dose levels are low, which may be the result of degradation of one or more UVC lights or sources.

Accordingly, when treatment parameters are assigned to a room (e.g., by identifying a target pathogen, minimum/maximum dose levels, etc.), the system and method can automatically determine or calculate the treatment time for any required treatment dose for any room, taking into consideration the previously recorded energy levels and dose levels in that room or from particular UVC sources. As just an example, the calculation of treatment time can be accomplished by dividing the required dose by each UVC device's weakest UVC energy level for the room being treated.

This can eliminate the need for repetitive, on-site manual testing of the UVC device in each room to determine the correct UVC treatment duration. When multiple sensors are used, then the sensor location of each room that provides the lowest dosage reading will be used for calculation. Thus, all other room locations will be higher and thereby meet the minimum dosage required for each pathogen.

Moreover, as mentioned above, the one or more sensors 210 as used herein can be virtually any environmental, electrical, mechanical, or other sensors that may include but are in no way limited to UV wavelength sensors, sensors or other electromagnetic wavelengths, air flow sensors, temperature sensors, timers (for measuring the total UV lamp operating hours), humidity sensors, pressure sensors, water flow or other water measurement sensors, etc.

Figure 25:
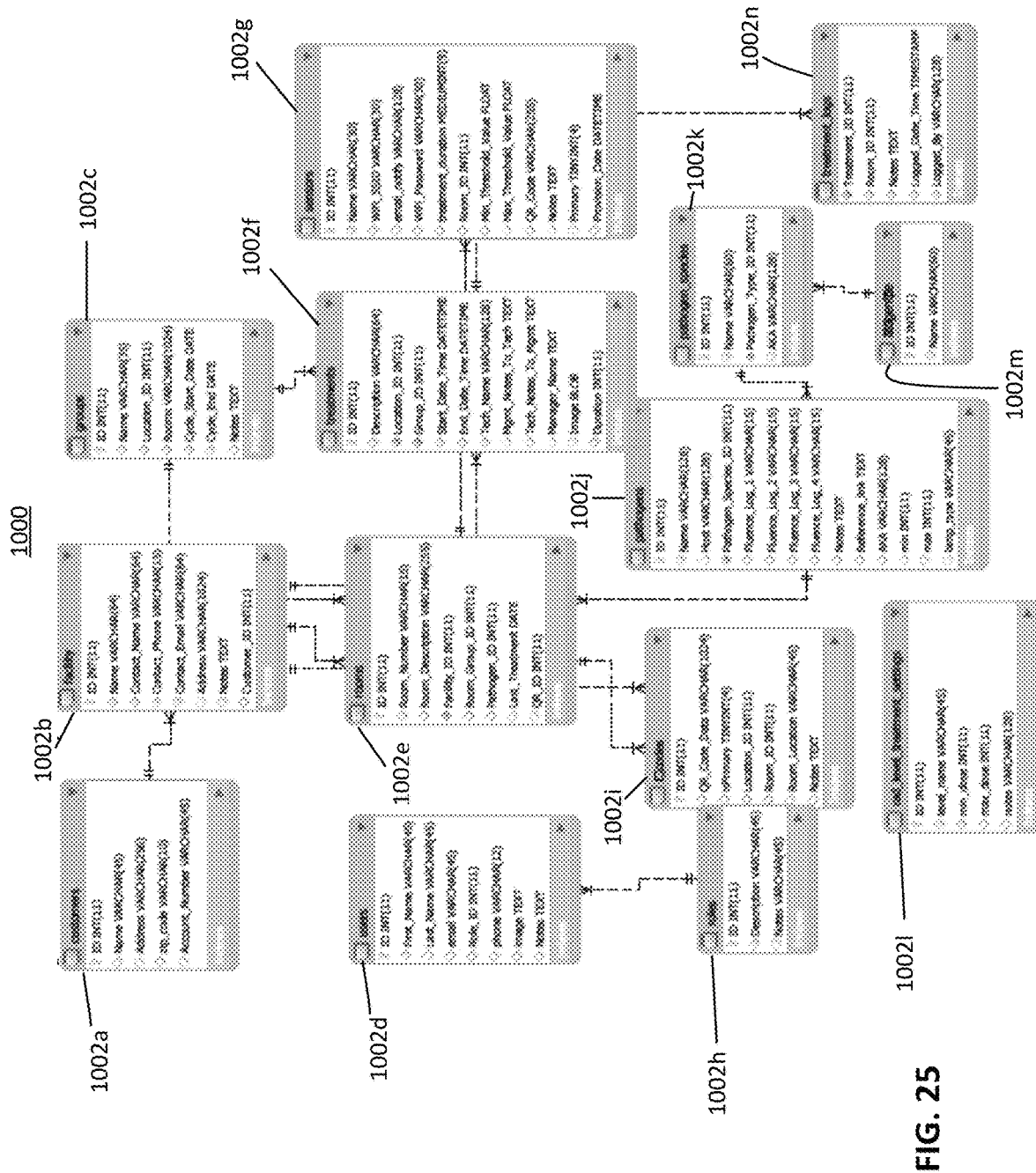
FIG. 25 is an exemplary database schema as disclosed in accordance with at least one embodiment of the present invention.

With reference now to FIG. 25, an exemplary database schema is provided that graphically represents several tables or database entries 1002a-1002n that may be included in at least one exemplary implementation of the present invention. For instance, the tables or database entries may include, but are not limited to customers (ID, name, address, zip code, account number) 1002a, facility (ID, name, contact name, contact phone number, contact email, address, notes, customer ID) 1002b, groups (ID, name, location ID, rooms, cycle start date, cycle end date, notes) 1002c, users (ID, first name, last name, email, role ID, phone, image, notes) 1002d, rooms (ID, room number, room description, facility ID, room group ID, pathogen ID, last treatment date, QR code ID) 1002e, treatments (ID, description, location ID, group ID, start date and time, end date and time, technician name, management notes to technician, technician notes to management, manager name, image, duration) 1002f, sensors (ID, name, WiFi SSID, email notify, WiFI password, treatment duration, room ID, minimum dose threshold, maximum dose threshold, QR code ID, UVC device identification, notes, date) 1002g, roles (ID, description, notes) 1002h, codes (ID, QR code data, location ID, room ID, room location, notes) 1002i, pathogens (ID, name, host, pathogen species, fluence log, notes, reference link or url, aka or also known as or aliases, minimum dose level, maximum dose level, lamp type) 1002j, pathogen species (ID, name, pathogen type ID, alias(es) 1002k, treatment settings (ID, level name, minimum dose level, maximum dose level, notes) 1002l, agent (name) 1002m, treatment logs (ID, treatment ID, room ID, notes, logged date and time, logged by) 1002n.

Further, in certain embodiments of the present invention, UV energy monitoring ($mW/cm^2$) monitoring may be expanded to calculate UV dose levels ($mJ/cm^2$) that would be lethal to pathogens. Where UV energy provides a reliable indicator of a UV lamp's ability to destroy pathogens, UV dose provides specific UV dose values. Each pathogen has its own lethal dose value. These lethal values are often measured in terms of $mJ/cm^2$ and are the multiplication product of UV energy times Exposure time in seconds. Research from various institutions determine what dose level is effective at deactivating or killing a pathogen under specific conditions and environments and to what log level (percentage) the pathogen is deactivated or killed.

In some embodiments, the present invention may use a rate of air flow, e.g., cubic feet per minute (CFM), and the defined cubic volume of the UV treatment chamber to calculate the time component of the dose calculation. When combined with the known UV energy from the sensor reading, the pathogen dose may be calculated. If the UV sensor is positioned at the further distance in the treatment chamber from the UV source(s), the then resultant value would provide a minimum dose level in the chamber volume. As the air segment at the sensor moves closer to the UV source, the UV energy in accordance with the Inverse Square Law is exponentially increased for even higher dosing. The Inverse Square Law is a law of physics stating that the intensity of an effect, such as illumination or gravitational force, changes in inverse proportion to the square of the change in distance from the source.

If the UV sensor is positioned at a location in the treatment chamber closer to the UV source(s) than the furthest distance of the defined chamber volume, then the Inverse Square Law may be used to calculate the dose at the furthest chamber limit or anywhere in between. The controller 220 of at least one embodiment of the present invention may thus be programmed to allow the user to selectively choose where in the UV treatment chamber the dose level should be calculated for purposes of the controller's minimum threshold value setting.

Again, the dose level is dependent upon the exposure time. Air chambers, such as HVAC ducts, may have variable air flow rates. Rates may be reduced by dirt build-up in air filters or cooling coils, dirt accumulation in the ductwork, deterioration of a fan's mechanical performance, changes to the duct structure either before or after the air flow sensor, etc. The resulting reduced air velocity increases the time required for a segment of air to pass through the defined UV chamber. The reduced time increases the dose level. Since the controller 220 of at least one embodiment controls or monitors air flow and UV levels in real-time, it can continuously calculate and report the new dose level to the management system 420 or cloud server or other connected devices. The high dose level thus accelerates reaching the minimum UV threshold setting, and the controller thus delays or prevents activation of reserve UV lamps, and also delays or prevents the activation of notification signals and messaging.

As mentioned herein, the system and method may have minimum air flow thresholds or parameters programmed into a database. As with minimum UV levels, a signal or notification can be activated so that the system owner may perform the necessary maintenance or repairs to return air flow to its proper level. Corrective actions via relay or otherwise, as disclosed herein, signals and notifications may be activated for thresholds, minimum or maximum, that be set for temperature, pressure, or other sensor data values.

Air flow rates may be used as a performance feature of the system and method. For example, fans often have built-in variable fan speeds, and thus, air flow rates. Even without built-in fan speed functions, circuitry may be added that will control fan speeds. With such fans, the dosing level may be increased or decreased by not only activating or deactivating relays that control UV lamps, but also by the fan speed which controls exposure time. Either mechanism of dose management may be used, or a combination of both for even greater range of dose control or for more finely tuned dose control.

It should also be noted that the sensor(s) 210 as used herein may include water (or other fluid) flow sensors or water (or other fluid) flow meters. This can be applicable to embodiments of the present invention implemented in UV water purification systems where the flow of the water or fluid can be measured and used to determine the UV dose levels and other measurements. Similar to other embodiments disclosed herein, based upon minimum or maximum exposure or other thresholds, treatment components can be adjusted, either automatically or manually, to achieve the desired UV dosing and other levels.

In addition, evolving technologies, such as germicidal treatment using 222 nm far-UVC light, is being deployed for germicidal treatment of both air and surfaces of occupied rooms and areas. The defects and drawbacks of unoccupied rooms and areas are the same or similar to occupied rooms and areas. However, treatment of occupied rooms adds a new health problem to be addressed. While 222 nm is widely reported to be safer health-wise than 254 nm, it still has exposure limit values (ELV) for human exposure. The eight hour ELV for 222 nm is 20-25 $mJ/cm^2$ and for 254 nm, the ELV is only 6 $mJ/cm^2$. The 222 nm ELV adds a health safety component to UV surface monitoring and management that is not a consideration for enclosed air systems. Knowing the time exposure of people and their dosing levels to far-UVC at specific distances and incident angles is critical to human safety.

The foregoing address 222 nm exposure in general terms, that is by use of manually measures distances from 222 nm source(s) to a defined location that represents the position of a person or people, and an arbitrary assumption as to the amount of time that the area is occupied. At least one embodiment of the present invention, as disclosed herein, may employ Light Detection and Ranging (LIDAR), or similar devices or combination of devices, for more intelligent and accurate calculations related to 222 nm dosing of occupied areas. For example, wearable devices with RFID or similar devices, such as employee ID cards, Bluetooth low energy or other communication methods to register with the communication interface of the controller or management system disclosed herein. Two-way data communication between the components of the invention, such as the controller, management system, etc., and a wearable device (not shown) could store exposure data on the wearable device or in the cloud that is unique to the wearer. As the wearable device moves from one 222 nm (or other) treatment area, the invention registers the wearer and begins tracking the wearer's dosing level, updating the cloud or wearable device data. Should any wearer of the device enter or remain in a 222 nm (or other) treatment area past the ELV, the light source could shut down to prevent over exposure. Of additional value, would be the stored data for movement tracking of a wearer could be retrieved, analyzed and reported. The results can identify other wearable device users who came into contact with one another at specific times and locations. Should one or more wearers become infected with a pathogen, a contact profile can be quickly produced and expedite the identification of those requiring quarantine and medical treatment.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A method for conducting germicidal treatment of at least one room, the method comprising:
    disposing at least one sensor in a selected location within the room,
    providing a machine-readable location code at the selected location, the machine-readable location code comprising an identification that corresponds with the selected location, the identification of the machine readable location code being maintained at a remote management system,
    providing a machine readable sensor code associated with the at least one sensor, the machine readable sensor code comprising an identification that corresponds with the at least one sensor, the identification of the machine readable sensor code being maintained at the remote management system,
    associating the at least one sensor with the selected location,
    based at least in part upon the selected location, defining at least one treatment parameter for the at least one sensor at the selected location, the at least one treatment parameter being stored at the remote management system and associated with a targeted pathogen,
    disposing at least one germicidal treatment component within the room, wherein the at least one sensor is configured to measure an output emitted by the at least one germicidal treatment component,
    activating the at least one germicidal treatment component in order to conduct the germicidal treatment of the room, and if at least one treatment parameter is not satisfied based upon at least one measurement obtained by the at least one sensor, then initiating at least one predetermined action based thereupon.

2. The method as recited in claim 1 wherein associating the at least one sensor with the selected location comprises using a mobile device to read the machine readable location code and the machine readable sensor code.

3. The method as recited in claim 2 further comprising defining the at least one treatment parameter as comprising a minimum ultraviolet dose level.

4. The method as recited in claim 2 further comprising defining the at least one treatment parameter as comprising a minimum ultraviolet dose level and a maximum ultraviolet dose level.

5. The method as recited in claim 2 further comprising at least partially defining the at least one treatment parameter by a user-defined setting at the remote management system.

6. The method as recited in claim 2 further comprising defining the machine-readable location code as being affixed proximate to the selected location where the at least one sensor is disposed.

7. The method as recited in claim 1 further comprising defining the at least one treatment parameter as comprising a treatment time defined as an amount of time in which said at least one germicidal treatment component is activated.

8. The method as recited in claim 7 further comprising defining said treatment time as being based at least in part upon a measurement obtained from said at least one sensor during at least one prior treatment.

9. The method as recited in claim 8 further comprising defining said treatment time as being based at least in part upon an ultraviolet energy level measured by said at least one sensor during the at least one prior treatment.

10. The method as recited in claim 1 further comprising defining the at least one predetermined action as comprising a corrective action, the corrective action being defined as automatically adjusting a setting of at least one germicidal treatment component.

11. The method as recited in claim 10 further comprising defining the at least one germicidal treatment component as comprising at least one ultraviolet light source.

12. The method as recited in claim 1 further comprising defining the at least one sensor as comprising at least one of the following: an air flow sensor, an ultraviolet wavelength sensor, a temperature sensor, a timer, a humidity sensor, a pressor sensor, a water flow sensor.

* * * * *